(12) United States Patent
Terada et al.

(10) Patent No.: US 9,948,935 B2
(45) Date of Patent: Apr. 17, 2018

(54) IMAGE DECODING APPARATUS, IMAGE TRANSMISSION APPARATUS, IMAGE PROCESSING SYSTEM, IMAGE DECODING METHOD, AND IMAGE TRANSMISSION METHOD USING RANGE INFORMATION

(71) Applicant: Panasonic Corporation, Osaka (JP)

(72) Inventors: Kengo Terada, Osaka (JP); Hisao Sasai, Osaka (JP); Tadamasa Toma, Osaka (JP); Noritaka Iguchi, Osaka (JP); Yui Koashi, Kyoto (JP)

(73) Assignee: PANASONIC CORPORATION, Osaka (JP)

( * ) Notice: Subject to any disclaimer, the term of this patent is extended or adjusted under 35 U.S.C. 154(b) by 438 days.

(21) Appl. No.: 14/603,026

(22) Filed: Jan. 22, 2015

(65) Prior Publication Data

US 2015/0215635 A1 Jul. 30, 2015

Related U.S. Application Data

(60) Provisional application No. 61/933,520, filed on Jan. 30, 2014.

(30) Foreign Application Priority Data

Oct. 17, 2014 (JP) .................................. 2014-213199

(51) Int. Cl.
*G06K 9/36* (2006.01)
*H04N 19/176* (2014.01)
(Continued)

(52) U.S. Cl.
CPC ......... *H04N 19/176* (2014.11); *H04N 19/119* (2014.11); *H04N 19/162* (2014.11); *H04N 19/44* (2014.11)

(58) Field of Classification Search
USPC .................. 345/473; 348/586; 358/403, 449; 375/240, 240.02, 240.19, 240.24, 240.25;
(Continued)

(56) References Cited

U.S. PATENT DOCUMENTS 7,231,651 B2 * 6/2007 Pong ........................ H04N 7/16
348/586
7,376,258 B2 * 5/2008 Klein ..................... G06K 9/036
358/449

(Continued)

OTHER PUBLICATIONS

David Flynn et al. "High Efficiency Video Coding (HEVC) Range Extensions text specification: Draft 4" JCTVC-N1005 Apr. 18-26, 2013.

*Primary Examiner* — Xuemei Chen
(74) *Attorney, Agent, or Firm* — Wenderoth, Lind & Ponack, L.L.P.

(57) ABSTRACT

An image decoding apparatus includes a request unit that requests an image transmission apparatus to transmit an image, a transmission unit that transmits range information indicating a range which is a partial range of the image and which is selected in accordance with a user operation to the image transmission apparatus, a receiving unit that, while the partial range of the image is selected, receives, from the image transmission apparatus, the entirety of the image when the image belongs to a first type and a portion of the image when the image belongs to a second type, by receiving one or more tiles, which corresponds to the partial range of the image and outside which a reference to is prohibited in inter-picture prediction, among a plurality of tiles included in the image, and a decoding unit that decodes the received entirety or portion of the image.

12 Claims, 42 Drawing Sheets

(51) Int. Cl.
*H04N 19/44* (2014.01)
*H04N 19/119* (2014.01)
*H04N 19/162* (2014.01)

(58) Field of Classification Search
USPC ............... 382/233, 236; 600/443; 704/235; 705/14.23
See application file for complete search history.

(56) References Cited

U.S. PATENT DOCUMENTS

| | | | | |
|---|---|---|---|---|
| 8,503,827 | B2* | 8/2013 | Noh | H04N 19/172 382/233 |
| 8,923,633 | B2* | 12/2014 | Sasai | G06T 9/004 375/240.25 |
| 8,934,531 | B2* | 1/2015 | Nakagami | H04N 19/105 375/240 |
| 2002/0021758 | A1* | 2/2002 | Chui | G06F 3/0481 375/240.19 |
| 2007/0046978 | A1* | 3/2007 | Aoki | H04N 1/00204 358/1.14 |
| 2008/0100873 | A1* | 5/2008 | Ohtsu | G06F 17/211 358/403 |
| 2009/0016622 | A1* | 1/2009 | Itakura | H04N 21/2662 382/236 |
| 2012/0232975 | A1* | 9/2012 | Hwang | G06Q 30/02 705/14.23 |
| 2012/0308147 | A1* | 12/2012 | Ikeda | H04N 19/132 382/233 |
| 2013/0083036 | A1* | 4/2013 | Cario | G06T 13/00 345/473 |
| 2013/0324850 | A1* | 12/2013 | Petruzzelli | A61B 8/467 600/443 |
| 2015/0010056 | A1* | 1/2015 | Choi | H04N 19/176 375/240.02 |
| 2015/0016539 | A1* | 1/2015 | Hattori | H04N 19/176 375/240.24 |
| 2015/0023407 | A1* | 1/2015 | Sato | H04N 19/44 375/240.02 |
| 2015/0163561 | A1* | 6/2015 | Grevers, Jr. | H04N 21/812 704/235 |
| 2015/0189300 | A1* | 7/2015 | Terada | H04N 19/52 375/240.25 |

* cited by examiner

FIG. 37

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB-VIDEO) |
| VIDEO STREAM (PID = 0x1B01 SUB-VIDEO) |

FIG. 40
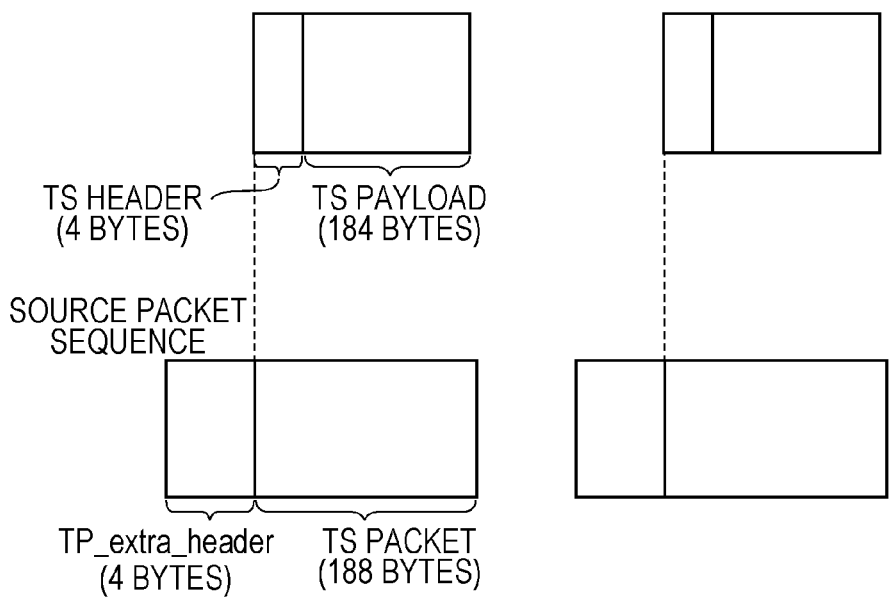
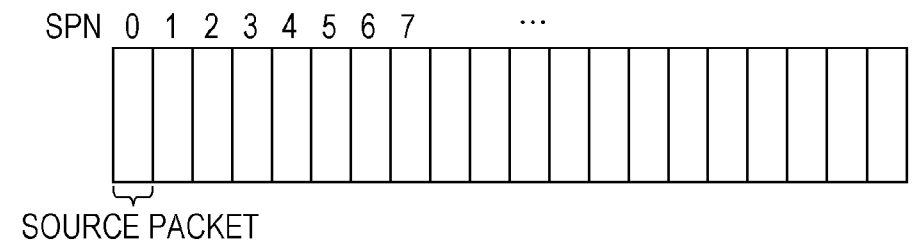

ial Patent
IMAGE DECODING APPARATUS, IMAGE TRANSMISSION APPARATUS, IMAGE PROCESSING SYSTEM, IMAGE DECODING METHOD, AND IMAGE TRANSMISSION METHOD USING RANGE INFORMATION

CROSS REFERENCES TO RELATED APPLICATIONS

This application claims priority to U.S. Provisional Patent Application No. 61/933,520, filed on Jan. 30, 2014, the contents of which are hereby incorporated by reference.

BACKGROUND

1. Technical Field

The present disclosure relates to an image decoding apparatus and the like that receive an encoded image from an image transmission apparatus and that decode the image received from the image transmission apparatus.

2. Description of the Related Art

The High Efficiency Video Coding (HEVC) scheme is presently being examined as a new image codec standard (see JCTVC-N1005, "High Efficiency Video Coding (HEVC) Range extension text specification draft 4"). The HEVC scheme enables transmission and reception of high-quality images with low bit rates, compared to existing schemes. It is anticipated that transmission and reception of data, including images, will be carried out more actively in future.

There have recently been an increasing number of services for the processing of data including images, in which information related to images, such as subtitles, broadcast program information, advertisements, or commercial breaks, or information used to improve user convenience is attached to the images. In such services, unnecessary information may be provided.

SUMMARY

One non-limiting and exemplary embodiment provides an image decoding apparatus and the like for efficient processing of an encoded image.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature an image decoding apparatus according to an aspect of the present disclosure is an image decoding apparatus for receiving an encoded image from an image transmission apparatus and decoding the image received from the image transmission apparatus. The image decoding apparatus includes a request unit that requests the image transmission apparatus to transmit the image, a transmission unit that transmits range information to the image transmission apparatus, the range information being range information indicating a range that is a partial range of the image within an entire range of the image and that is selected in accordance with a user operation, a receiving unit that, while the partial range of the image is selected, (i) receives the entirety of the image from the image transmission apparatus when the image belongs to a first type, and (ii) receives a portion of the image from the image transmission apparatus when the image belongs to a second type, by receiving one or more tiles corresponding to the partial range of the image among a plurality of tiles included in the image, each of the one or more tiles being a tile outside which a reference to is prohibited in inter-picture prediction, and a decoding unit that decodes the entirety or portion of the image received by the receiving unit from the image transmission apparatus.

These general and specific aspects may be implemented using a system, a method, and a computer program, and any combination of systems, methods, and computer programs.

BRIEF DESCRIPTION OF THE DRAWINGS

FIG. 37 is a diagram illustrating the configuration of multiplexed data;

FIG. 40 is a diagram illustrating the structure of TS packets and source packets in multiplexed data;

DETAILED DESCRIPTION

Underlying Knowledge of the Present Disclosure

The present inventors have encountered problems with an image transmission apparatus, an image decoding apparatus, and the like. The details will be described hereinafter.

Figure 1:
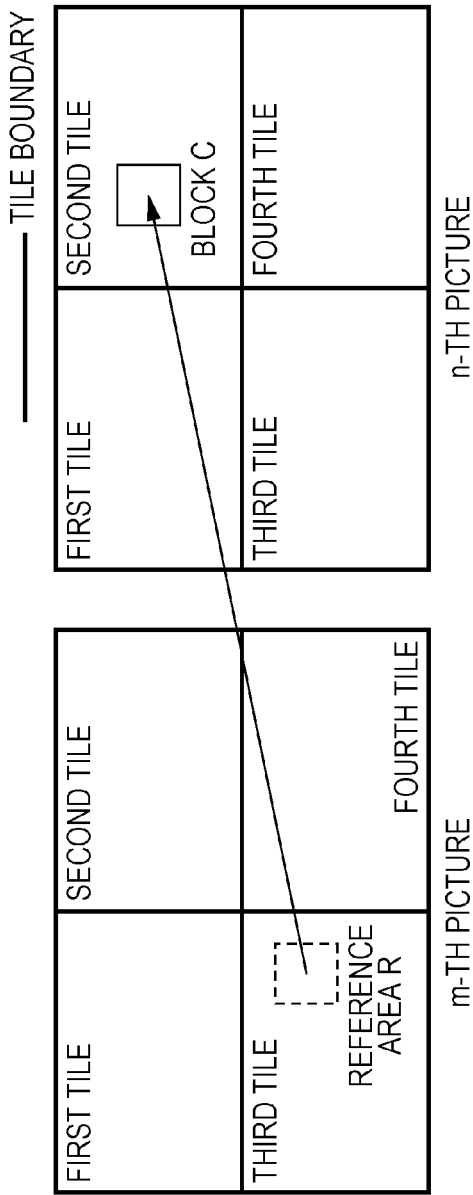
FIG. 1 is a diagram illustrating a reference relationship of a block between tiles.

In the International Telecommunication Union Telecommunication Standardization Sector (ITU-T) standard, referred to as H.26x, or in the International Standards Organization/International Electrotechnical Commission (ISO/IEC) standard, referred to as MPEG-x, as illustrated in FIG. 1, a picture is divided into a plurality of rectangular units called tiles. Each tile is not capable of reference to other tile areas within the screen (or within the picture). For example, if a second tile is a tile to be encoded or decoded, the second tile is not capable of reference to a first tile.

Note that in the case of temporally different image signals, a current block in the tile to be encoded or decoded is capable of reference to an area different from the tile to be encoded or decoded. For example, in FIG. 1, an m-th picture corresponds to an image signal at time t−1, and an n-th picture corresponds to an image signal at time t. These image signals are temporally different image signals. In this case, a block C to be encoded or decoded in the tile to be encoded or decoded is capable of reference to an area different from the area of the second tile.

As used herein, the phrase "a given tile, block, or the like has a reference to another tile, block, or the like" means that another tile, block, or the like is referenced in order to process a given tile, block, or the like. FIG. 1 illustrates an example in which the block C included in the second tile in the n-th picture at the time t is processed by using a reference area R included in a third tile in the m-th picture at the time t−1 as a reference image.

However, if the above-described reference is allowed, the following issue occurs. For example, in a technique, when the screen size (or picture size) is very large, a plurality of tile areas are processed using separate large-scale integration (LSI) devices in parallel. However, as described above, if a reference to an image signal that is different in time is allowed, it may be necessary to write image signals generated using separate LSI devices to a single large memory and to share the memory. In this case, it may be necessary to synchronize the separate LSI devices with each other. In addition, the amount of processing for synchronization may increase.

Figure 2:
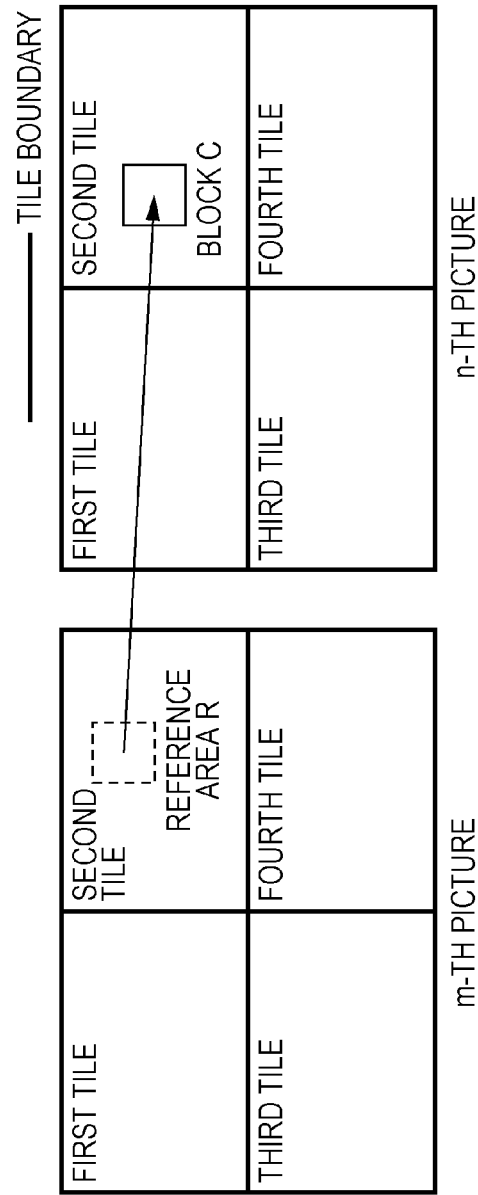
FIG. 2 is a diagram illustrating a reference relationship of a block within a constrained tile.

JCTVC-N1005, "High Efficiency Video Coding (HEVC) Range extension text specification draft 4", noted above, describes a method by which information indicating a constrained reference to an image signal that is different in time is included in a coded stream. In this case, as illustrated in FIG. 2, the block C to be processed has a reference to a reference area R included in the corresponding tile area (i.e., the second tile) in a temporally different image signal (e.g., the m-th picture). Accordingly, in a case where a plurality of LSI devices perform parallel processing for a plurality of tile areas, not all reference images may be output to the shared memory.

In the following, the above-described tile is referred to as an "MV-constrained tile" or a "constrained tile". In addition, an area that can be referenced is not limited to only the corresponding tile area. For example, a reference area R may be specified in an area including the first tile and the second tile in the m-th picture.

By using the MV-constrained tile described above, it is possible to encode or decode an area that is a portion of an image without any reference to other areas.

Accordingly, the inventors have contemplated the possibility of an image being transmitted, received, and decoded on a tile-by-tile basis.

For example, an image decoding apparatus according to an aspect of the present disclosure is an image decoding apparatus for receiving an encoded image from an image transmission apparatus and decoding the image received from the image transmission apparatus. The image decoding apparatus includes a request unit that requests the image transmission apparatus to transmit the image; a transmission unit that transmits range information to the image transmission apparatus, the range information being range information indicating a range which is a partial range of the image within an entire range of the image and which is selected in accordance with a user operation; a receiving unit that, while the partial range of the image is selected, (i) receives the entirety of the image from the image transmission apparatus when the image belongs to a first type, and (ii) receives a portion of the image from the image transmission apparatus when the image belongs to a second type, by receiving one or more tiles corresponding to the partial range of the image among a plurality of tiles included in the image, each of the one or more tiles being a tile outside which a reference to is prohibited in inter-picture prediction; and a decoding unit that decodes the entirety or portion of the image received by the receiving unit from the image transmission apparatus.

The configuration described above allows the image decoding apparatus to switch between decoding of the entirety of the image and decoding of a portion of the image in accordance with the type of the image. Thus, the image decoding apparatus enables the efficient processing of an encoded image.

For example, the image decoding apparatus may further include a display control unit that displays the entirety or portion of the image decoded by the decoding unit on a first display device.

The configuration described above allows the image decoding apparatus to switch between display of the entirety of the image and display of a portion of the image.

For example, the range information may be saved. In a case where the receiving unit receives a portion of the image, the receiving unit may receive a portion of the image in accordance with the saved range information. In a case where the decoding unit decodes a portion of the image, the decoding unit may decode the portion of the image received in accordance with the saved range information. In a case where the display control unit displays a portion of the image, the display control unit may display the portion of the image received and decoded in accordance with the saved range information.

The configuration described above allows the image decoding apparatus to receive, decode, and display a portion of the image in accordance with the range information saved in the image decoding apparatus, the image transmission apparatus, or the like.

For example, in a case where the display control unit displays a portion of the image after displaying the entirety of another image, the display control unit may display the portion of the image received and decoded in accordance with the saved range information.

The configuration described above allows the image decoding apparatus to switch display of the image from display of the entirety of another image to display of a portion of the image.

For example, in a case where the display control unit further stops display of a portion of the image and then resumes the display of the portion of the image, the display control unit may display the portion of the image received and decoded in accordance with the saved range information.

The configuration described above allows the image decoding apparatus to resume the display of the portion of the image in accordance with the range information saved in the image decoding apparatus, the image transmission apparatus, or the like.

For example, the display control unit may further display the portion of the image received and decoded in accordance with the saved range information on a second display device different from the first display device.

The configuration described above allows the image decoding apparatus to cause a display device to inherit a display format from another display device.

For example, in a case where the range information is not saved, the transmission unit may transmit the range information to the image transmission apparatus. In a case where the range information is saved and in a case where the receiving unit receives a portion of the image, the receiving unit may receive a portion of the image in accordance with the saved range information without the range information being transmitted from the transmission unit to the image transmission apparatus.

The configuration described above allows the image decoding apparatus to receive, decode, and display a portion of the image in accordance with, for example, saved range information transmitted from another image decoding apparatus.

For example, the image decoding apparatus may further include a selection unit that selects a partial range of the image in accordance with the user operation. The transmission unit may transmit range information indicating the range selected by the selection unit to the image transmission apparatus.

The configuration described above allows the image decoding apparatus to appropriately select a portion to be received and decoded, in accordance with a user operation.

For example, while the partial range of the image is selected, the receiving unit may receive the entirety of the image when the image belongs to the first type, the first type being a type in which display of the entirety of the image is recommended, and the receiving unit may receive a portion of the image when the image belongs to the second type, the second type being a type in which display of the entirety of the image is not recommended.

The configuration described above allows the image decoding apparatus to receive the entirety of the image when display of the entirety of the image is recommended, to receive a portion of the image when display of the entirety of the image is not recommended. Thus, the image decoding apparatus enables reception and decoding of an appropriate image.

For example, while the partial range of the image is selected, the receiving unit may receive the entirety of the image when the image belongs to the first type, the first type being an advertisement, and the receiving unit may receive a portion of the image when the image belongs to the second type, the second type being different from an advertisement.

The configuration described above allows the image decoding apparatus to receive the entirety of the image for an advertisement for which the entirety of the image is desirably displayed, and to receive a portion of the image for a main part of a broadcast program for which the entirety of the image may not necessarily be displayed.

For example, the image may be assigned a flag indicating whether the image belongs to the first type or the second type, and the receiving unit may receive the entirety or portion of the image in accordance with the flag.

The configuration described above allows the image decoding apparatus to receive the entirety or portion of the image in accordance with the flag assigned to the image.

For example, an image transmission apparatus according to an aspect of the present disclosure is an image transmission apparatus for transmitting an encoded image to an image decoding apparatus. The image transmission apparatus includes a request acceptance unit that accepts a request from the image decoding apparatus to transmit the image; a receiving unit that receives range information from the image decoding apparatus, the range information being range information indicating a range which is a partial range of the image within an entire range of the image and which is selected in accordance with a user operation; and a transmission unit that, while the partial range of the image is selected, (i) transmits the entirety of the image to the image decoding apparatus when the image belongs to a first type, and (ii) transmits a portion of the image to the image decoding apparatus when the image belongs to a second type, by transmitting one or more tiles corresponding to the partial range of the image among a plurality of tiles included in the image, each of the one or more tiles being a tile outside which a reference to is prohibited in inter-picture prediction.

The configuration described above allows the image transmission apparatus to switch transmission of the entirety of the image and transmission of a portion of the image in accordance with the type of the image. Thus, the image transmission apparatus enables the efficient processing of an encoded image.

For example, while the partial range of the image is selected, the transmission unit may transmit the entirety of the image when the image belongs to the first type, the first type being a type in which display of the entirety of the image is recommended, and the transmission unit may transmit a portion of the image when the image belongs to the second type, the second type being a type in which display of the entirety of the image is not recommended.

The configuration described above allows the image transmission apparatus to transmit the entirety of the image when display of the entirety of the image is recommend, and to transmit a portion of the image when display of the entirety of the image is not recommend. Thus, the image transmission apparatus enables transmission of an appropriate image.

For example, while the partial range of the image is selected, the transmission unit may transmit the entirety of the image when the image belongs to the first type, the first type being a type indicating an advertisement, and the transmission unit may transmit a portion of the image when the image belongs to the second type, the second type being a type indicating a different from an advertisement.

The configuration described above allows the image transmission apparatus to transmit the entirety of the image for an advertisement for which the entirety of the image is desirably displayed, and to transmit a portion of the image for a main part of a broadcast program for which the entirety of the image may not necessarily be displayed.

For example, the image may be assigned a flag indicating whether the image belongs to the first type or the second type, and the transmission unit may transmit the entirety or portion of the image in accordance with the flag.

The configuration described above allows the image transmission apparatus to transmit the entirety or portion of the image in accordance with the flag assigned to the image.

These general or specific aspects may be implemented using a system, an apparatus, a method, an integrated circuit, a computer program, or a non-temporary recording medium such as a computer-readable compact disc read-only memory (CD-ROM), or may be implemented using any combination of a system, an apparatus, a method, an integrated circuit, a computer program, and a recording medium.

Some embodiments will be specifically described hereinafter with reference to the drawings. Each of the following embodiments provides a general or specific example. The values, shapes, materials, constituent elements, the positions at which the constituent elements are located, the way in which the constituent elements are connected, steps, the orders of the steps, etc., in the following description are illustrative, and are not intended to limit the present disclosure. In addition, among the constituent elements in the following embodiments, a constituent element not recited in any of the independent claims indicating the most generic concept of the present disclosure is described as optional.

Substantially the same elements are given the same numerals, and a description thereof may be omitted.

First Embodiment

In a first embodiment, a description will be given of an image processing system for decoding an image from a bit stream in which the image is divided into a plurality of tiles and is encoded, a method for decoding the image, and a method for generating the bit stream.

In particular, in the first embodiment, a bit stream includes information for enabling a parallel implementation of encoding and decoding. For example, an image is divided into a plurality of areas each referred to as a tile. A bit stream includes information that is capable of specifying a constraint for motion prediction or motion compensation such that a motion prediction process or a motion compensation process includes a reference to only pixels in one or more corresponding tiles in an image signal at the same time or image signals at different times.

Explanation of Configuration

Figure 3:
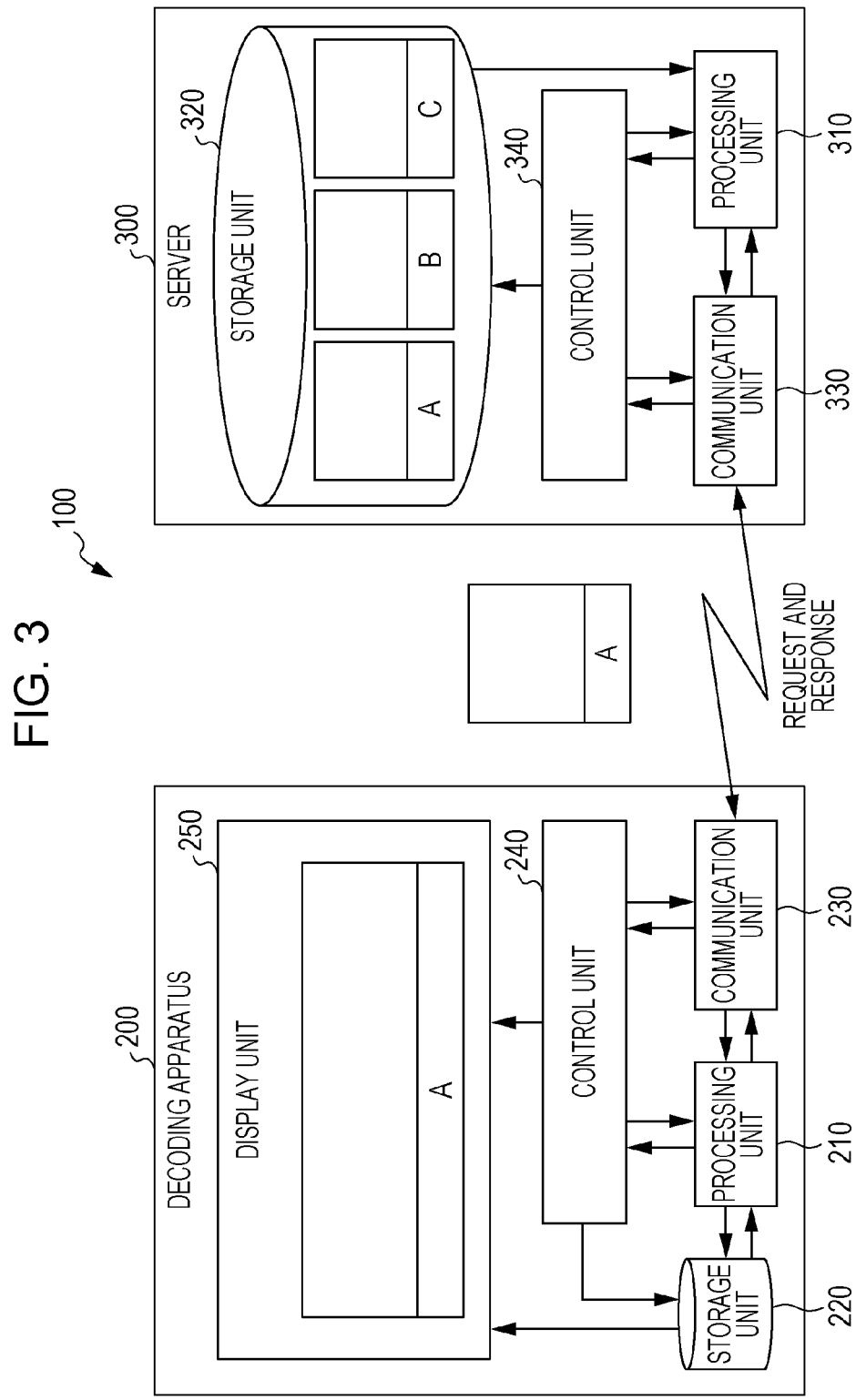
FIG. 3 is a block diagram illustrating an example configuration of image processing system according to a first embodiment.

FIG. 3 illustrates an example configuration of an image processing system 100 according to the first embodiment. The image processing system 100 illustrated in FIG. 3 includes a decoding apparatus (an image decoding apparatus) 200 and a server (an image transmission apparatus) 300. The decoding apparatus 200 includes a processing unit 210, a storage unit 220, a communication unit 230, a control unit 240, and a display unit 250. The server 300 includes a processing unit 310, a storage unit 320, a communication unit 330, and a control unit 340. The storage unit 320 stores image streams A, B, and C, which have been encoded.

The storage unit 220 of the decoding apparatus 200 and the storage unit 320 of the server 300 may be a memory or the like external thereto, or may be an external memory connected via a wired or wireless network. Presently, the server 300 generally has a memory located in each country of the world, which stores similar data, so that images are distributed from the nearest location in accordance with the position of the decoding apparatus 200 by using the global positioning system (GPS) or the like.

The other constituent elements may also be connected to one another in a wired or wireless way so that the overall processing can be executed by hardware or software, and may not necessarily be physically integrated into a single apparatus.

In addition, each component may be composed of one or more processors, one or more circuits, one or more memories, or any combination of them, or may be a general-purpose circuit or the like that executes software to perform the processing of each component.

Figure 4:
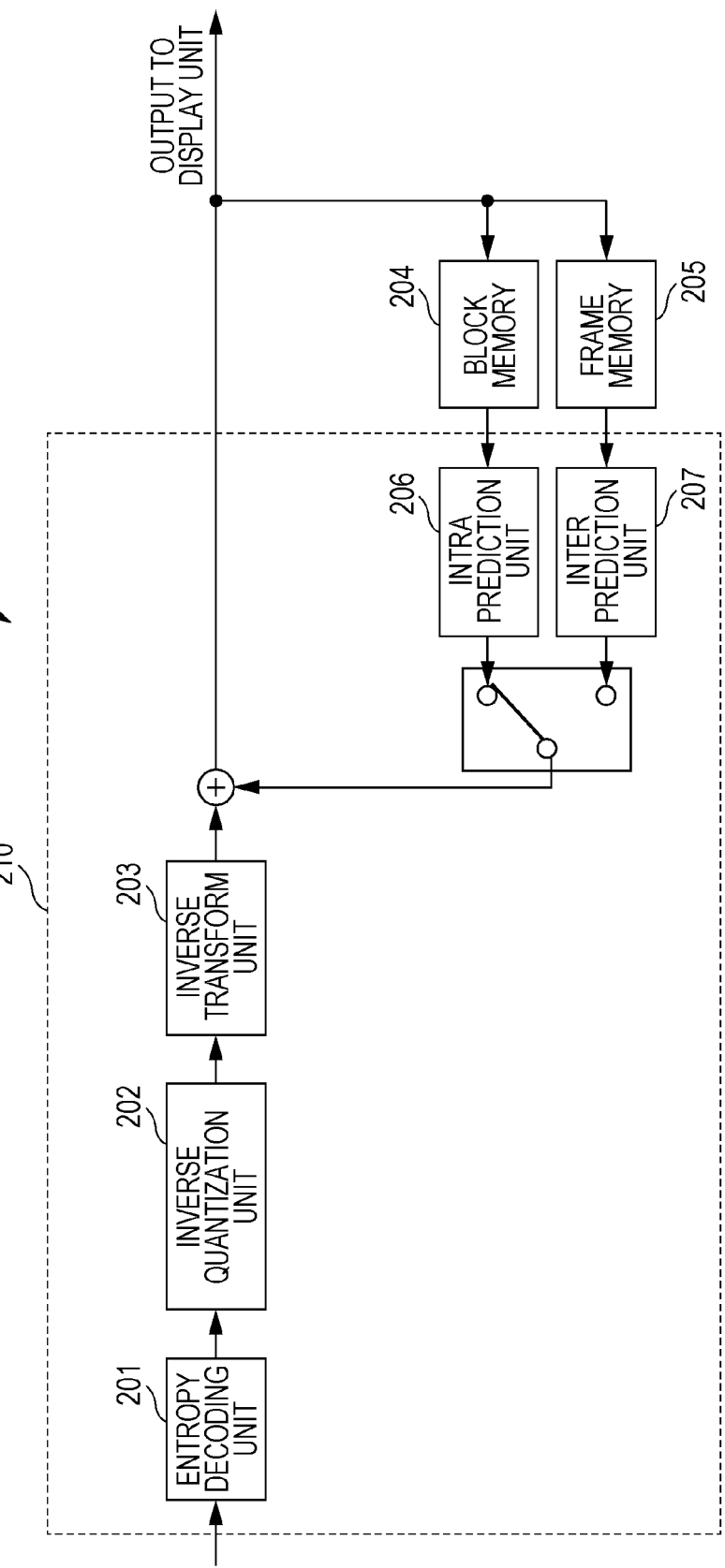
FIG. 4 is a block diagram illustrating an example configuration of image decoding apparatus according to the first embodiment.

FIG. 4 is a block diagram illustrating an example configuration of the decoding apparatus 200 illustrated in FIG. 3. More particularly, FIG. 4 illustrates an example configuration of the processing unit 210 of the decoding apparatus 200. The decoding apparatus 200 illustrated in FIG. 4 includes an entropy decoding unit 201, an inverse quantization unit 202, an inverse transform unit 203, a block memory 204, a frame memory 205, an intra prediction unit 206, and an inter prediction unit 207.

The entropy decoding unit 201, the inverse quantization unit 202, the inverse transform unit 203, the intra prediction unit 206, and the inter prediction unit 207 are included in the processing unit 210. The block memory 204 and the frame memory 205 may be included in the storage unit 220, or may be separate from the storage unit 220.

The processing unit 210 receives, as input, a bit stream, or an encoded image signal, which is acquired by the communication unit 230 from outside.

The entropy decoding unit 201 performs entropy decoding on the bit stream. The inverse quantization unit 202 inverse-quantizes coefficients obtained by entropy decoding. The inverse transform unit 203 performs an inverse frequency transform on the inverse-quantized coefficients. A frame (or picture) which is composed of blocks obtained by inverse frequency transformation is output to the display unit 250.

The block memory 204 stores the blocks obtained by inverse frequency transformation. The frame memory 205 stores the frame formed of the blocks obtained by inverse frequency transformation. The intra prediction unit 206 performs intra prediction with reference to the blocks stored in the block memory 204. The inter prediction unit 207 performs inter prediction with reference to the frame stored in the frame memory 205.

Figures 5, 6:
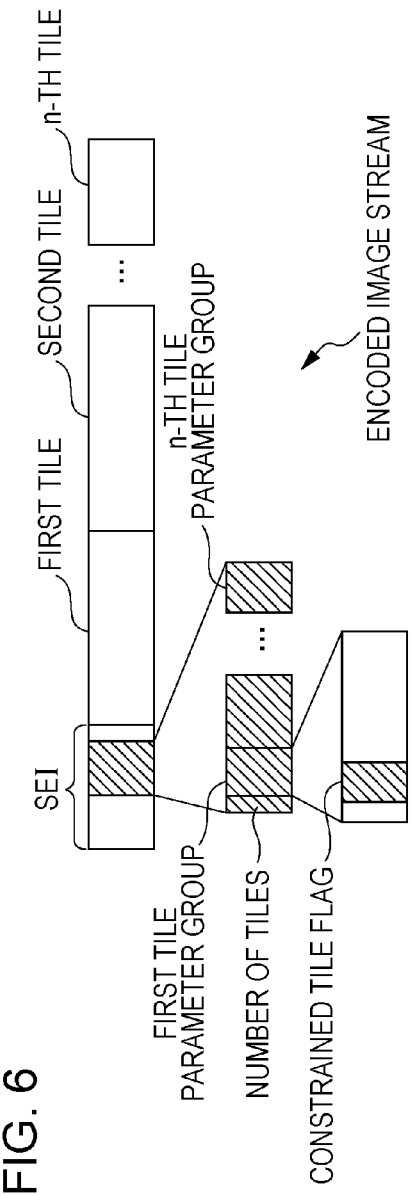
FIG. 5 is a diagram illustrating an example of the syntax that specifies a constraint for motion compensation according to the first embodiment.
FIG. 6 is a diagram illustrating an example of a bit stream including the syntax that specifies a constraint for motion compensation according to the first embodiment.

FIG. 5 is a diagram illustrating an example of the syntax that specifies a constraint for motion compensation. The bit stream includes the syntax illustrated in FIG. 5.

FIG. 6 is a diagram illustrating an example of a bit stream including the syntax illustrated in FIG. 5. As illustrated in FIG. 6, the syntax illustrated in FIG. 5 is written in a header called supplementary enhancement information (SEI). SEI is a header containing auxiliary information that is commonly used for subsequent encoded image data. Note that, as might be anticipated, the syntax illustrated in FIG. 5 may be included in a header called a sequence parameter set (SPS) or a picture parameter set (PPS) or may be included in any other header.

The processing unit 210 writes necessary data to the block memory 204 and the frame memory 205 or reads necessary data from the block memory 204 and the frame memory 205.

The entropy decoding unit 201, the inverse quantization unit 202, the inverse transform unit 203, the intra prediction unit 206, and the inter prediction unit 207 in the processing unit 210 perform a decoding process as specified by H.26x to decode an image from the bit stream.

The communication unit 230 transmits a request to the outside to transmit a bit stream in accordance with instructions from the processing unit 210, the control unit 240, or the like, and receives the bit stream from the outside.

In response to the request from the decoding apparatus 200, the server 300 reads the corresponding bit stream from the storage unit 320 and transmits the image data processed by the processing unit 310 from the communication unit 330 to the decoding apparatus 200 under the control of the control unit 340. For example, the server 300 transmits the image stream A to the decoding apparatus 200 in response to a request for the image stream A from the decoding apparatus 200.

Explanation of Operation

Figure 7:
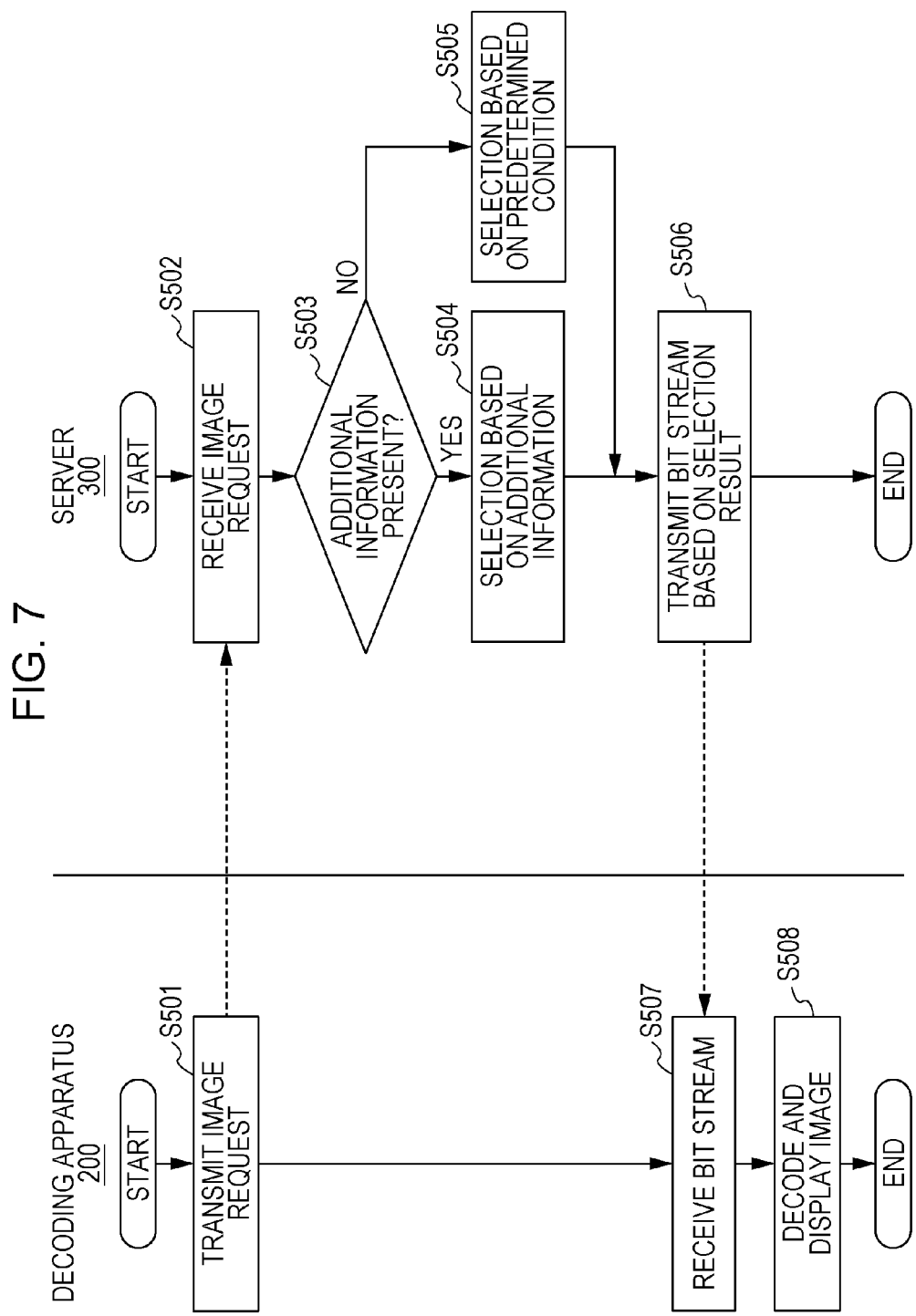
FIG. 7 is a diagram illustrating an example of the processing flow of the image processing system according to the first embodiment.

FIG. 7 is a diagram illustrating the processing flow of the operation of the image processing system 100 according to the first embodiment.

The decoding apparatus 200 transmits a request for an image which the user wishes to view to the server 300 outside the decoding apparatus 200 (S501). Presently, a processing apparatus that receives the request and a server that delivers the image to the decoding apparatus 200 in accordance with instructions from the processing apparatus are generally different. In addition, the processing apparatus and the server are generally run by different companies, and are also generally located in different countries. In the description provided herein, the apparatus that receives the request, and the server or the like that delivers the image are collectively termed the server 300, which is located outside the decoding apparatus 200, for simplicity.

The decoding apparatus 200 delivers additional information in addition to the request to the server 300, and may thus be able to receive a more appropriate image. The additional information includes, for example, position information, user information, performance information, and so forth. The additional information is information that allows the server 300, which stores several images having the same content but different formats, to transmit a more appropriate image among the several images to the decoding apparatus 200.

The server 300 receives the request for the image (S502), and determines whether or not additional information is present (S503).

If additional information is present (YES in S503), the server 300 selects image data to be transmitted, in accordance with the additional information (S504). If additional information is not present (NO in S503), the server 300 selects image data to be transmitted, in accordance with predetermined conditions (S505). The image data includes a main image corresponding to the request from the decoding apparatus 200, and sub-information including text or an image.

The server 300 transmits a bit stream including the selected image data to the decoding apparatus 200 (S506). The decoding apparatus 200 receives the bit stream (S507). Then, the decoding apparatus 200 decodes an encoded image included in the bit stream, and displays the decoded image (S508).

Detailed Explanation of Selection Process

Figure 8:
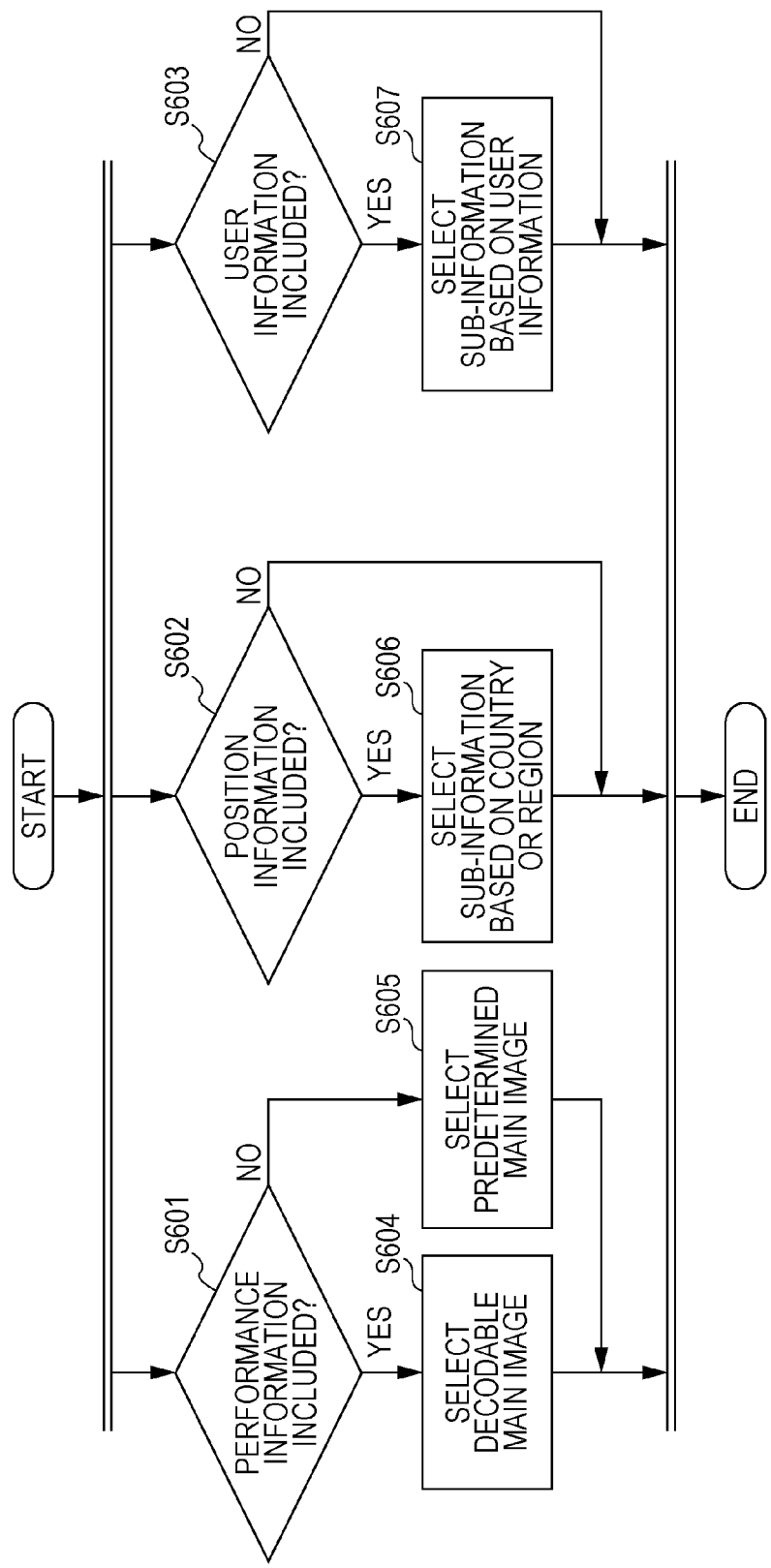
FIG. 8 is a diagram illustrating an example of an image data selection process according to the first embodiment.

FIG. 8 is a diagram illustrating an example of the image data selection process (S503 to S505) illustrated in FIG. 7.

In determination operations (S601 to S603) illustrated in FIG. 8, it is determined whether or not the additional information includes performance information, position information, and user information. The determination operations may be performed in any order or may be performed in parallel. Note that the determination operations are merely an example. The image data selection process may involve any other procedure including one or more steps of selecting sub-information in accordance with any information.

Not all of the determination operations for performance information, position information, and user information may be performed. Other information may be used for the image data selection process, or sub-information may be selected in accordance with performance information.

In FIG. 8, for example, if it is determined that the additional information includes performance information (YES in S601), a standard with which the decoding apparatus 200 is compatible for decoding operations or the profile, level, or the like in the standard which is supported by the decoding apparatus 200 is determined in accordance with the performance information. Examples of the standard include MPEG-2, MPEG-4 Visual, H.264/Advanced Video Coding (AVC), and H.265/HEVC. The server 300 selects one of a plurality of types of main images stored in the storage unit 320 of the server 300 in accordance with the determination result (S604).

If the decoding apparatus 200 is compatible with a plurality of standards or is compatible with a plurality of profiles or the like, the server 300 may select one main image complying with a higher quality and higher efficiency standard or profile from among the plurality of main images further in accordance with states such as a transmission path state. Alternatively, the server 300 may use a distribution system (e.g., MPEG-Dynamic Adaptive Streaming over Hypertext Transfer Protocol (HTTP) (MPEG-DASH)) that delivers information linked to each main image candidate to distribute the information so that the decoding apparatus 200 can select a main image in accordance with states such as a transmission path state.

If it is determined that the additional information does not include performance information (NO in S601), the server 300 selects a predetermined main image, for example, a main image complying with the most fundamental standard, profile, or the like (S605).

If it is determined that the additional information includes position information (YES in S602), the server 300 selects sub-information in accordance with a country or region identified by the position information as the location of the decoding apparatus 200 (S606). The sub-information is, for example, information indicating the weather of the region, radio programs or TV programs broadcast in the region, nearby grocery stores or restaurants in the region, or the like, which is expressed in the language of the region.

If it is determined that the additional information does not include position information (NO in S602), the server 300 may not necessarily select sub-information based on a location, or may select predetermined sub-information. For example, if it is difficult to acquire position information and it is difficult to identify the optimum language, the server 300 may select general news expressed in English as sub-information.

If it is determined that the additional information includes user information (YES in S603), the server 300 selects sub-information in accordance with the user information. For example, the server 300 selects sub-information in accordance with the gender, age, or the like of the user (S607). Alternatively, the server 300 may acquire information regarding the network of a friend with whom the user is well acquainted via a social networking service (SNS), and may select sub-information in accordance with the preference of the user, which is estimated from the acquired information.

For example, if the user is interested in automobiles, the server 300 selects news on the latest products or an advertisement for automobile-related goods regarding the exterior or interior of automobiles as sub-information.

If it is determined that the additional information does not include user information (NO in S603), the server 300 may not necessarily select sub-information based on user information, or may select predetermined sub-information. For example, the server 300 may select, as sub-information, information related to a main image, such as information on goods or a movie related to the main image.

In the manner described above, the server 300 selects or generates one or more of a plurality of sub-information candidates as sub-information.

Transmission Method of Main Image and Sub-Information

In transmission process (S506) illustrated in FIG. 7, an image including the main image and sub-information selected in the manner described above is constructed using a plurality of tiles, and a bit stream including the constructed image is transmitted to the decoding apparatus 200. Each of the plurality of tiles is basically an MV-constrained tile. However, the plurality of tiles may include a tile that is not an MV-constrained tile.

Figure 9:
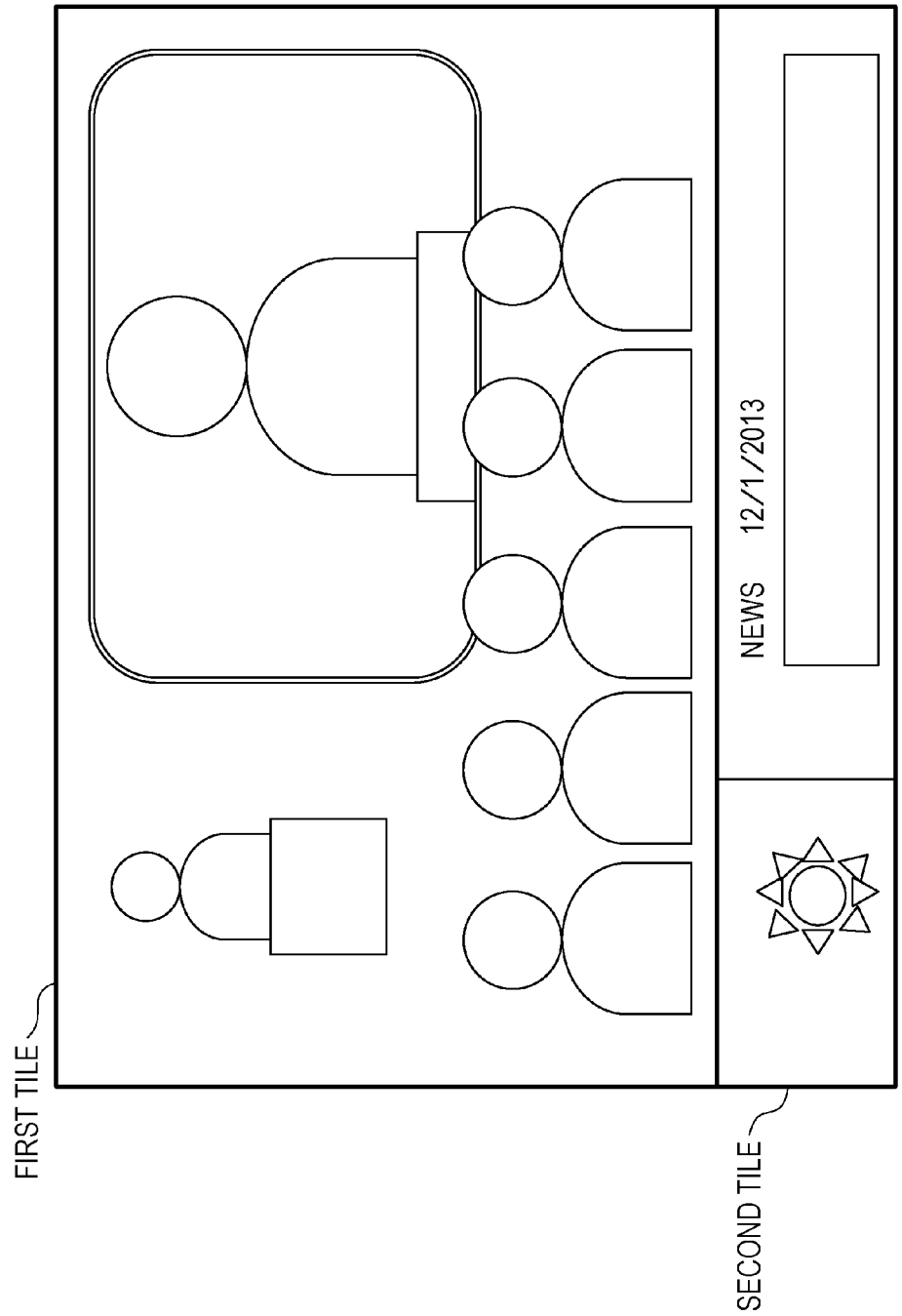
FIG. 9 is a diagram illustrating an example of first allocation of a main image and sub-information to a plurality of tiles in an image according to the first embodiment.

FIG. 9 is a diagram illustrating an example of first allocation of a main image and sub-information to a plurality of tiles in an image according to the first embodiment. As illustrated by way of example in FIG. 9, tiles are rectangular areas obtained by dividing one image (or picture) by a vertical or horizontal straight line(s).

For example, as illustrated in FIG. 9, one image is divided into a first tile and a second tile. Then, the processing unit 310 encodes the selected main image as the first tile and the selected sub-information as the second tile in accordance with H.265/HEVC. In this case, the processing unit 310 encodes each of the first tile and the second tile as an MV-constrained tile. FIG. 9 illustrates an example in which, for example, weather and news are selected as sub-information and are encoded so as to be arranged side by side.

Figure 10:
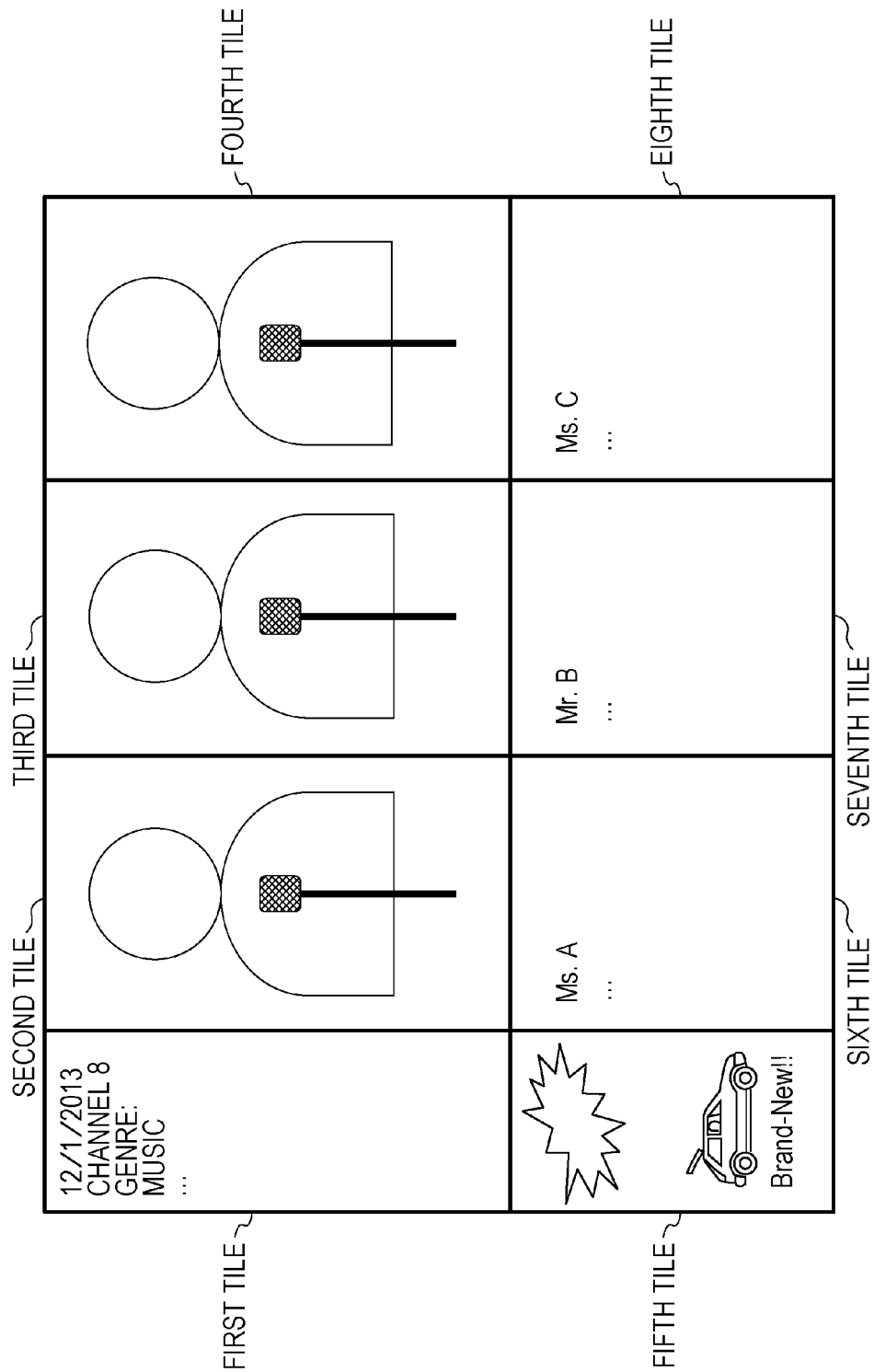
FIG. 10 is a diagram illustrating an example of second allocation of a main image and sub-information to a plurality of tiles in an image according to the first embodiment.

FIG. 10 is a diagram illustrating an example of second allocation of a main image and sub-information to a plurality of tiles in an image according to the first embodiment. FIG. 10 illustrates an example configuration of a main image and sub-information that is different from the example illustrated in FIG. 9. In the illustrated example, the first tile and the fifth to eighth tiles correspond to sub-information, and the second to fourth tiles correspond to a main image.

The first tile includes information related to the main image, such as broadcast program information on the main image, and the fifth tile includes an advertisement. In addition, the sub-information is divided into the sixth to eighth tiles so as to correspond to the main image which is divided into the second to fourth tiles, respectively.

As illustrated in FIG. 10, in a case where each of the second to fourth tiles corresponding to the main image is associated with a particular person or a microphone, object-based coding may be used as an audio codec. If the sound at a specific position or the sound of a microphone is reproducible during decoding, the decoding apparatus 200 may reproduce audio corresponding to an image displayed in a tile. In addition, a link to audio adjusted so that the audio becomes the main audio may be inserted in the corresponding tile for the sub-information.

Figure 11:
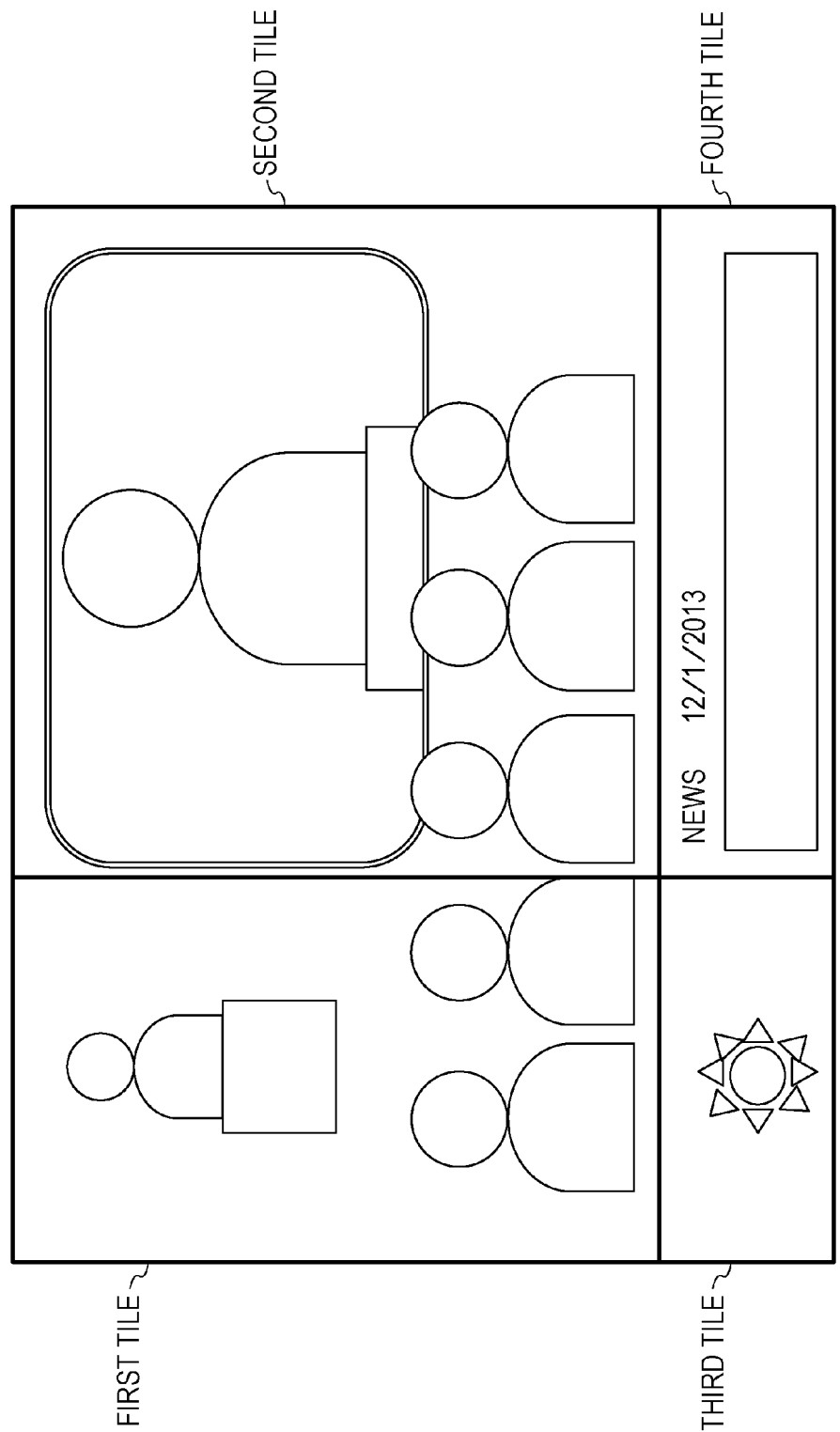
FIG. 11 is a diagram illustrating an example of third allocation of a main image and sub-information to a plurality of tiles in an image according to the first embodiment.

FIG. 11 is a diagram illustrating an example of third allocation of a main image and sub-information to a plurality of tiles in an image according to the first embodiment. FIG. 11 illustrates an example in which a main image is divided into a first tile and a second tile and sub-information is divided into a third tile and a fourth tile. In the illustrated example, two kinds of sub-information, that is, weather and news, are encoded as separate tiles.

Figure 12:
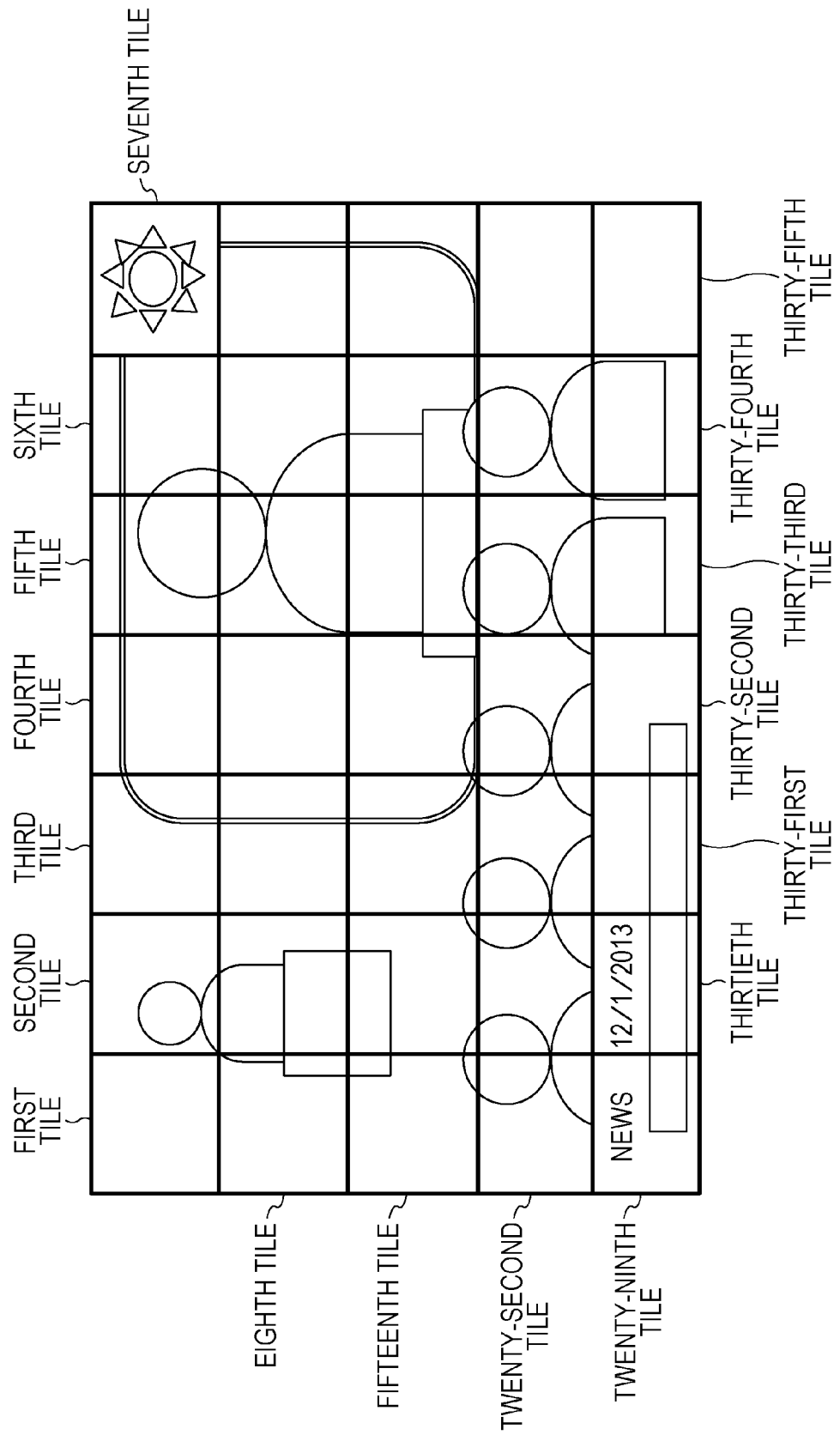
FIG. 12 is a diagram illustrating an example of fourth allocation of a main image and sub-information to a plurality of tiles in an image according to the first embodiment.

FIG. 12 is a diagram illustrating an example of fourth allocation of a main image and sub-information to a plurality of tiles in an image according to the first embodiment. FIG. 12 illustrates an example in which tiles that correspond to a portion of a main image are replaced with sub-information and are encoded. Specifically, FIG. 12 illustrates an example in which a main image is divided into first to thirty-fifth tiles, among which the seventh tile and the twenty-ninth to thirty-second tiles are replaced with sub-information. In the illustrated example, an MV-constrained tile is used for the seventh tile in accordance with the period during which or the timing at which each piece of sub-information is displayed.

Figure 13:
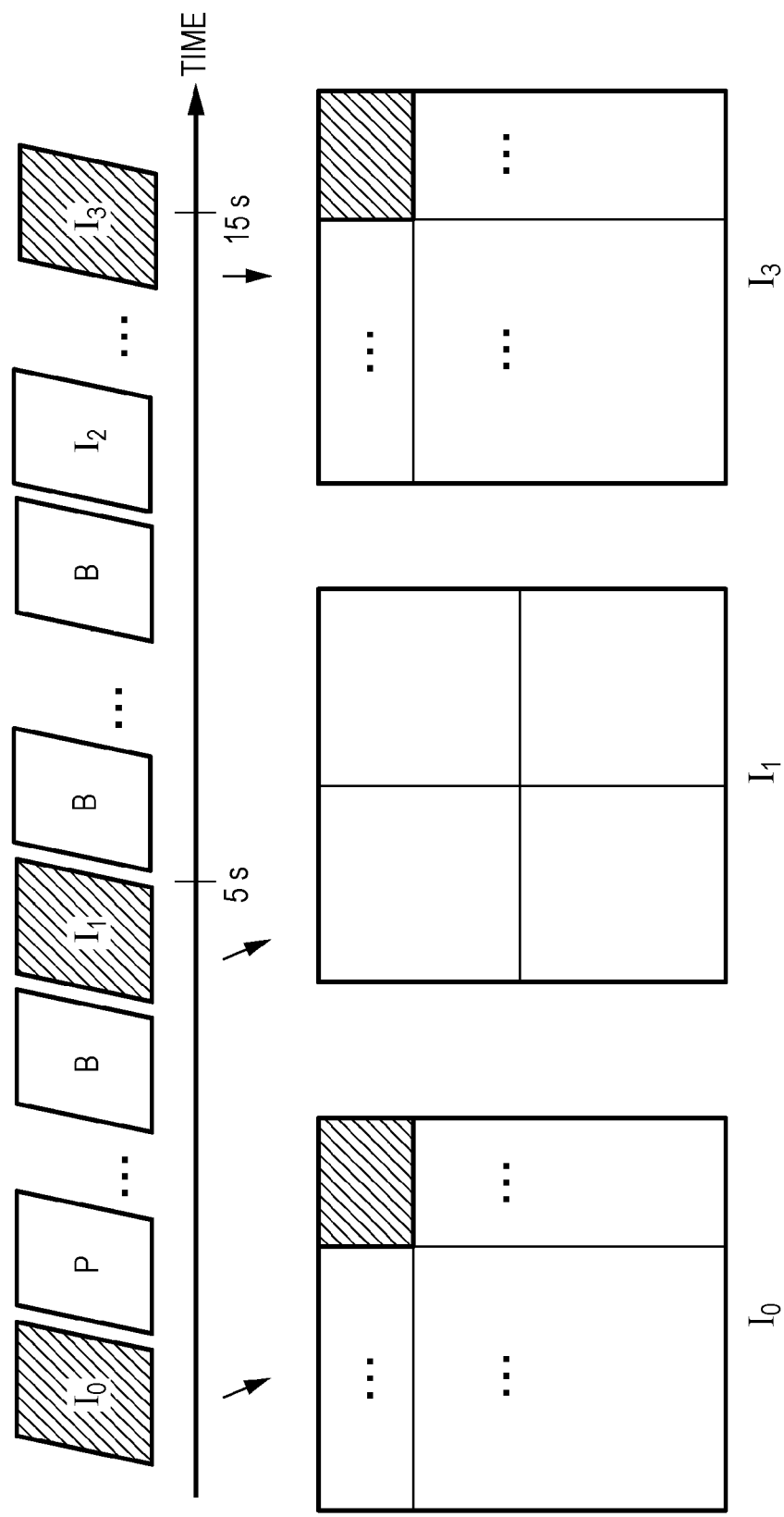
FIG. 13 is a diagram illustrating an example of the timing at which the allocation of a main image and sub-information to a plurality of tiles in an image according to the first embodiment is changed.

FIG. 13 is a diagram illustrating an example of the timing at which the allocation to a plurality of tiles in an image according to the first embodiment is changed. Specifically, in FIG. 13, the manner of division into tiles is switched at I pictures that are substantially at intervals of predetermined duration.

For example, when weather information is to be displayed in the seventh tile for 5 seconds every 10 seconds, an MV-constrained tile is used for the seventh tile of the picture for 5 seconds, and the weather information is embedded in a portion of the main image. In FIG. 13, at $I_0$, the picture is divided into tiles so that the seventh tile is created. Then, the manner of division of the picture is maintained until $I_1$. At $I_1$, the weather information is returned to the main image, and the constraint and the manner of division are changed to those in the initial state. This is merely an example, and the weather information may be returned to the main image while the manner of division of the picture and the constraint are maintained.

If the manner of division of the picture is changed while the user is viewing the picture or if the allocation of the main image and the sub-information is changed, the server 300 notifies the decoding apparatus 200 of the change in the manner of division or the allocation. For example, if the server 300 uses a distribution system based on MPEG-DASH or the like, the server 300 modifies a Media Presentation Description (MPD) file, and notifies the decoding apparatus 200 of the modification of the MPD file.

After that, at an I picture (in FIG. 13, $I_3$) that is substantially at an elapsed time of 10 seconds, the picture is again divided into tiles so that the seventh tile is created. Then, the server 300 replaces a portion of the main image with sub-information, and encodes the image by using the MV constraint.

Figure 14:
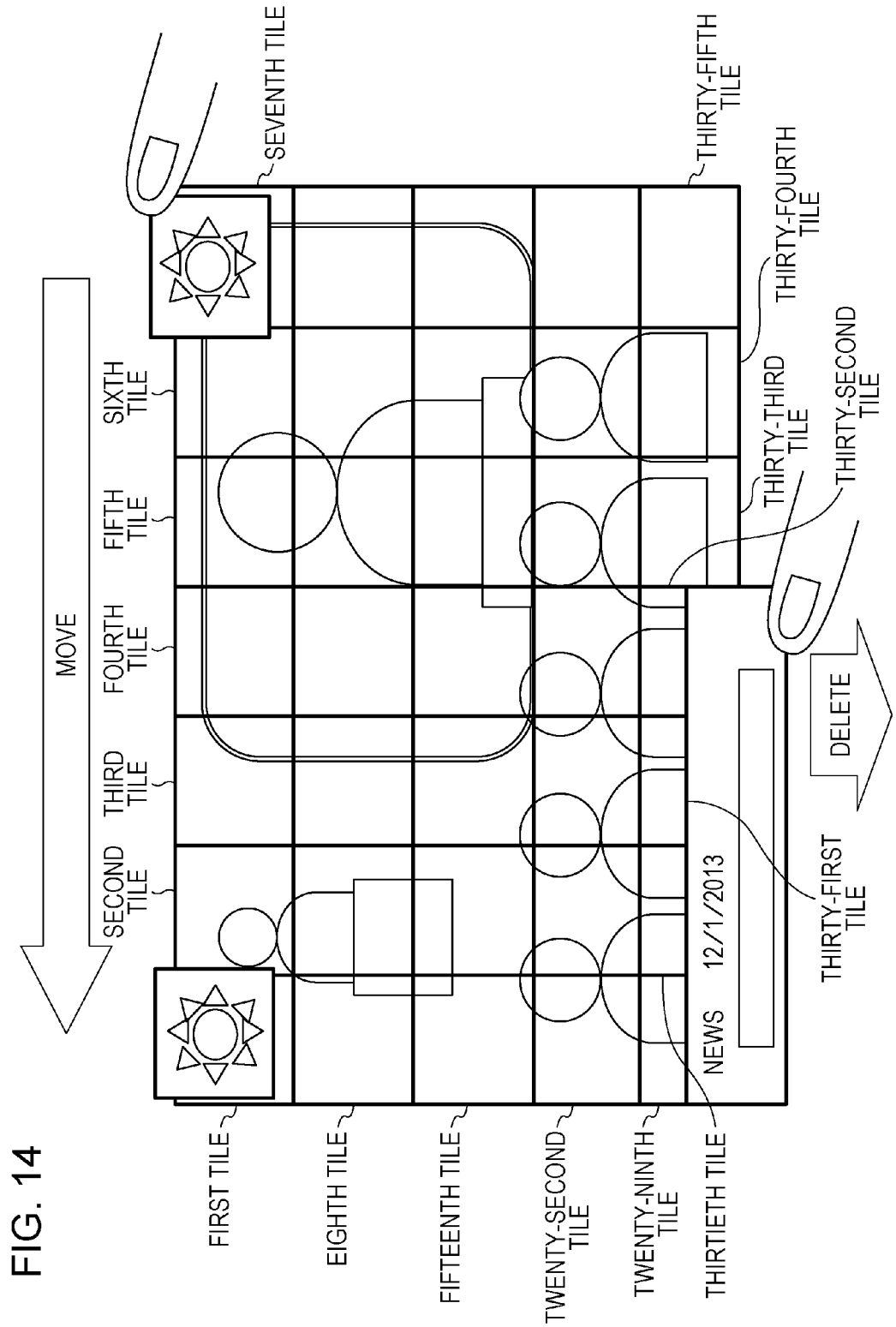
FIG. 14 is a diagram illustrating an example of an operation of changing the allocation of a main image and sub-information to a plurality of tiles in an image according to the first embodiment.

FIG. 14 is a diagram illustrating an example of an operation of changing the allocation to a plurality of tiles in an image according to the first embodiment. Specifically, FIG. 14 illustrates an example in which sub-information displayed on the twenty-ninth to thirty-second tiles is returned to the portion of the main image and the sub-information displayed on the seventh tile is moved to the position of the first tile at the next timing in accordance with instructions from the user. Here, the next timing is, for example, the timing of an I picture appearing after the instructions are given.

Figure 15:
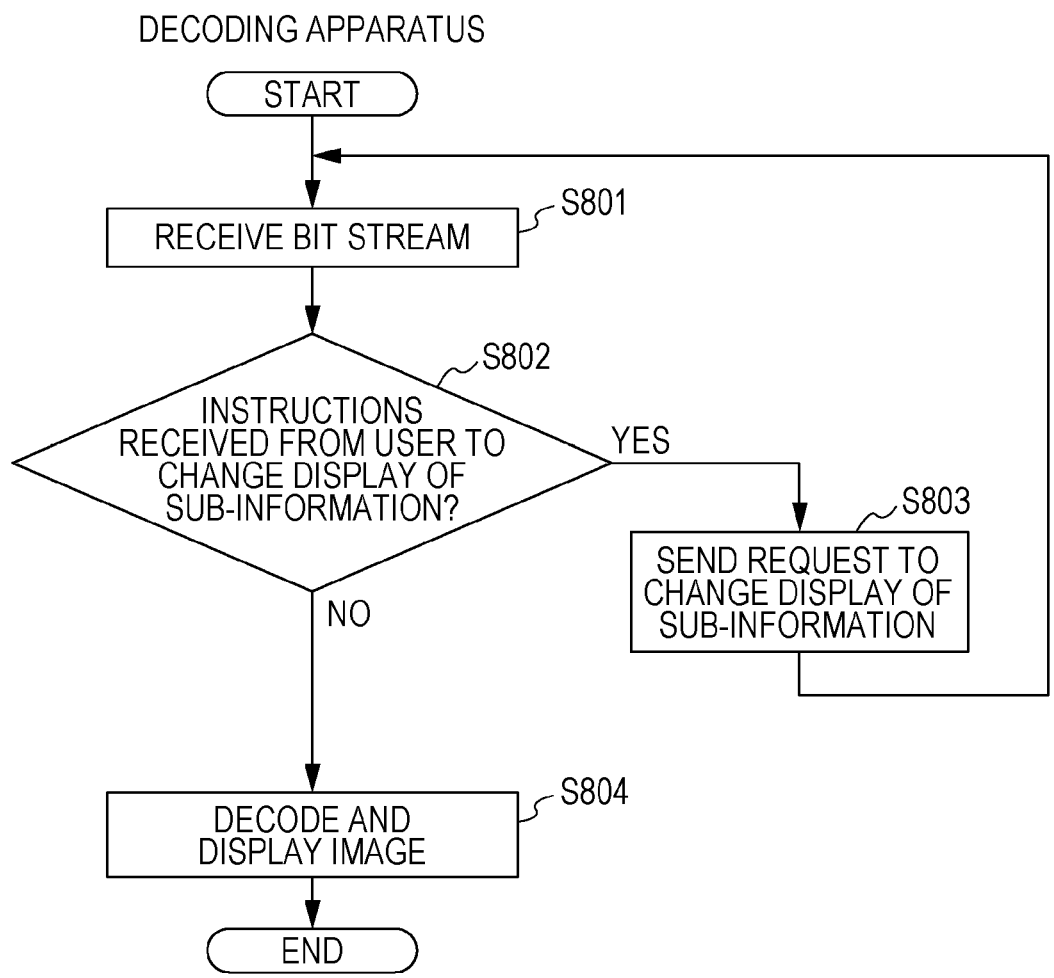
FIG. 15 is a diagram illustrating an example of the processing flow for changing the allocation of a main image and sub-information to a plurality of tiles in an image according to the first embodiment.

FIG. 15 is a diagram illustrating an example of the processing flow for changing the allocation to a plurality of tiles in an image according to the first embodiment. For example, as in the example illustrated in FIG. 15, in accordance with instructions from the user, the decoding apparatus 200 transmits a request to the server 300 via the communication unit 230 to change the location where sub-information is to be displayed from the seventh tile to the first tile (S801 to S803). In response to the request, the server 300 transmits a bit stream in which the sequence of tiles has been changed so that the sub-information is displayed in the first tile at the next appropriate timing.

Then, the decoding apparatus 200 receives the modified bit stream (S801). Then, the decoding apparatus 200 decodes an encoded image included in the modified bit stream, and displays the decoded image (S804). When the user performs an operation of deleting the display of the sub-information (YES in S802), the decoding apparatus 200 transmits a display change request corresponding to the deletion of the sub-information to the server 300 (S803). In this case, the server 300 transmits a bit stream in which the sub-information has been returned to the portion of the main image.

In FIG. 15, the decoding apparatus 200 sends the display change request to the server 300. In a case where a distribution system capable of switching the stream to be received in accordance with the situation, such as MPEG-DASH, is used, the decoding apparatus 200 may select an appropriate image from among a plurality of options transmitted from the server 300, without sending a request. The decoding apparatus 200 may also initially select a default image. When the server 300 has information to be notified, such as emergency disaster information, the server 300 may transmit the information so the information will be chosen.

It is to be anticipated that even in a case where such a distribution system as above is used, the decoding apparatus 200 may request the server 300 to create an appropriate option if no appropriate option exists.

In FIG. 15, the decoding apparatus 200 receives a new stream at the next timing after a display change request has been made. The decoding apparatus 200 may display any of the following in a tile for which display is to be changed, by way of example, until the reception and decoding of a new stream are completed: (1) the currently displayed item, and (2) a predetermined background image.

In a case where the currently displayed item is continuously displayed, stable display is obtained since the decoding apparatus 200 involves no additional processing. On the other hand, the user may feel that the display is less responsive because the display has not been changed although the user made a movement or deletion request.

Accordingly, if the period until the reception and decoding of a new stream are completed is short, the decoding apparatus 200 may display the currently displayed item. If the period until the reception and decoding of a new stream are completed is equal to or longer than a certain period, it is desirable that the decoding apparatus 200 change the operation so that the predetermined background image is displayed.

In a case where the predetermined background image is displayed, the decoding apparatus 200 can visually notify the user that the request has been accepted, by using the displayed background image. In the case where the predetermined background image is displayed, furthermore, processing is simple. Examples of the background image include a gray image, a logo, a pattern image, an image stored in advance in a memory, and a tile portion of the main image that has been most recently (or last) decoded and that is held in a memory. Furthermore, the background image is limited to a still image.

The decoding apparatus 200 may also perform operations other than movement and deletion, such as converting the sub-information from image to text data, reducing the size of the area, and modifying the sub-information to other sub-information, in accordance with a user operation. If the sub-information has a large amount of data and requires heavy processing or in inconvenient cases such as when sub-information displayed as a moving image during rapid scene changes distracts the viewer from concentrating on the main image, the decoding apparatus 200 may convert the sub-information to text data to achieve a state more suitable for viewing of the main image.

The user selects the source for movement by using a remote controller and gives instructions to move the sub-information to the destination by using an arrow key or the like, and the decoding apparatus 200 can accept the instructions from the user. If the decoding apparatus 200 has a touch panel, the user gives instructions to move the sub-information from the source to the destination via touch gestures such as a swipe or gives instructions for deletion by swiping from inner to outer of the screen, and the decoding apparatus 200 can accept the instructions from the user.

The decoding apparatus 200 can also accept instructions for movement or deletion in a similar manner by using information on a movement or a gesture detected by an acceleration sensor, a depth sensor, or the like. Here, an example in which the user gives instructions for movement or deletion is illustrated by way of example. Instead, if sub-information to be notified, such as emergency disaster information, is to be displayed on the decoding apparatus 200, the server 300 may select the sub-information by default.

As illustrated in FIGS. 9 to 12, in a case where a portion of a main image is replaced with sub-information and the sub-information is encoded as a tile in a picture, it is desirable that the sub-information be arranged in an area that does not interfere with the viewing of the main image, such as at any of the four corners or along any edge (left, right, top, or bottom) of the screen.

However, in a case where a main image provided for a fee is distributed for a trial period, a tile for sub-information such as an advertisement may be arranged in an area that interferes with the viewing of the main image. Accordingly, the decoding apparatus 200 can encourage the viewer to view a more appropriate main image. The decoding apparatus 200 thus achieves the provision of a content distribution service for which an appropriate copyright fee is collected from users.

Figure 16:
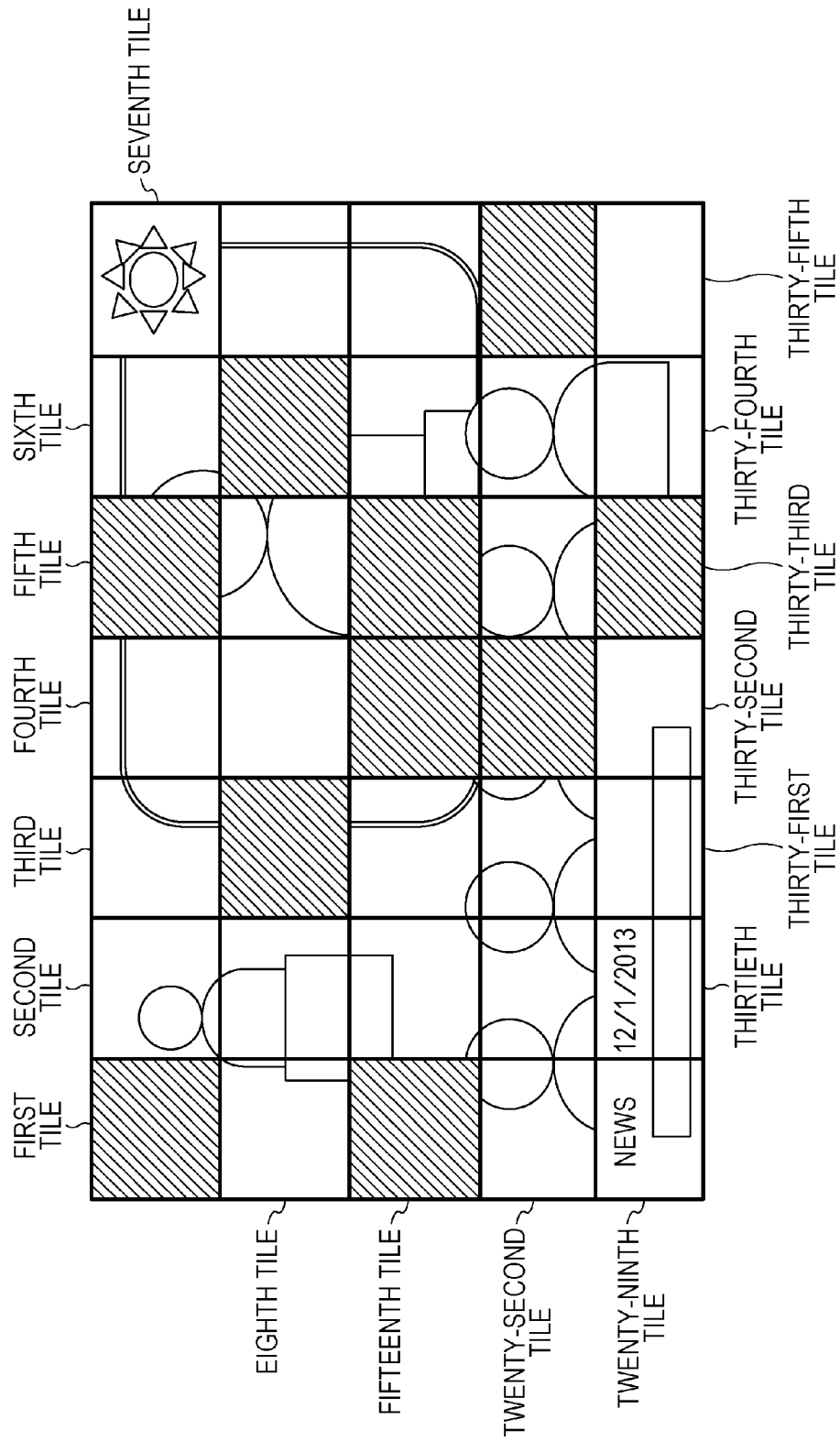
FIG. 16 is a diagram illustrating an example of an operation of scrambling some of a plurality of tiles in an image according to the first embodiment.

FIG. 16 illustrates an example of an operation of scrambling some of a plurality of tiles in an image according to the first embodiment. For example, in FIG. 16, initially, all the tiles in the image correspond to a main image. Then, some of the tiles may be gradually modified to MV-constrained tiles at the timing when I pictures are displayed. In the modified tiles, sub-information, a gray image, a scrambled image, an indiscernible main image such as a coarse or blurred main image, or the like may be displayed.

When the user is to view the main image, the user may select the desired tile by using, for example, the user interface (UI) described above, and pay an appropriate viewing fee via an electronic payment system, so that an indication that interferes with viewing on the tile may be canceled. The viewing fee may be determined in accordance with the size of the area selected by the user as an area to view. A tile for displaying sub-information may be arranged in an unselected area, and an advertisement or the like may be always displayed in the tile.

In the manner described above, the decoding apparatus 200 receives the transmitted bit stream, reads the standard with which the bit stream complies from the header, and executes a decoding process corresponding to the standard to display a decoded image on the display unit 250.

On the other hand, the server 300 holds a plurality of bit streams corresponding to a plurality of patterns having the same number of tiles but having different pieces of content so as to meet a request from the decoding apparatus 200 as described above. For example, in a case where MPEG-DASH is employed, the server 300 may transmit an MPD file including segment information linked to the plurality of bit streams to the decoding apparatus 200.

Advantages

In the first embodiment, as described above, an image is divided into a plurality of tiles, and a selected main image and selected sub-information are encoded in separate tiles. Accordingly, an image accompanied by appropriate information is transmitted to the decoding apparatus 200 in the form of a single stream. Additionally, the server 300 can transmit sub-information to be transmitted, and the decoding apparatus 200 can receive appropriate sub-information.

In the manner described above, the image processing system 100 according to the first embodiment can transmit and receive an image accompanied by appropriate information.

Supplemental Information

In the image encoding in the transmission process (S506) illustrated in FIG. 7, if both the main image and the sub-information are data encoded in advance in accordance with H.265/HEVC, the server 300 may combine the main image and the sub-information. Then, the server 300 rewrites the header portion so that the total number of tiles, which is the sum of the number of tiles for the main image and the number of tiles for the sub-information, is included as the number of tiles in the image, so that a bit stream including the main image and the sub-information is constructed.

In contrast, for example, if the main image is data encoded in accordance with H.264/AVC and the sub-information is text data, Joint Photographic Experts Group (JPEG) data, or the like, an image including the main image and the sub-information may be re-encoded so as to comply with H.265/HEVC in its entirety.

Even if both the main image and the sub-information are data encoded in advance in accordance with H.265/HEVC, the server 300 may re-encode an image including the main image and the sub-information so as to avoid a reference to outside the screen. For example, if a tile located in an edge portion of the main image includes a block that has a reference to outside the screen (or a reference to outside the picture), merely rewriting of only the header portion may cause a reference to a tile for the sub-information. Thus, the server 300 may re-encode an image including the main image and the sub-information so as to avoid a reference to the outside the screen.

In some cases, the selected sub-information and a prepared area may not match. For example, the sub-information has a large amount of data including a moving image and a tile that is small to such an extent that it is difficult to visually observe a moving image is prepared for the sub-information. In these cases, the server 300 may convert the sub-information. Specifically, the server 300 may extract text data from the moving image in the sub-information, and the sub-information may be replaced with the extracted text data before the main image and the sub-information are encoded.

Figure 17:
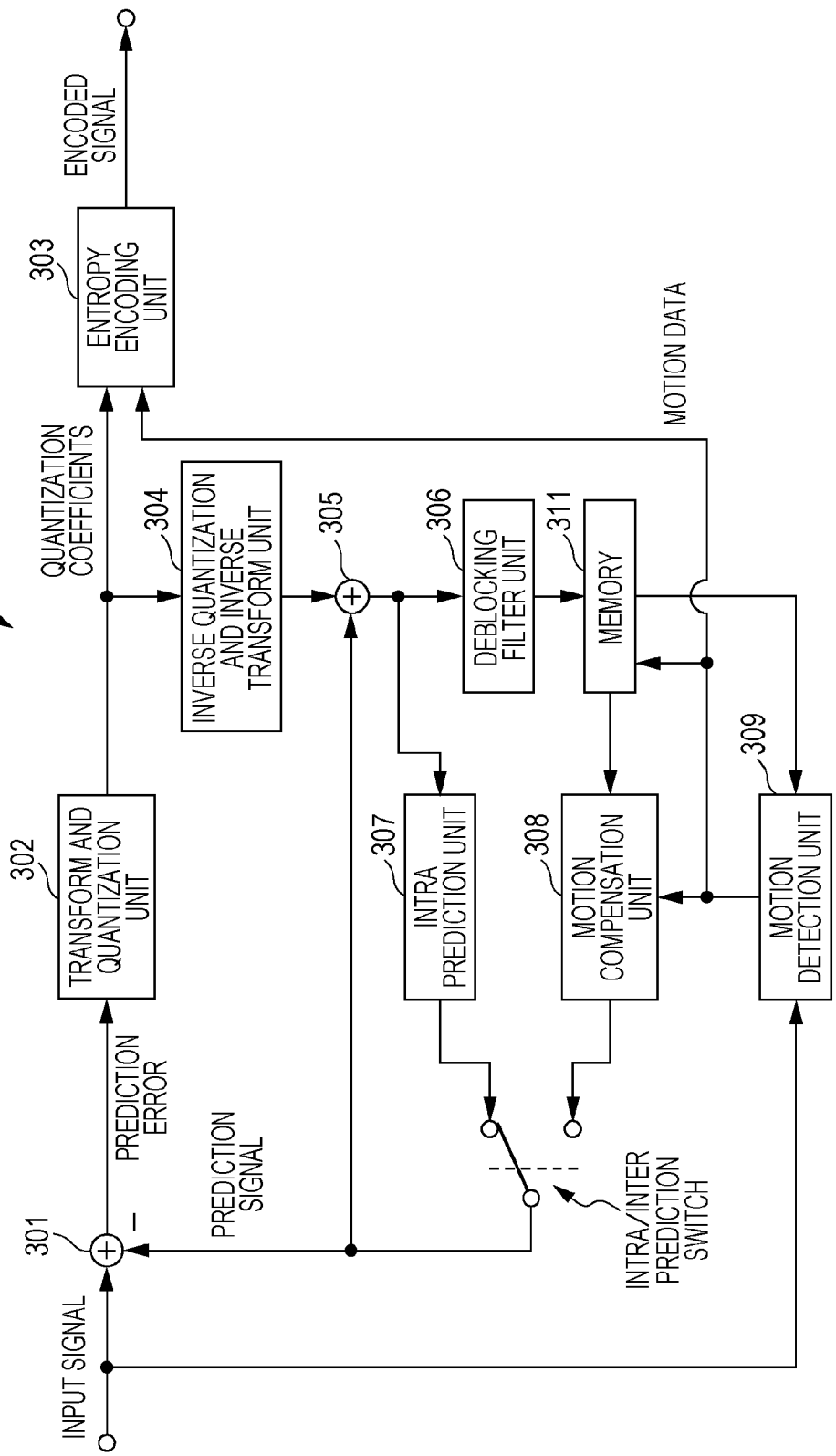
FIG. 17 is a block diagram illustrating an example configuration of a processing unit of a server according to the first embodiment.

FIG. 17 is a block diagram illustrating an example configuration of the processing unit 310 of the server 300 illustrated in FIG. 3. The encoding process described above is performed by the processing unit 310 having the configuration illustrated in FIG. 17. The processing unit 310 illustrated in FIG. 17 includes a subtraction unit 301, a transform and quantization unit 302, an entropy encoding unit 303, an inverse quantization and inverse transform unit 304, an adder unit 305, a deblocking filter unit 306, an intra prediction unit 307, a motion compensation unit 308, a motion detection unit 309, and a memory 311.

The subtraction unit 301 subtracts a value indicated by a prediction signal from a value indicated by an input signal to obtain a prediction error, and outputs the prediction error. The transform and quantization unit 302 performs a frequency transform and quantization on the prediction error to obtain quantization coefficients, and outputs the quantization coefficients. The entropy encoding unit 303 performs entropy encoding on the quantization coefficients to obtain an encoded signal, and outputs the encoded signal. The inverse quantization and inverse transform unit 304 performs inverse quantization and an inverse frequency transform on the quantization coefficients. The adder unit 305 adds together the prediction error obtained by inverse quantization and inverse frequency transformation and the value indicated by the prediction signal, and outputs a pixel value.

The deblocking filter unit 306 removes block noise in an image formed of pixel values. The intra prediction unit 307 performs intra prediction with reference to a pixel value in the picture to be encoded. The motion compensation unit 308 performs inter prediction with reference to a pixel value in a picture different from the picture to be encoded. The motion detection unit 309 performs motion detection in accordance with the input signal and a picture stored in the memory 311 to obtain motion data, and outputs the motion data. The memory 311 stores a picture reconfigured using the sum of the prediction error and the value indicated by the prediction signal or the like.

The memory 311 may be the storage unit 320 included in the server 300, or may be a memory specific to the processing unit 310.

If the decoding apparatus 200 does not support H.265/HEVC, the server 300 may use a transmission method in which the main image and the sub-information are encoded using the corresponding encoding scheme and are packetized and delivered as separate streams. In this case, the decoding apparatus 200 may display the main image and the sub-information so that the main image corresponds to the entire screen and the sub-information is superimposed on an area that is a portion of the main image. In this transmission method, furthermore, packets including sub-information may be frequently transmitted to prevent the occurrence of missing data.

In a case where H.265/HEVC is used, priority may be set in advance so that sub-information of information regarded as having higher priority, such as typhoon information, may be more preferentially frequently embedded than, for example, advertisements. In addition, a request may be received from the decoding apparatus 200 to exclude the display of specific information, and the selection operation may be controlled so that the specific information is not selected in the subsequent image.

Second Embodiment

A second embodiment provides another example of a decoding method, a display method, and a management method in an image processing system 100 having a configuration similar to that in the first embodiment. Also in the second embodiment, a bit stream includes information for specifying a constraint for motion prediction or motion compensation.

In the second embodiment, when the user starts to view a main image, the decoding apparatus 200 displays one or more modes on the display unit 250 as one or more options in accordance with a user operation or automatically. A mode corresponds to a manner of division of a screen (or a picture). That is, the decoding apparatus 200 displays how a screen is divided into a plurality of tiles, for each of the one or more modes, on the display unit 250.

Figure 18:
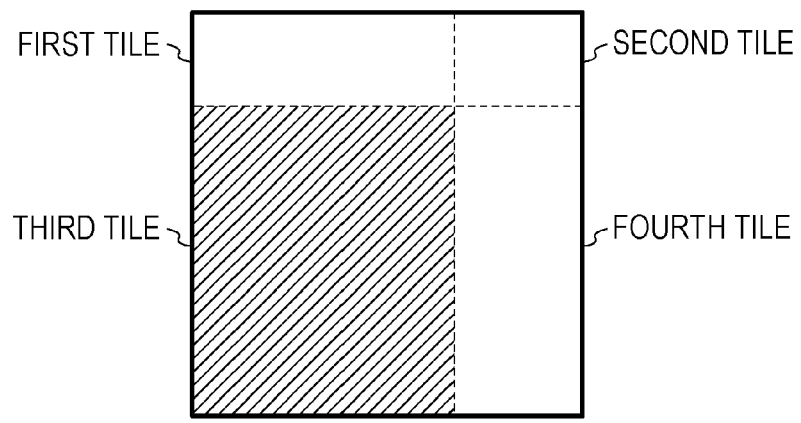
FIG. 18 is a diagram illustrating an example display in a first mode according to a second embodiment.
Figure 19:
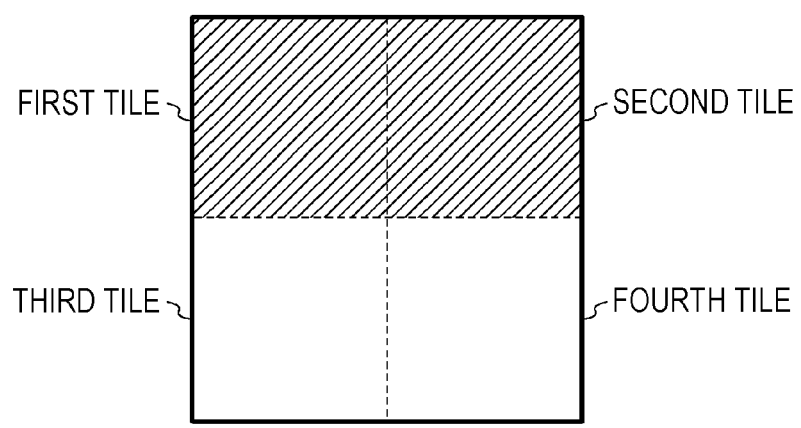
FIG. 19 is a diagram illustrating an example display in a second mode according to the second embodiment.
Figure 20:
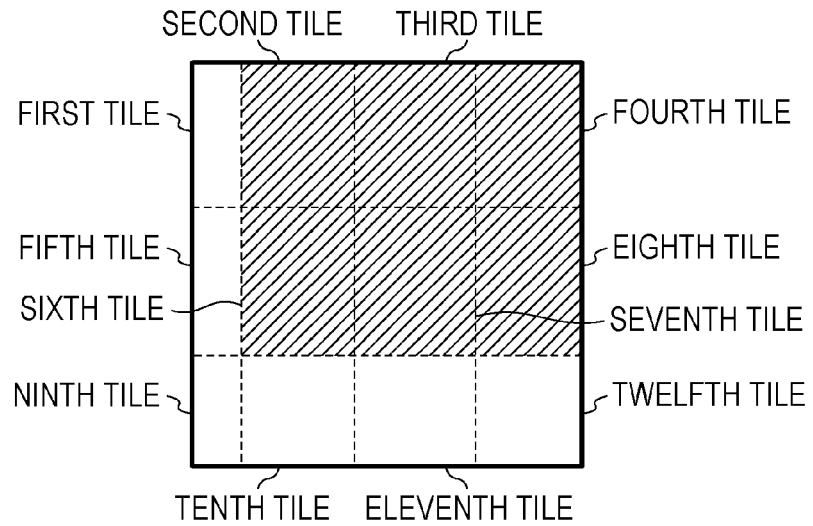
FIG. 20 is a diagram illustrating an example display in a third mode according to the second embodiment.

FIGS. 18 to 20 illustrate an example of the display of individual modes. In FIGS. 18 to 20, an area displayed shaded is an area where a main image is mainly displayed. A user selects one mode from among one or more modes. The decoding apparatus 200 receives a bit stream including a main image and sub-information from the server 300 in the manner of division corresponding to the selected mode.

In the second embodiment, in the decoding apparatus 200, which is a terminal on which the user views the main image, a display area is divided into a plurality of tiles in accordance with user preference. The user is able to view the main image using the desired tile. Further, for example, the decoding apparatus 200 superimposes the sub-information on a portion of the main image so that any other application such as email or a game appears in foreground. The decoding apparatus 200 may simultaneously execute a plurality of applications.

In addition, selecting a mode at the start of viewing results in suppression of, during viewing, the occurrence of a request to change the location where the sub-information is to be displayed. Thus, the server 300 can transmit a stream originally held therein to the decoding apparatus 200 in accordance with one or more modes without changing the encoding format.

The decoding apparatus 200 displays individual modes so that the user may easily identify which mode is suitable for viewing. For example, the decoding apparatus 200 may show, for each mode, tile boundaries as broken lines or the like, the boundaries between the area for the main image and the area for the sub-information as bold lines, or the area of the main image and the area of the sub-information using different colors.

In the foregoing, a user selects a mode. Alternatively, the server 300 may determine an initial mode, which corresponds to division into tiles and allocation to tiles, in accordance with the content of the main image or environments such as the degree of distribution network traffic. Then, the decoding apparatus 200 may display the main image and the sub-information in the initial mode.

Accordingly, the server 300 allows the user to view the main image and the sub-information with more appropriate division and allocation in accordance with the content of the main image and so forth. In addition, unauthorized deletion or alteration of sub-information to be viewed, such as emergency disaster information, may be suppressed. Further, the decoding apparatus 200 may display the latest MPD file, and may accept the input of a reselected mode from the user using a modification in the MPD file as a trigger.

Third Embodiment

A third embodiment provides another example of a decoding method, a display method, and a management method in an image processing system 100 having a configuration similar to that in the first embodiment. Also in the third embodiment, a bit stream includes information for specifying a constraint for motion prediction or motion compensation.

As illustrated in the first and second embodiments, in a case where the display method of a main image and sub-information is changed in accordance with a user operation, the decoding apparatus 200 or the server 300 may hold information on the user operation or the viewing type. Further, the decoding apparatus 200 may display an image by receiving and decoding a bit stream for displaying more appropriate sub-information in accordance with the held information.

For example, a user may perform an operation of enlarging an advertisement for automobiles while performing an operation of deleting or reducing other advertisements, or may select a tile in which an advertisement for automobiles is displayed and access a uniform resource locator (URL) defined in an MPD file or the like. In this case, the decoding apparatus 200 may request the server 300 to generate a bit stream that shows a large number of advertisements for automobiles. Alternatively, the server 300 may initially select the above-described bit stream.

Fourth Embodiment

A fourth embodiment provides another example of an image processing system for decoding an image from a bit stream in which the image is divided into a plurality of tiles and is encoded, a method for decoding the image, and a method for generating the bit stream.

In particular, in the fourth embodiment, the bit stream includes information for enabling a parallel implementation of encoding and decoding. For example, an image is divided into a plurality of areas each referred to as a tile. The bit stream includes information that is capable of specifying a constraint for motion prediction or motion compensation such that a motion prediction process or a motion compensation process includes a reference to only pixels in one or more corresponding tiles in an image signal at the same time or image signals at different times.

Explanation of Configuration

Figure 21:
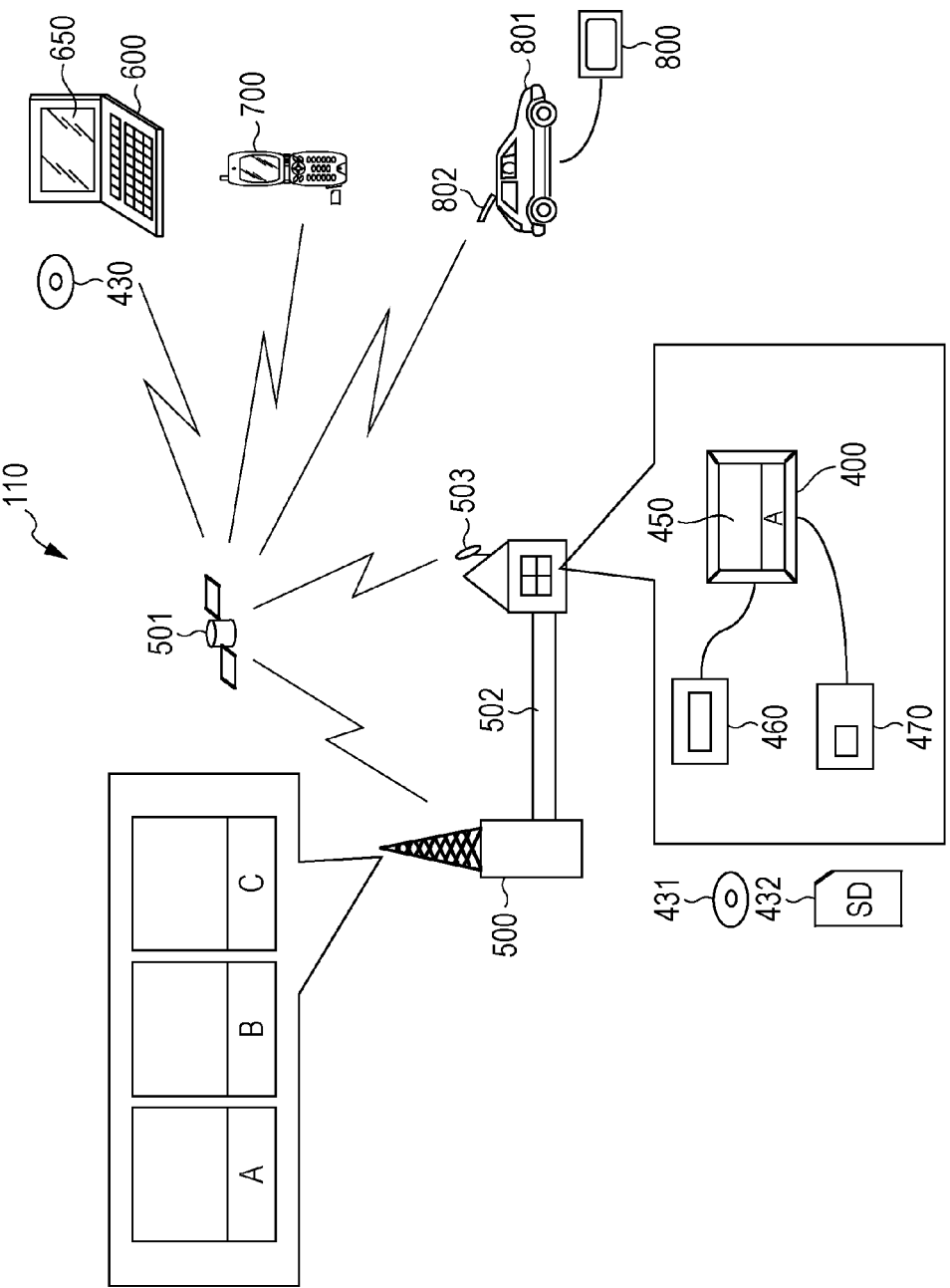
FIG. 21 is a schematic diagram illustrating an example configuration of a broadcast system according to a fourth embodiment.

FIG. 21 illustrates an example configuration of a broadcast system 110 according to the fourth embodiment. A television (TV) 400, a set-top box (STB) 460, a reader/recorder 470, a reproducing apparatus 600, a mobile phone (or smartphone) 700, and a car navigation system 800 each correspond to the decoding apparatus 200 in the first embodiment. A monitor 450 and a monitor 650 each correspond to the display unit 250 in the first embodiment. A recording medium 430, a recording medium 431, and a recording medium 432 each correspond to the storage unit 220 in the first embodiment.

A broadcast station 500 corresponds to the server 300 in the first embodiment. One of the TV 400, the STB 460, the reader/recorder 470, the reproducing apparatus 600, the mobile phone (or smartphone) 700, and the car navigation system 800 may be included in the broadcast system 110 as an apparatus that receives a broadcast. That is, not all of the above-described apparatuses and devices may be included in the broadcast system 110 as apparatuses that receive a broadcast.

The broadcast station 500 transmits multiplexed data, which is obtained by multiplexing encoded music data or the like onto encoded video data, to a satellite 501 by radio wave. Upon receipt of the radio wave from the broadcast station 500, the satellite 501 sends a broadcasting radio wave, and a home antenna 503 capable of receiving satellite broadcasts receives the broadcasting radio wave. The multiplexed data may be transmitted via a cable 502. An apparatus such as the TV (receiver) 400 or the STB 460 decodes the received multiplexed data, displays an image on the monitor 450, and outputs audio from a speaker.

An antenna 802 of a vehicle 801 may receive the radio wave. In this case, the car navigation system 800 displays an image in a manner similar to that of the TV 400.

In addition, the reader/recorder 470, which includes the processing units 210 and 310 (i.e., a decoding processing unit and an encoding processing unit) illustrated in FIG. 4 and FIG. 17, records and reproduces the received multiplexed data onto and from the recording medium 431 or 432, examples of which include a hard disk drive (HDD), a digital versatile disc (DVD), a Blu-ray Disc (BD), and a Secure Digital (SD) card. The decoded video and audio are output via the monitor 450 or via a speaker. In addition, another apparatus or another system can reproduce video and audio via the recording medium 431 or 432 having the multiplexed data recorded thereon.

In addition, the STB 460 connected to the cable 502 for cable TV or connected to the antenna 503 for satellite/terrestrial broadcasts may have mounted therein the processing unit 210 illustrated in FIG. 4, and video may be displayed on the monitor 450 of the TV 400 via the STB 460. In addition, the TV 400 may have incorporated therein the processing unit 210 illustrated in FIG. 4.

Figure 22:
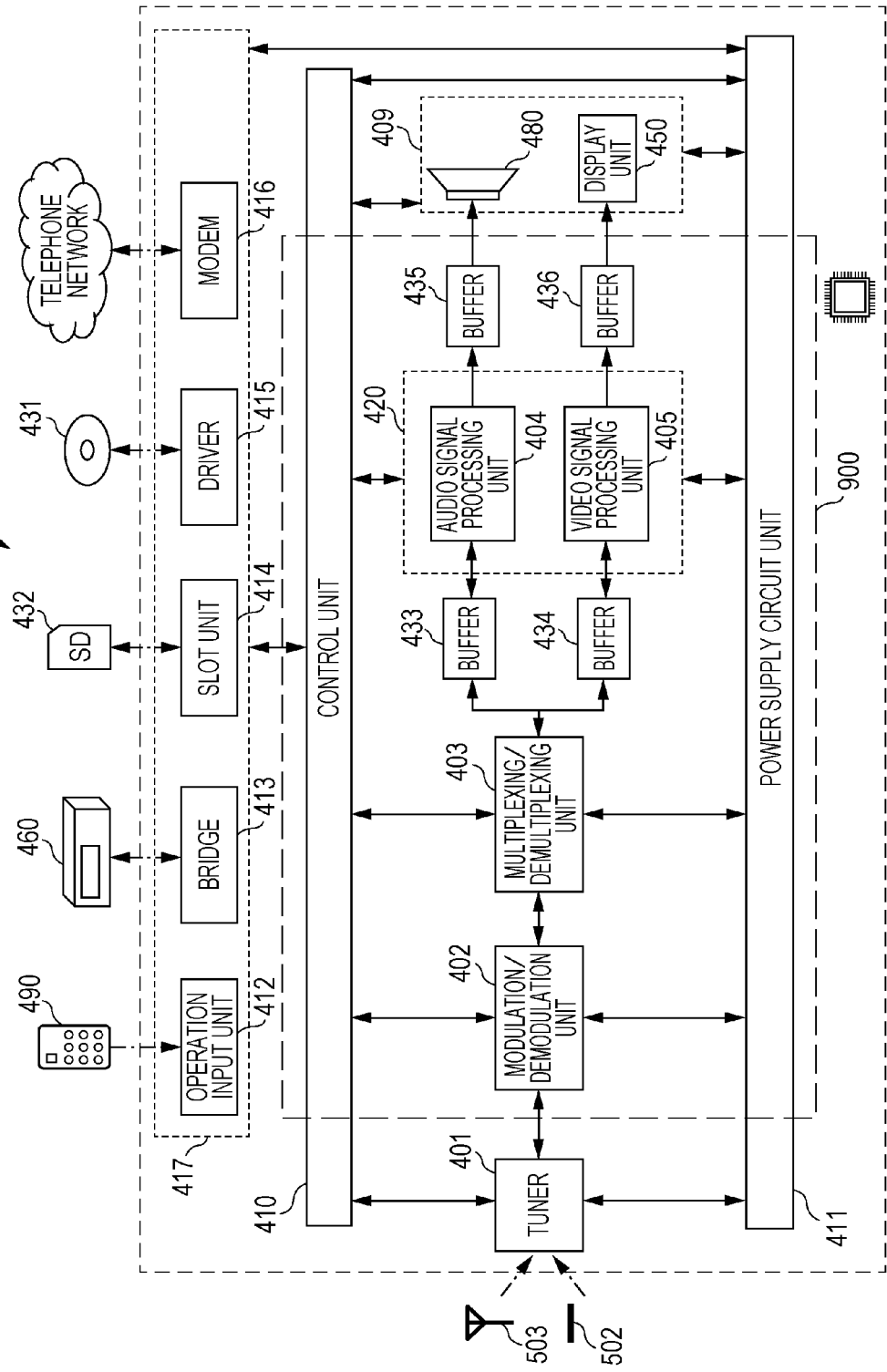
FIG. 22 is a block diagram illustrating an example configuration of a television according to the fourth embodiment.

FIG. 22 is a block diagram illustrating an example configuration of the TV 400. A tuner 401, a modulation/demodulation unit 402, and a multiplexing/demultiplexing unit 403 receive a multiplexed stream, demodulate the multiplexed stream, and separate the stream into audio data and video data. A signal processing unit 420 including an audio signal processing unit 404 and a video signal processing unit 405 performs a decoding process on the audio data and the video data, and the audio data and the video data are output from a speaker 480 and a display unit 450 in an output unit 409.

The TV 400 includes a power supply circuit unit 411 for supplying power to each unit of the TV 400. The TV 400 further includes an LSI device 900, and some constituent elements are included in the LSI device 900.

Further, the TV 400 is controlled by an external remote controller 490 or the like, and the TV 400 further includes an interface unit 417 for controlling an external peripheral device. The interface unit 417 includes an operation input unit 412, a bridge 413, a slot unit 414, a driver 415, and a modem 416. A plurality of other constituent elements also cooperate with each other under control of a control unit 410 to perform receiving, decoding, and display operations.

The control unit 410, the signal processing unit 420, and the display unit (or monitor) 450 correspond to the control unit 240, the processing unit 210, and the display unit 250 in the first embodiment, respectively. The recording medium 431, the recording medium 432, a buffer 433, a buffer 434, a buffer 435, and a buffer 436 each correspond to the storage unit 220 in the first embodiment.

Explanation of Operation

Figure 23:
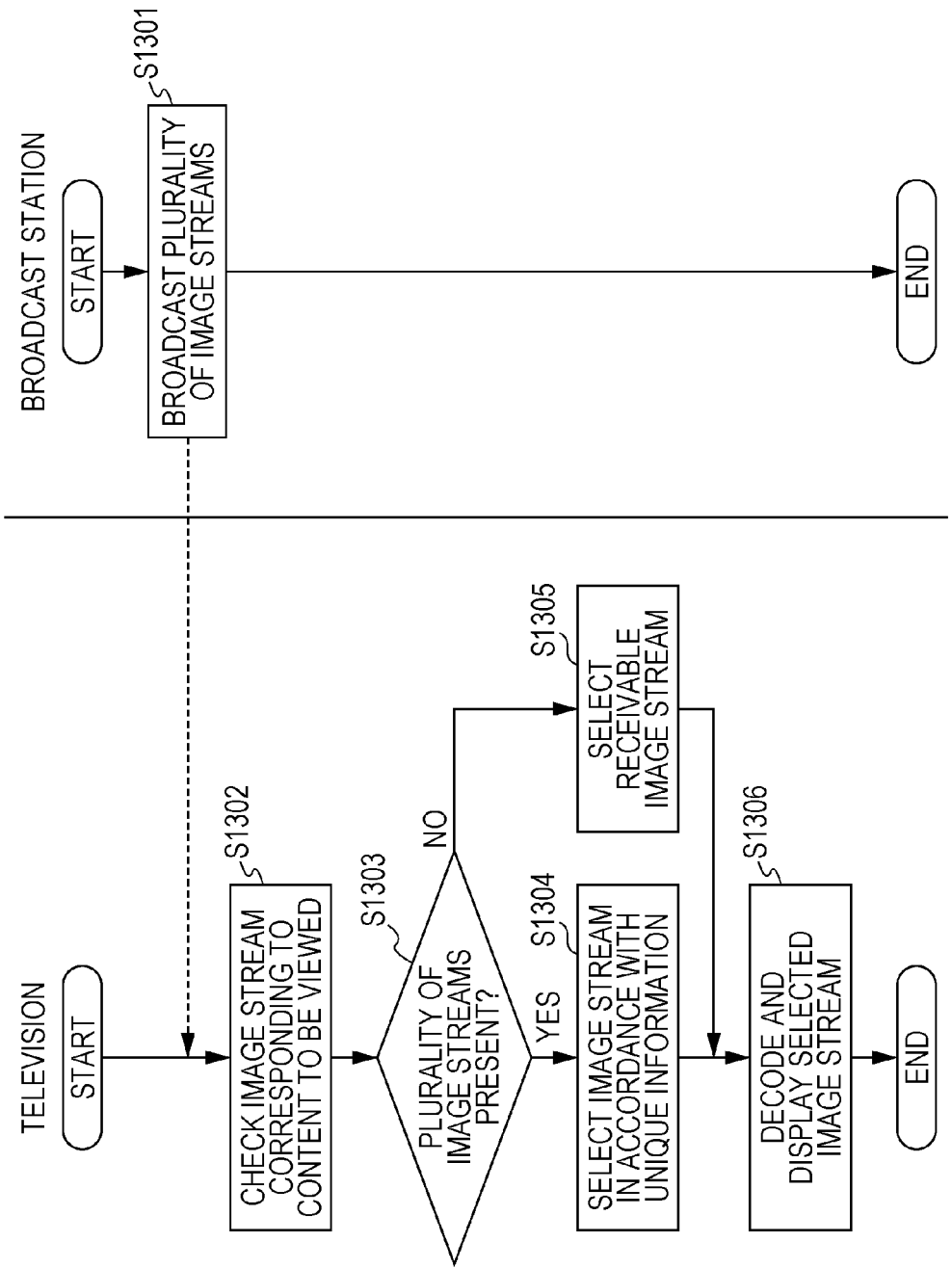
FIG. 23 is a diagram illustrating an example of the processing flow of the broadcast system according to the fourth embodiment.

FIG. 23 illustrates an example of the processing flow of the broadcast system 110 according to the fourth embodiment. First, the broadcast station 500 broadcasts a plurality of image streams corresponding to a plurality of pieces of content without receiving a request from the TV 400 (S1301). Each of the plurality of image streams is a stream in which, for example, one main image corresponding to one channel and the sub-information illustrated in the first embodiment are encoded using a plurality of tiles into which a screen (or a picture) is divided.

In the first embodiment, sub-information is selected from among a plurality of candidates in accordance with additional information obtained from the decoding apparatus 200. In the fourth embodiment, sub-information is selected in advance from among a plurality of candidates.

Here, the sub-information is encoded as a tile. The sub-information mainly includes high-priority information as illustrated in the first embodiment. The sub-information may include information including a headline in which low-priority information is summarized. The detailed content of the sub-information may be associated with a tile and may be delivered as an additional separate stream.

The TV 400 checks an image stream corresponding to the content to be viewed (S1302). Then, the TV 400 determines whether or not there are a plurality of image streams corresponding to the content to be viewed (S1303). For example, the TV 400 determines whether or not there are a plurality of candidates for the main image which correspond to a plurality of different coding standards or a plurality of different coding levels. The TV 400 further determines whether or not there are a plurality of candidates for the sub-information encoded as a tile.

If there are a plurality of candidates for the main image (YES in S1303), the TV 400 selects a candidate capable of being received and decoded with high quality and high efficiency as a main image. If there are a plurality of candidates for the sub-information, the TV 400 selects sub-information from among the plurality of candidates in accordance with the position information, user information, or the like held therein. For example, the selection of sub-information is similar to that in the example illustrated in the first embodiment. Accordingly, the TV 400 selects an image stream in accordance with unique information (S1304).

If it is determined that there are not a plurality of image streams (NO in S1303), the TV 400 selects a receivable image stream (S1305). Then, the TV 400 decodes the image stream selected in the selection process (S1304, S1305), and displays the decoded image stream on the monitor 450 (S1306).

Advantages

In the manner described above, the broadcast station 500 divides a screen (or a picture) into a plurality of tiles, and encodes a selected main image and selected sub-information as different tiles.

Accordingly, the TV 400 can receive an image accompanied by appropriate information in the form of a single stream. In addition, the broadcast station 500 can transmit sub-information so that the sub-information will not be altered by an apparatus or system that receives or relays the sub-information into an unintended form. Thus, the TV 400 can receive appropriate sub-information.

In the manner described above, the TV 400 in the fourth embodiment can receive an image accompanied by appropriate information.

Supplemental Information

The selection method, encoding method, decoding method, transmission method, and display method illustrated in the first to third embodiments are also applicable to the fourth embodiment.

For example, the quality of the main image may be changed, the viewing channel may be switched, a commercial break (hereinafter sometimes referred to as a "CM") may be inserted, or a user may give instructions to directly change sub-information. If the MPEG2 system is used, a notification of a change in a tile constituting content may be sent using program information, event information, or the like. The TV 400 may accept reselection of a tile (for sub-information or the like) by using the change of the tile as a trigger.

A piece of content is broadcast in association with a channel. However, in an image having a large size, such as an 8k4k image, a piece of content may be broadcast on a plurality of channels. In addition, a portion of an image may be transmitted and received via broadcasting, and a portion of an image may be transmitted and received via communication. That is, an image may be transmitted and received using a plurality of transmission paths.

In some cases, one candidate for the main image (or one main image) may be present on one channel. In other cases, a plurality of candidates for the main image which have different coding standards or levels may be present on one channel.

Fifth Embodiment

A fifth embodiment provides another example of an image processing system for decoding an image from a bit stream in which the image is divided into a plurality of tiles and is encoded, a method for decoding the image, and a method for generating the bit stream.

In particular, also in the fifth embodiment, a bit stream includes information for enabling a parallel implementation of encoding and decoding. For example, an image is divided into a plurality of areas each referred to as a tile. The bit stream includes information that is capable of specifying a constraint for motion prediction or motion compensation such that a motion prediction process or a motion compensation process includes a reference to only pixels in one or more corresponding tiles in an image signal at the same time or image signals at different times.

Overview

The HEVC scheme and the like enable transmission and reception of image data with large format and high definition, such as 8k4k. However, a mobile terminal that receives the image data may not necessarily be suitable to display a large image. In addition, a user may be interested in only a portion of a large image, and may wish to view the portion of the image in detail. Furthermore, such an area may change with time.

In addition, some image data may be less affected by the viewing of only a portion of the image. Other image data may be data in which an image will be difficult to understand if the entirety of the image is not viewed.

In the fifth embodiment, a partial range of an image is selected, and appropriate decoding and appropriate display are performed. More specifically, in a case where content including both image data that is suitable for viewing a clipped portion of an image, such as image data for a soccer game, and image data suitable for viewing an entire image, such as image data for a commercial advertisement, is received and viewed, comfortable viewing is achieved.

Explanation of Configuration

A configuration according to the fifth embodiment is similar to that of the first embodiment (FIG. 3 and FIG. 4), and is not described here.

Explanation of Operation

Figure 24:
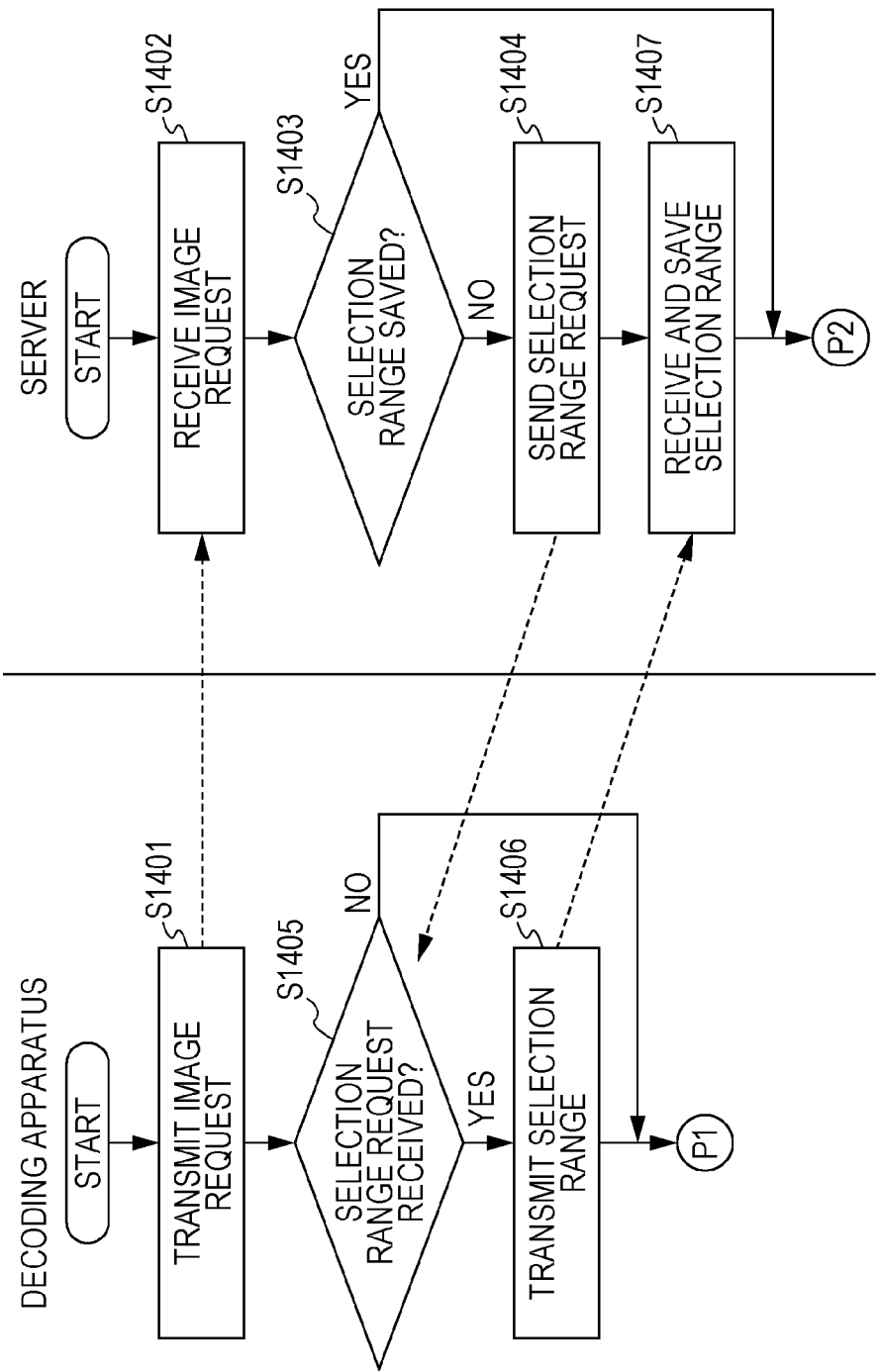
FIG. 24 is a diagram illustrating an example of the processing flow of an image processing system according to a fifth embodiment.
Figure 25:
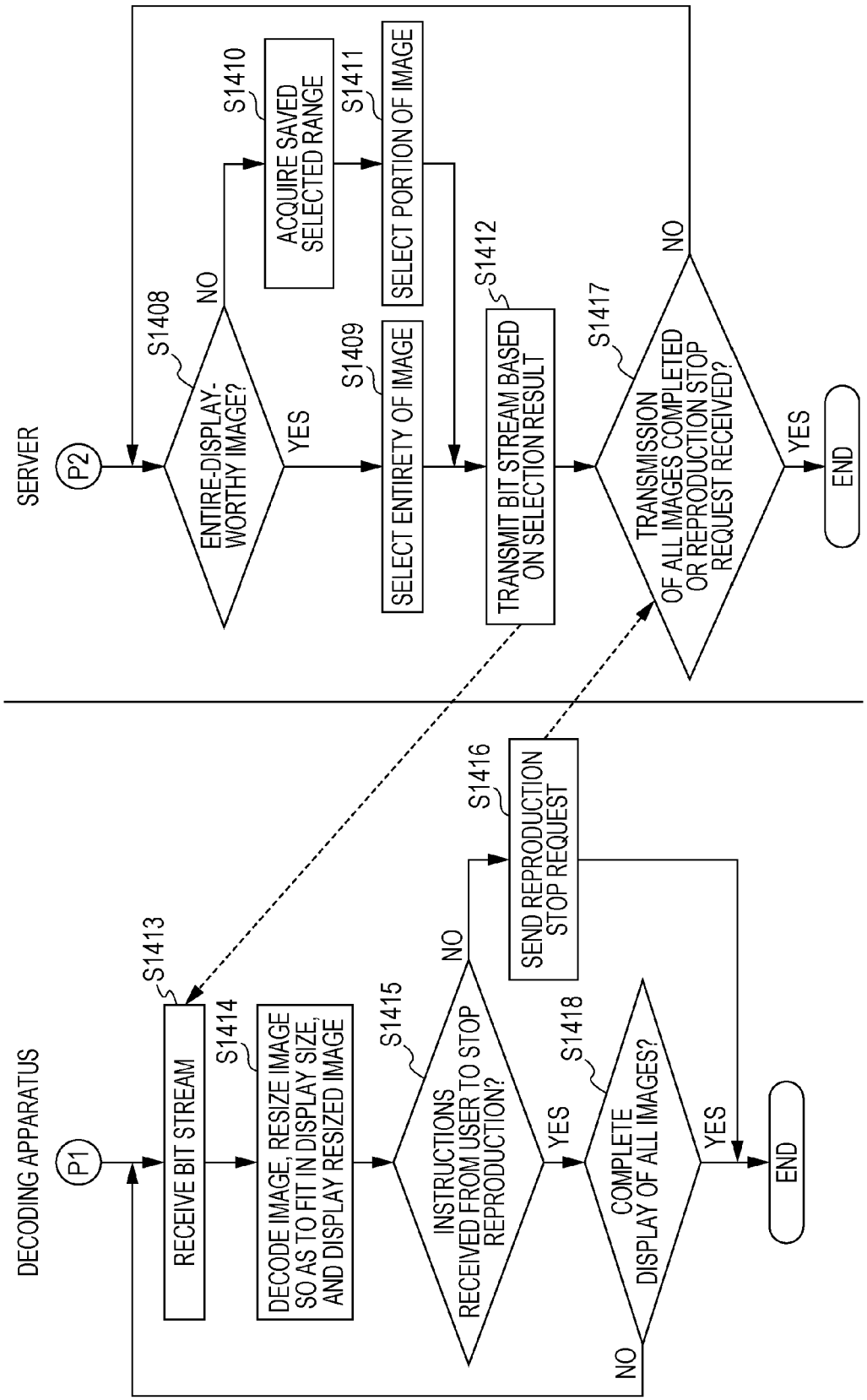
FIG. 25 is a diagram illustrating the example (continued) of the processing flow of image processing system according to the fifth embodiment.

FIG. 24 and FIG. 25 are diagrams illustrating the processing flow of the operation of the image processing system 100 according to the fifth embodiment.

The decoding apparatus 200 transmits a request for an image to be viewed to the server 300 (S1401). More specifically, the decoding apparatus 200 requests the server 300 to transmit an image stream (or an image sequence) including a plurality of images to be viewed. The server 300 receives the request for the image (S1402).

Further, the server 300 determines whether or not a selection range (or selection position) that is the range of an area to be reproduced in the image has been saved (S1403). If the selection range has not been saved (NO in S1403), the server 300 requests the decoding apparatus 200 to transmit the selection range (S1403). Upon receipt of the request for the selection range (YES in S1405), the decoding apparatus 200 transmits the selection range to the server 300 (S1406). The server 300 receives the selection range, and saves the received selection range (S1407).

Then, the server 300 determines whether or not an image to be transmitted within the image stream is an entire-display-intended image (S1408). The entire-display-intended image is an image suitable for display in its entirety. If the image is an entire-display-intended image (YES in S1408), the server 300 selects the entirety of the image regardless of the selection range specified by the decoding apparatus 200 (S1409).

If the image to be transmitted is not an entire-display-intended image (NO in S1408), the server 300 acquires the selection range saved in the saving process (S1407) or a selection range which has been previously saved (S1410). Then, the server 300 selects a portion of the image in accordance with the acquired selection range (S1411).

Then, the server 300 transmits a bit stream including the selected entirety or portion of the image to the decoding apparatus 200 (S1412). The decoding apparatus 200 receives the bit stream transmitted from the server 300 (S1413).

Similarly to the first embodiment, the transmitted and received bit stream is generated by the encoding of the image using an MV-constrained tile. As illustrated in FIG. 2, the block to be processed in the MV-constrained tile has a reference to a reference area in the range of the corresponding tile for a temporally different image (that is, for another temporally different picture).

For this reason, for example, if the selection range is the second tile illustrated in FIG. 2, an entire bit stream corresponding to the entirety of the image may not necessarily be transmitted and received. In this case, only a portion of the bit stream corresponding to the second tile may be transmitted and received. The decoding apparatus 200 can decode and display an image in the second tile in accordance with the portion of the bit stream corresponding to the second tile.

Then, the decoding apparatus 200 decodes the image from the bit stream. Then, the decoding apparatus 200 resizes (i.e., enlarges or reduces) the decoded image so that the size of the decoded image can fit the display size of the decoding apparatus 200, and displays the resulting image (S1414).

If the decoding apparatus 200 receives instructions from the user to stop reproduction (YES in S1415), the decoding apparatus 200 transmits a reproduction stop request to the server 300 (S1416). Otherwise (NO in S1415), the decoding apparatus 200 repeatedly performs the receiving, decoding, and displaying operations (S1413 and S1414) until the display of all the images in the image stream is completed (S1418).

Further, the server 300 repeatedly performs the selection and transmission operations (S1408 to S1412) until the server 300 receives a reproduction stop request from the decoding apparatus 200 or until the transmission of all the images in the image stream is completed (S1417).

Advantages

With the operations described above, for an entire-display-intended image, reproduction of the image is automatically switched to reproduction of the entirety of the image regardless of the selection range. Thus, user convenience may be improved.

More specifically, when selecting the entirety or a portion of an image, the server 300 determines whether or not the image is an entire-display-intended image. If the image is an entire-display-intended image, the server 300 selects the entirety of the image. If the image is not an entire-display-intended image, the server 300 selects a portion of the image in accordance with the selection range specified and saved by the user or in accordance with a selection range specified during previous reproduction. Accordingly, selection is automatically switched. A more specific example will now be described with FIGS. 26 to 28.

Figure 26:
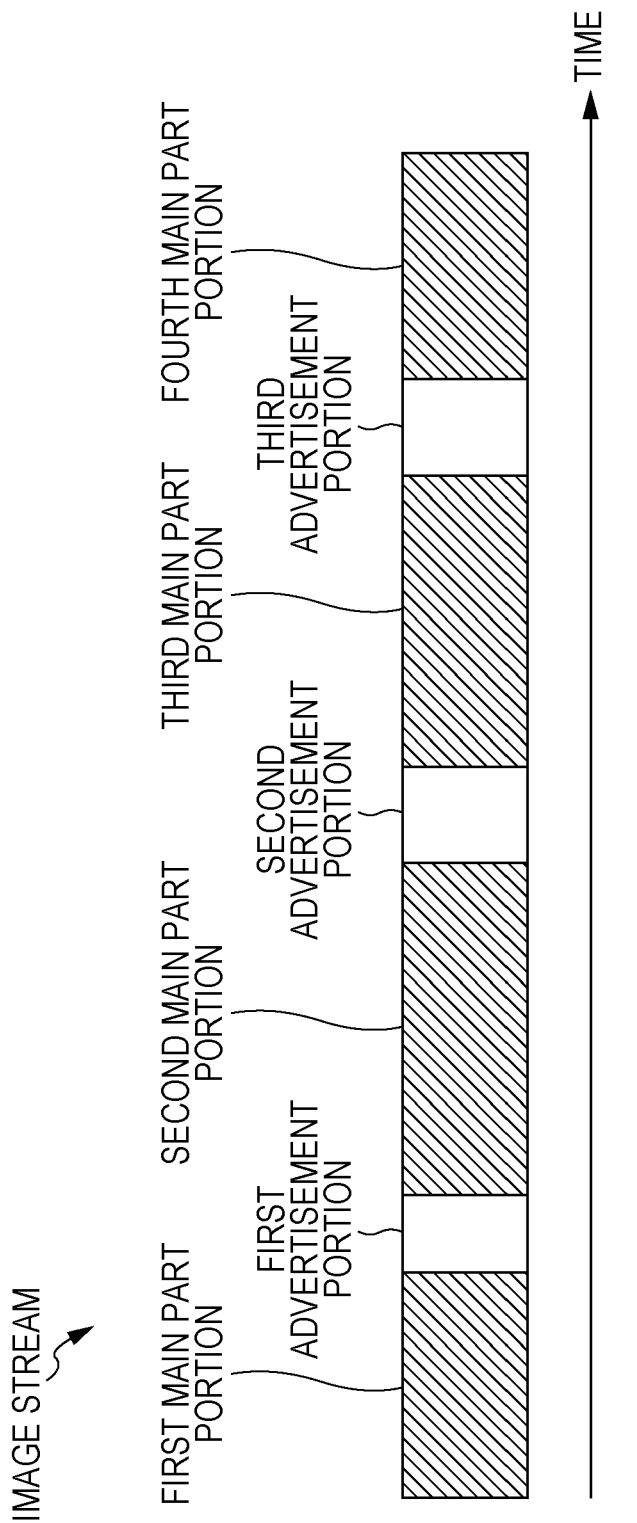
FIG. 26 is a diagram illustrating an example of the timing at which display of the entirety of an image and display of a portion of the image are switched according to the fifth embodiment.

FIG. 26 is a diagram illustrating an example of the timing at which entire display and partial display are switched. Specifically, FIG. 26 illustrates an example of an image stream selected by a user. In the illustrated example, the image stream has three commercial breaks (or advertisement portions) between four scenes (or main part portions). The images included in the first to fourth main part portions are not entire-display-intended images, and the images included in the first to third advertisement portions are entire-display-intended images.

Figure 27:
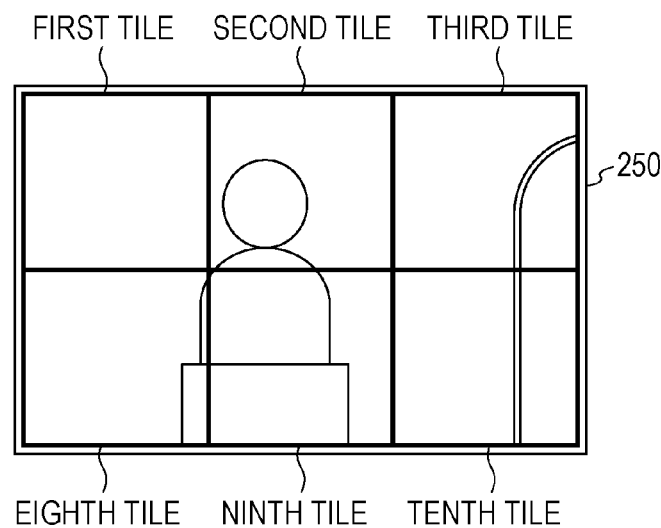
FIG. 27 is a diagram illustrating an example of partial display according to the fifth embodiment.

FIG. 27 is a diagram illustrating an example of partial display. Specifically, FIG. 27 illustrates an example of a portion of the image in the first main part portion of the image stream specified by the user, and illustrates an example in which the range of the upper left six tiles in the entire image illustrated in FIG. 12 is selected.

Figure 28:
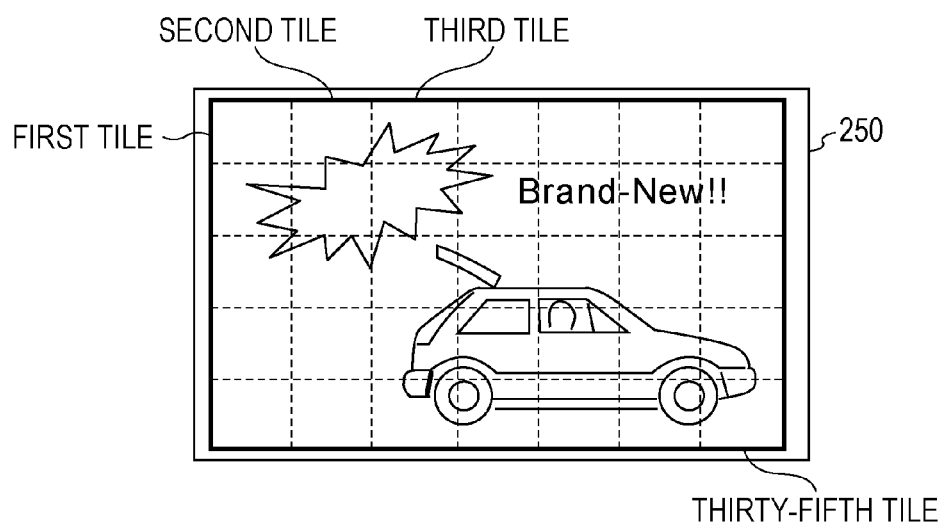
FIG. 28 is a diagram illustrating an example of entire display according to the fifth embodiment.

FIG. 28 is a diagram illustrating an example of entire display. Specifically, FIG. 28 illustrates an example of the image of the first advertisement portion. The image of the first advertisement portion may or may not be divided into a plurality of tiles. Hereinafter, the operation of the image processing system 100 will be described with reference to FIG. 26 to FIG. 28.

First, the decoding apparatus 200 selects the image stream illustrated in FIG. 26 in accordance with a user operation, and requests the server 300 to transmit the selected image stream. The decoding apparatus 200 accepts a selection range from the user so that the portion illustrated in FIG. 27 is reproduced, and transmits the selection range to the server 300.

The server 300 transmits a bit stream indicating the portion of the image illustrated in FIG. 27 for the first main part portion illustrated in FIG. 26. The server 300 further transmits a bit stream indicating the entirety of the image illustrated in FIG. 28 at the time when the image to be processed is switched to the image of the first advertisement portion. The decoding apparatus 200 displays an image obtained by decoding a bit stream. In some cases, the size of the image illustrated in FIG. 27 or FIG. 28 may not necessarily match the size of the display unit 250 of the decoding apparatus 200. In those cases, the decoding apparatus 200 enlarges or reduces the image before displaying the image.

The content of a commercial break (or advertisement portion) is generally understood when the entirety of the image of the commercial break is viewed. For this reason, the entirety of an image for a commercial break is displayed. For the other scenes (or the main part portions), in contrast, only a portion of the image is displayed in accordance with the display size of the decoding apparatus 200 or in accordance with a request from a user. Accordingly, reproduction of a portion of the image and reproduction of the entirety of the image are automatically switched without the user giving instructions. Thus, user convenience may be improved.

If the image is not an entire-display-intended image, only a bit stream indicating a portion of the image is transmitted and received. Thus, a block in an image that is not an entire-display-intended image may not necessarily be decoded. In addition, the selection range of a portion of the image changes in accordance with instructions from the decoding apparatus 200 to the server 300 or in accordance with a selection range that has been previously saved. For this reason, a block in an image that is an entire-display-intended image is encoded without any reference to a block in an image that is not an entire-display-intended image.

For example, if the image illustrated in FIG. 12 is not an entire-display-intended image, a portion (or range) that undergoes decoding changes in accordance with instructions from the decoding apparatus 200 or in accordance with the saved selection range. Thus, in some cases, only the first tile may be decoded, and, in other cases, only the second tile may be decoded, depending on the situation. After that, when an entire-display-intended image as illustrated in FIG. 28 is decoded, a decoded portion of the image illustrated in FIG. 12 differs depending on the situation. Thus, a reference from a block in the entire-display-intended image illustrated in FIG. 28 to the image illustrated in FIG. 12 is prohibited.

In addition, a selection range in an image initially specified by the user may be saved in the server 300. The saved selection range may be called and used at the time of a transition from an advertisement portion to a main part portion. This may eliminate the need for the user to specify a selection range again each time reproduction of an advertisement portion is completed.

Specifically, in the example illustrated in FIG. 26, the server 300 reads a selection range initially specified by the user at the time of a transition of the image from the first advertisement portion to the second main part portion, and transmits a bit stream for the second main part portion in accordance with the selection range. Similarly, the server 300 transmits the entirety of the image for the second advertisement portion, transmits a portion of the image for the third main part portion, transmits the entirety of the image for the third advertisement portion, and transmits a portion of the image for the fourth main part portion.

That is, the server 300 acquires a selection range initially specified by the user. After that, the server 300 automatically switches between reproduction of a portion of the image and reproduction of the entirety of the image without acquiring a new selection range. Thus, user convenience may be improved. In addition, the amount of processing for the transmission and reception of information on a selection range from the decoding apparatus 200 to the server 300 may be reduced.

In a case where reproduction of the image is temporarily stopped in accordance with a user operation and the reproduction of the image is resumed after a certain period of time, or in a case where reproduction of the same image is started using another decoding apparatus, re-specification of a selection range is omitted. The above-described operations will be specifically described with reference to FIG. 24 etc.

Upon receipt of a request for an image, the server 300 determines whether or not a selection range has been saved (S1403). If a selection range has been saved (YES in S1403), the server 300 does not request the decoding apparatus 200 to transmit a selection range. That is, if another decoding apparatus has specified a selection range and has reproduced the same image, the selection range has been saved. Thus, the server 300 does not make a request for any selection range.

For example, for the first main part portion in the image stream illustrated in FIG. 26, reproduction of a portion of the image as illustrated in FIG. 27 is started using a mobile phone in response to a user operation. After that, the reproduction is temporarily stopped in the middle of the first main part portion in response to a user operation.

Then, when the reproduction is resumed using a personal computer (PC) in response to a user operation, the server 300 calls the saved selection range, and transmits a bit stream indicating a portion of the image to the PC in accordance with the saved selection range. Then, reproduction of a portion of the image as illustrated in FIG. 27 is started using the PC without receipt of instructions for any selection range from the user.

This may prevent a selection range from being repeatedly specified. Thus, user convenience may be improved. In addition, the amount of processing for the transmission and reception of information on a selection range from the decoding apparatus 200 to the server 300 may be reduced.

Supplemental Information

The server 300 determines whether or not the image is an entire-display-intended image (S1408 in FIG. 25). The determination of whether or not the image is an entire-display-intended image may be based on an explicit specification in SEI or a PPS in the bit stream.

For example, a flag indicating for each image whether or not the image is an entire-display-intended image may be included in a bit stream. The flag may be a flag indicating whether or not to recommend display of the entirety of the image, or may be a flag indicating whether or not to prohibit display of a portion of the image. Specifically, if the flag indicates that display of the entirety of the image is recommended or display of a portion of the image is prohibited, the server 300 determines that the image is an entire-display-intended image. Otherwise, the server 300 determines that the image is not an entire-display-intended image.

In addition, for example, the server 300 may extract a feature of the image and determine whether or not the image is an entire-display-intended image in accordance with the extracted feature in order to reduce the amount of coding or the amount of processing for explicit specification of whether or not the image is an entire-display-intended image.

Furthermore, for a similar purpose, in cases such as when an image is not divided into a plurality of tiles, when the number of tiles is small, or when the manner of division of the current scene is different from that for the preceding scene, the server 300 may determine that the image is an entire-display-intended image. An image that is an entire-display-intended image and an image that is not an entire-display-intended image have largely different content. For this reason, the manner of division into tiles is generally changed at the time of a transmission between those images. Accordingly, the determination of whether or not the image is an entire-display-intended image may be based on a change in the manner of division.

In the example illustrated in FIG. 26, it is determined that the images of the commercial breaks are entire-display-intended images. The determination of whether or not an image is an entire-display-intended image is not limited to that described above. For example, images of emergency news, images of dramas, low-resolution images, and the like may be determined to be entire-display-intended images. For example, images of sports, images of concerts, and the like may be determined not to be entire-display-intended images.

Alternatively, whether or not an image is an entire-display-intended image may be set as desired by the author or provider of the image. Setting an image whose entirety is desirably presented to a user as an entire-display-intended image allows the image to be displayed in accordance with the intention of the author or provider of the image.

In the foregoing, a selection range is specified when reproduction is started. The selection range may be changed during reproduction in accordance with a user operation or in accordance with the display device. In this case, a newly specified selection range is saved again.

In the foregoing, furthermore, if no selection range is saved, the server 300 requests the decoding apparatus 200 to transmit a selection range (S1403, S1404). Alternatively, if no selection range is saved, first, reproduction may be started by using an entire range of the image as a selection range. After that, the selection range may be changed in accordance with instructions for a selection range from the user. Alternatively, reproduction may be started by using a default selection range.

Accordingly, the amount of processing required when reproduction is started may be reduced. In addition, if display of the entirety of the image or the default selection range meets the user's demand, the specification of a new selection range can be omitted.

In addition, the server 300 may save an image selection range for each user. For example, the server 300 saves a selection range for each user ID. If the same user is to reproduce the same image, the server 300 may call the selection range corresponding to the user. Accordingly, even if a plurality of users access the server 300 and reproduce an image, reproduction of the image is started with a selection range previously specified by each individual user. Thus, user convenience may be improved.

The previously specified selection range may be a range determined for an image using absolute coordinates, or may be a range determined on the basis of any other criterion. For example, in a case where one of the members of a pop group is selected in a video clip of live performance of the pop group, an area where the selected member is displayed for each image may be used as a selection range.

In addition, a selection range may be shared by users. Reproduction may be started using a selection range specified by another user. That is, a user may use a selection range specified by another user without specifying a selection range. This may allow a user to use an appropriate selection range, which is selected by another user, without any time-consuming specification.

For example, the image processing system 100 may identify interests, career, or the like of the user in accordance with information such as an SNS account, and recommend a selection range specified by another user who has similar interests, career, or the like.

In the foregoing, furthermore, a selection range is saved in the server 300. The selection range may be saved in an apparatus different from the server 300, or may be saved in the decoding apparatus 200.

For example, in a case where a selection range is saved in the decoding apparatus 200, the decoding apparatus 200 may call the saved selection range when reproduction is started in accordance with a user operation, and transmit the selection range to the server 300. In a case where a selection range is saved in a different apparatus, the decoding apparatus 200 may read the selection range from the different apparatus, and transmit the selection range to the server 300. Alternatively, the server 300 may read a selection range from a different apparatus in response to a request.

Here, reproduction of an image is illustrated. If a portion of an image is to be displayed, the decoding apparatus 200 may decode only an audio portion related to the portion depending on the content of the image.

For example, in a case where, in an image on which a large number of persons appear, each individual person has a separate microphone and a selection range is a range where a specific person appears, the decoding apparatus 200 may decode only a signal from the microphone corresponding to the specific person. In this case, at the time of a transition of the image to an entire-display-intended image, switching for the audio to be decoded is also simultaneously performed so that the audio associated with the entirety of the image is decoded.

Conclusion

The characteristic configuration and characteristic operation of the image processing system illustrated in the fifth embodiment will be given hereinafter.

Figure 29:
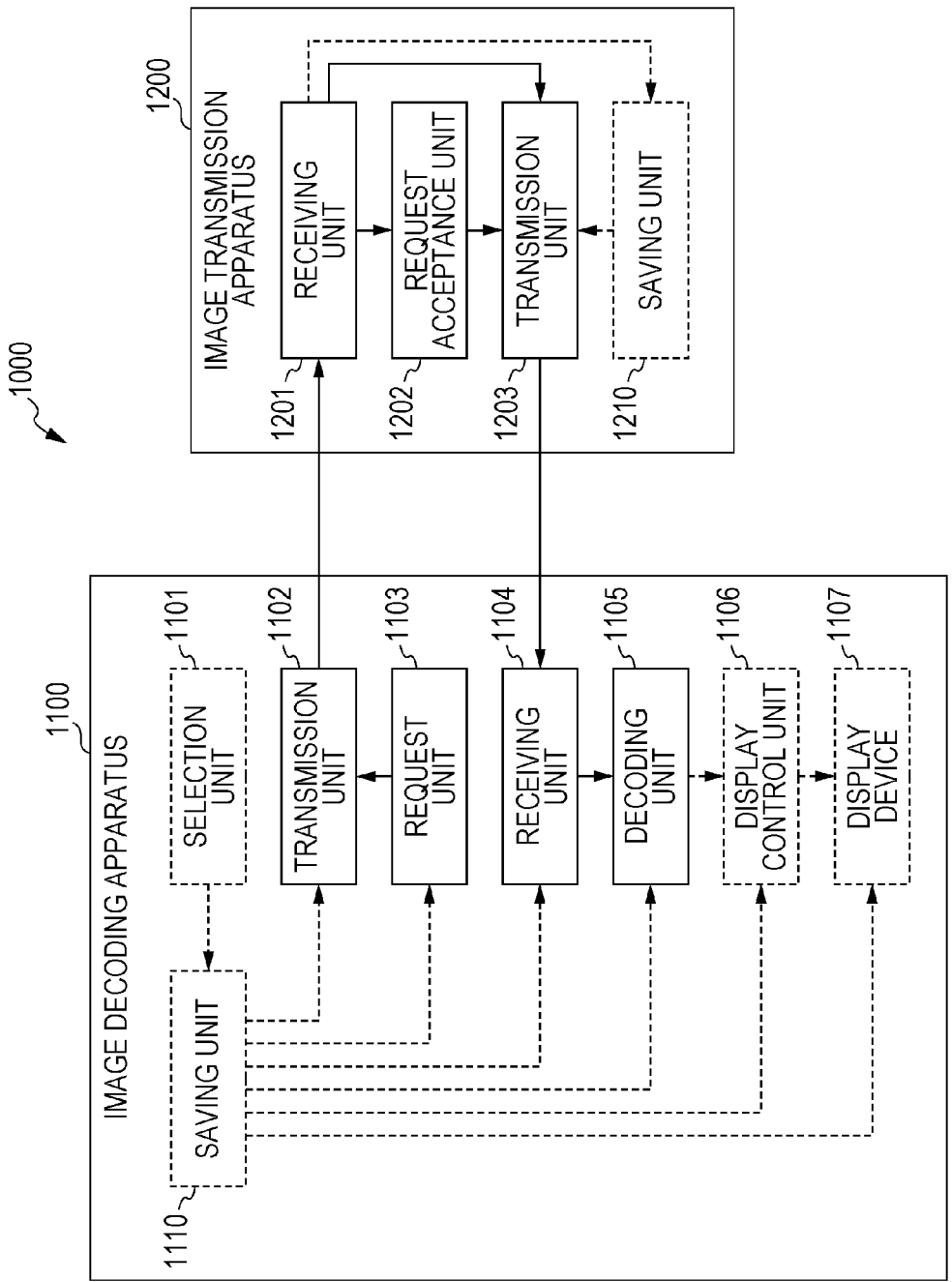
FIG. 29 is a block diagram illustrating an example characteristic configuration according to the fifth embodiment.

FIG. 29 is a block diagram illustrating, as an example, a characteristic configuration of an image processing system according to the fifth embodiment. An image processing system 1000 illustrated in FIG. 29 includes an image decoding apparatus 1100 and an image transmission apparatus 1200. The image decoding apparatus 1100 and the image transmission apparatus 1200 correspond to the decoding apparatus 200 and the server 300 in FIG. 3, respectively.

The image decoding apparatus 1100 includes a selection unit 1101, a transmission unit 1102, a request unit 1103, a receiving unit 1104, a decoding unit 1105, a display control unit 1106, a display device 1107, and a saving unit 1110. In particular, the selection unit 1101, the display control unit 1106, the display device 1107, the saving unit 1110, and so forth may not necessarily be included in the image decoding apparatus 1100. For example, the selection unit 1101, the display control unit 1106, the display device 1107, the saving unit 1110, and so forth may be included in a different apparatus, or may not necessarily be included in the image processing system 1000.

The selection unit 1101, the request unit 1103, and the decoding unit 1105 mainly correspond to the processing unit 210 illustrated in FIG. 3. The transmission unit 1102 and the receiving unit 1104 mainly correspond to the communication unit 230 illustrated in FIG. 3. The display control unit 1106 mainly corresponds to the control unit 240 illustrated in FIG. 3. The display device 1107 mainly corresponds to the display unit 250 illustrated in FIG. 3. The saving unit 1110 mainly corresponds to the storage unit 220 illustrated in FIG. 3.

The image transmission apparatus 1200 includes a receiving unit 1201, a request acceptance unit 1202, a transmission unit 1203, and a saving unit 1210. In particular, the saving unit 1210 may not necessarily be included in the image transmission apparatus 1200. For example, the saving unit 1210 may be included in a different apparatus, or may not necessarily be included in the image processing system 1000.

The receiving unit 1201 and the transmission unit 1203 mainly correspond to the communication unit 330 illustrated in FIG. 3. The request acceptance unit 1202 mainly corresponds to the processing unit 310 illustrated in FIG. 3. The saving unit 1210 mainly corresponds to the storage unit 320 illustrated in FIG. 3.

Figure 30:
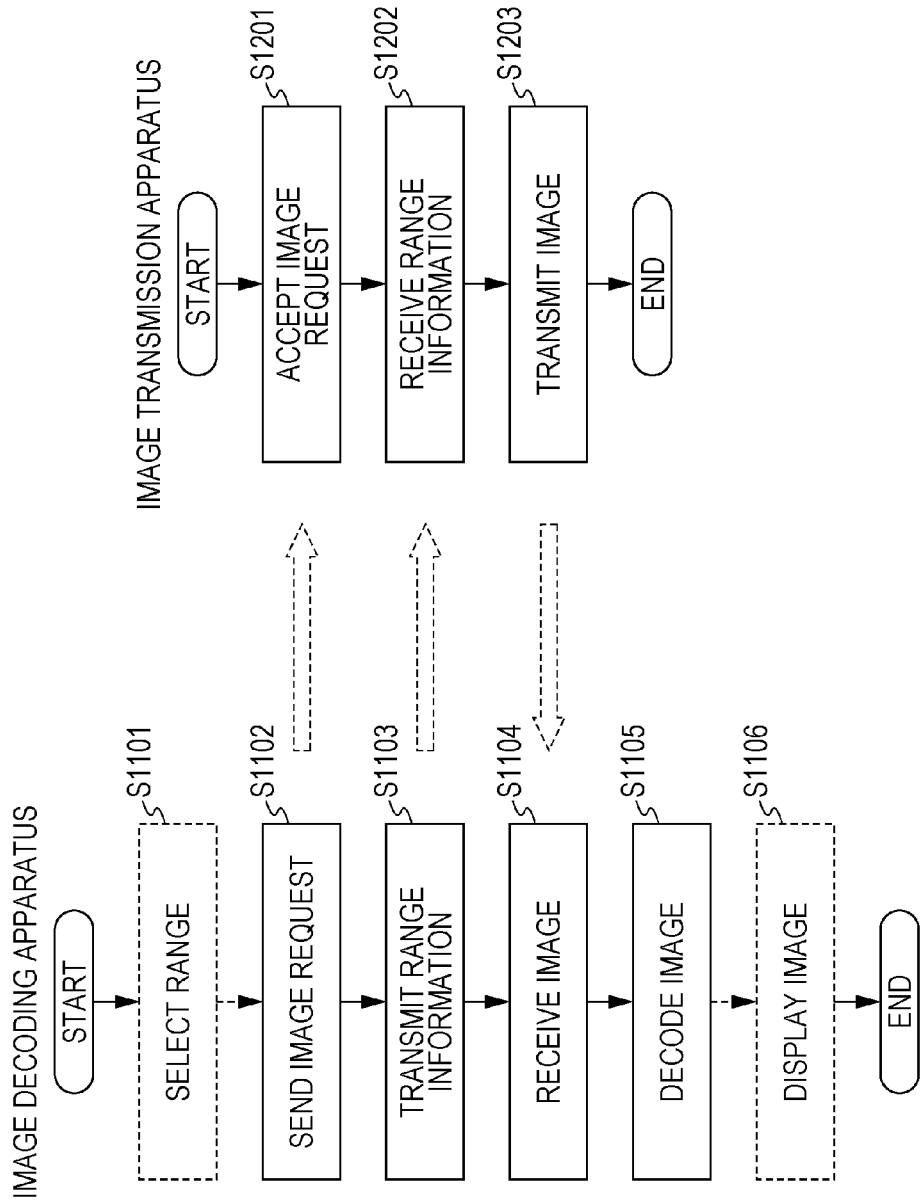
FIG. 30 is a diagram illustrating an example characteristic operation of the processing flow according to the fifth embodiment.

FIG. 30 is a diagram illustrating, as an example, the processing flow of the characteristic operation of the image processing system 1000 illustrated in FIG. 29. The image processing system 1000 processes an encoded image in accordance with the operation illustrated in FIG. 30.

In addition, the image decoding apparatus 1100 included in the image processing system 1000 receives an encoded image from the image transmission apparatus 1200, and decodes the image received from the image transmission apparatus 1200 in accordance with the operation illustrated in FIG. 30. In addition, the image transmission apparatus 1200 included in the image processing system 1000 transmits an encoded image to the image decoding apparatus 1100 in accordance with the operation illustrated in FIG. 30.

Specifically, first, in the image decoding apparatus 1100, the selection unit 1101 selects a partial range of the image within an entire range of the image in accordance with a user operation (S1101). For example, the selection unit 1101 accepts user input, and selects a partial range of the image in accordance with the accepted input. This operation may be omitted if a partial range of the image has already been selected.

The selection unit 1101 may inform each component of the image decoding apparatus 1100 of the partial range of the image via the saving unit 1110. The saving unit 1110 saves range information indicating the partial range of the image. The saving unit 1110 may save the range information in an internal storage unit of the image decoding apparatus 1100, or may save the range information in a storage unit outside the image decoding apparatus 1100. For example, the saving unit 1110 may save the range information in the image transmission apparatus 1200 via the transmission unit 1102.

Then, the request unit 1103 requests the image transmission apparatus 1200 to transmit an image (S1102). For example, the request unit 1103 transmits a signal to request transmission of an image to the image transmission apparatus 1200 via the transmission unit 1102.

Then, in the image transmission apparatus 1200, the request acceptance unit 1202 accepts the request from the image decoding apparatus 1100 to transmit an image (S1201). For example, the request acceptance unit 1202 receives a signal to request transmission of an image from the image decoding apparatus 1100 via the receiving unit 1201.

Then, in the image decoding apparatus 1100, the transmission unit 1102 transmits range information indicating the partial range of the image to the image transmission apparatus 1200 (S1103). More specifically, the range indicated by the range information is a range selected by the selection unit 1101 in accordance with a user operation.

Then, in the image transmission apparatus 1200, the receiving unit 1201 receives the range information from the image decoding apparatus 1100 (S1202). The saving unit 1210 may save the range information received by the receiving unit 1201. The saving unit 1210 may also save the range information in an internal storage unit of the image transmission apparatus 1200, or may save the range information in a storage unit outside the image transmission apparatus 1200.

Then, in the image transmission apparatus 1200, the transmission unit 1203 transmits the entirety or portion of the image to the image decoding apparatus 1100 while the partial range of the image is selected (S1203).

Specifically, if the image belongs to a first type, the transmission unit 1203 transmits the entirety of the image to the image decoding apparatus 1100. If the image belongs to a second type, the transmission unit 1203 transmits the portion of the image to the image decoding apparatus 1100. More specifically, if the image belongs to the second type, the transmission unit 1203 transmits only one or more tiles corresponding to the partial range of the image among the plurality of tiles included in the image, each of the one or more tiles being a tile outside which a reference to is prohibited in inter-picture prediction.

For example, the first type is a type in which display of the entirety of the image is recommend, and the second type is a type in which display of the entirety of the image is not recommend. For example, the first type is an advertisement, and the second type is not an advertisement. For example, a flag indicating whether the image belongs to the first type or the second type may be attached to the image. The transmission unit 1203 may transmit the entirety or portion of the image in accordance with the flag.

Each of one or more tiles outside which a reference to is prohibited in inter-picture prediction corresponds to an MV-constrained tile. A range corresponding to each tile is a range defined for each tile, and is basically the range of each tile.

Then, in the image decoding apparatus 1100, the receiving unit 1104 receives the entirety or portion of the image from the image transmission apparatus 1200 while the partial range of the image is selected (S1104).

Specifically, if the image belongs to the first type, the receiving unit 1104 receives the entirety of the image from the image transmission apparatus 1200. If the image belongs to the second type, the receiving unit 1104 receives the portion of the image from the image transmission apparatus 1200. More specifically, if the image belongs to the second type, the receiving unit 1104 receives only one or more tiles corresponding to the partial range of the image among the plurality of tiles included in the image, each of the one or more tiles being a tile outside which a reference to is prohibited in inter-picture prediction.

For example, a flag indicating whether the image belongs to the first type or the second type is attached to the image, and the receiving unit 1104 may receive the entirety or portion of the image in accordance with the flag.

Then, the decoding unit 1105 decodes the entirety or portion of the image received by the receiving unit 1104 from the image transmission apparatus 1200 (S1105).

Then, the display control unit 1106 displays the entirety or portion of the image decoded by the decoding unit 1105 on the display device 1107 (S1106). The entirety or portion of the decoded image may be stored in the saving unit 1110 as data. In this case, the display of the image may be omitted.

Accordingly, the image transmission apparatus 1200 can switch between transmission of the entirety of an image and transmission of a portion of the image in accordance with the type of the image. The image decoding apparatus 1100 can also switch between decoding of the entirety of an image and decoding of a portion of the image in accordance with the type of the image. Thus, the image transmission apparatus 1200 and the image decoding apparatus 1100 enable efficient processing of an encoded image.

Furthermore, for example, as described above, the range information may be saved in the image decoding apparatus 1100, the image transmission apparatus 1200, or the like. The receiving unit 1104 of the image decoding apparatus 1100 may receive a portion of the image in accordance with the saved range information. Then, the decoding unit 1105 of the image decoding apparatus 1100 may decode the portion of the image received in accordance with the saved range information. Then, the display control unit 1106 of the image decoding apparatus 1100 may display the portion of the image received and decoded in accordance with the saved range information.

For example, in a case where no range information is saved, the transmission unit 1102 of the image decoding apparatus 1100 may transmit range information to the image transmission apparatus 1200. In a case where range information is saved, the transmission unit 1102 of the image decoding apparatus 1100 may not necessarily transmit range information to the image transmission apparatus 1200. In a case where range information is saved and a portion of the image is to be received, the receiving unit 1104 of the image decoding apparatus 1100 may receive a portion of the image in accordance with the saved range information without the range information being transmitted from the transmission unit 1102 to the image transmission apparatus 1200.

For example, when a portion of the image is to be displayed after the entirety of another image has been displayed, the display control unit 1106 may display a portion of the image received and decoded in accordance with the saved range information. For example, in a case where display of a portion of the image is stopped and then resumed, the display control unit 1106 may display a portion of the image received and decoded in accordance with the saved range information.

For example, the display control unit 1106 may display the portion of the image received and decoded in accordance with the saved range information on a display device different from the display device 1107.

Other Modifications

The configuration according to the present disclosure is not limited to that in the embodiments described above. The configuration according to the present disclosure may be in any of the following forms.

(1) Each of the apparatuses described above (i.e., each of the image decoding apparatus, the image transmission apparatus, and so forth) is, specifically, a computer system including a microprocessor, a ROM, a random access memory (RAM), a hard disk unit, a display unit, a keyboard, a mouse, and so forth.

The RAM or the hard disk unit stores a computer program. The microprocessor operates in accordance with the computer program, allowing each apparatus to achieve its functions. The computer program includes, in combination, a plurality of instruction codes each indicating a command for a computer to achieve a predetermined function.

(2) Some or all of a plurality of constituent elements included in each of the apparatuses described above may be formed of a single system LSI. A system LSI is an ultra multifunctional LSI fabricated by integrating a plurality of components onto a single chip, and is, specifically, a computer system including a microprocessor, a ROM, a RAM, and so forth.

The RAM stores a computer program. The microprocessor operates in accordance with the computer program, allowing the system LSI to achieve its functions.

(3) Some or all of a plurality of constituent elements included in each of the apparatuses described above may also be formed of an integrated circuit (IC) card attachable to each apparatus or formed of a single module. The IC card or the module is a computer system including a microprocessor, a ROM, a RAM, and so forth.

The IC card or the module includes the ultra multifunctional LSI described above. The microprocessor operates in accordance with the computer program, allowing the IC card or the module to achieve its functions. The IC card or the module may have tamper resistance.

(4) The configuration according to the present disclosure may provide the method described above. The configuration according to the present disclosure may provide a computer program according to which the method described above is implemented by a computer, or may be a digital signal including the computer program.

The configuration according to the present disclosure may also provide a computer-readable recording medium having the computer program or the digital signal recorded thereon. Examples of the computer-readable recording medium include a flexible disk, a hard disk, a CD-ROM, a magneto-optical (MO) disk, a DVD, a DVD-ROM, a DVD-RAM, a BD, and a semiconductor memory. The configuration according to the present disclosure may also provide the digital signal recorded on the recording medium described above.

The configuration according to the present disclosure may also be a configuration in which the computer program or the digital signal is transmitted via a telecommunications line, a wireless communication line, a wired communication line, a network such as the Internet, data broadcasting, or the like.

The configuration according to the present disclosure may also provide a computer system including a microprocessor and a memory. The memory may store the computer program described above, and the microprocessor may operate in accordance with the computer program.

The program or the digital signal may be recorded on a recording medium and then the recording medium may be transferred, or the program or the digital signal may be transferred via a network or the like. The configuration according to the present disclosure may further be implemented by another independent computer system.

(5) In the embodiments described above, an image decoding method, an image decoding apparatus, an image transmission method, an image transmission apparatus, and the like have been mainly described. It is to be understood that an image encoding method and an image encoding apparatus for generating a bit stream, which enable operation of the image decoding method, the image decoding apparatus, the image transmission method, the image transmission apparatus, and the like, may be used. The image encoding apparatus and the image transmission apparatus may be the same. Some apparatuses or circuits that perform part of processing may be located in another country. As long as a system according to the present disclosure is constructed as whole, the system falls within the scope of the present disclosure.

(6) The embodiments and the modification described above may be used in combination.

In each of the above-described embodiments, each constituent element may be implemented by dedicated hardware, or may be implemented by the execution of a software program suitable for the constituent element. Each constituent element may be implemented by a program execution unit, such as a central processing unit (CPU) or a processor, reading and executing a software program recorded on a recording medium such as a hard disk or a semiconductor memory.

In other words, an image decoding apparatus and an image transmission apparatus includes a processing circuit ("processing circuitry") and a storage device ("storage") electrically connected to the processing circuit (or accessible from the processing circuit). The processing circuit includes at least one of dedicated hardware and a program execution unit, and executes processing using the storage device. If the processing circuit includes a program execution unit, the storage device stores a software program executed by the program execution unit.

Here, software that implements an image decoding apparatus or the like in each of the above-described embodiments is the following program.

The program causes a computer to execute an image decoding method for receiving an encoded image from an image transmission apparatus and decoding the image received from the image transmission apparatus. The image decoding method includes a requesting step of requesting the image transmission apparatus to transmit the image; a transmitting step of transmitting range information to the image transmission apparatus, the range information being range information indicating a range which is a partial range of the image within an entire range of the image and which is selected in accordance with a user operation; a receiving step of, while the partial range of the image is selected, (i) receiving the entirety of the image from the image transmission apparatus when the image belongs to a first type, and (ii) receiving a portion of the image from the image transmission apparatus when the image belongs to a second type, by receiving one or more tiles corresponding to the partial range of the image among a plurality of tiles included in the image, each of the one or more tiles being a tile outside which a reference to is prohibited in inter-picture prediction; and a decoding step of decoding the entirety or portion of the image received in the receiving step from the image transmission apparatus.

The program may also be a program for causing a computer to execute an image transmission method for transmitting an encoded image to an image decoding apparatus. The image transmission method includes a request accepting step of accepting a request from the image decoding apparatus to transmit the image; a receiving step of receiving range information from the image decoding apparatus, the range information being range information indicating a range which is a partial range of the image within an entire range of the image and which is selected in accordance with a user operation; and a transmitting step of, while the partial range of the image is selected, (i) transmitting the entirety of the image to the image decoding apparatus when the image belongs to a first type, and (ii) transmitting a portion of the image to the image decoding apparatus when the image belongs to a second type, by transmitting one or more tiles corresponding to the partial range of the image among a plurality of tiles included in the image, each of the one or more tiles being a tile outside which a reference to is prohibited in inter-picture prediction.

As described above, the individual constituent elements may be circuits. The circuits may form a single circuit in its entirety, or may be separate circuits. Further, the individual constituent elements may be implemented by a general-purpose processor, or may be implemented by a dedicated processor.

In addition, a process executed by a specific constituent element may be executed by another constituent element. Further, the order in which processes are executed may be changed, or a plurality of processes may be executed in parallel. In addition, an image processing apparatus may include an image decoding apparatus and an image transmission apparatus.

The image processing system, the image transmission apparatus, the image transmission method, the image decoding apparatus, and the image decoding method described above may be expressed as an image distribution system, an image distribution apparatus, an image distribution method, an image receiving apparatus, and an image receiving method, respectively.

While an image decoding apparatus and an image transmission apparatus according to one or a plurality of aspects have been described with reference to embodiments, the present disclosure is not limited to those embodiments. Various modifications conceivable by a person skilled in the art and made to the embodiments described above or an embodiment in which constituent elements in different embodiments are used in combination may also fall within the scope of one or a plurality of aspects without departing from the scope of the present disclosure.

Sixth Embodiment

A program for implementing the configuration of the moving image encoding method (image encoding method) or the moving image decoding method (image decoding method) illustrated in each of the above-described embodiments is recorded on a storage medium, enabling the process illustrated in each of the above-described embodiments to be easily implemented in an independent computer system. The storage medium may be any medium capable of having a program recorded thereon, such as a magnetic disk, an optical disk, a magneto-optical disk, an IC card, or a semiconductor memory.

Hereinafter, application examples of the moving image encoding method (image encoding method) or the moving image decoding method (image decoding method) illustrated in each of the above-described embodiments and a system using the same will further be described. The system includes an image encoding and decoding apparatus. The image encoding and decoding apparatus includes an image encoding apparatus that uses an image encoding method, and an image decoding apparatus that uses an image decoding method. Other configuration in the system may be modified, as appropriate, depending on the situation.

Figure 31:
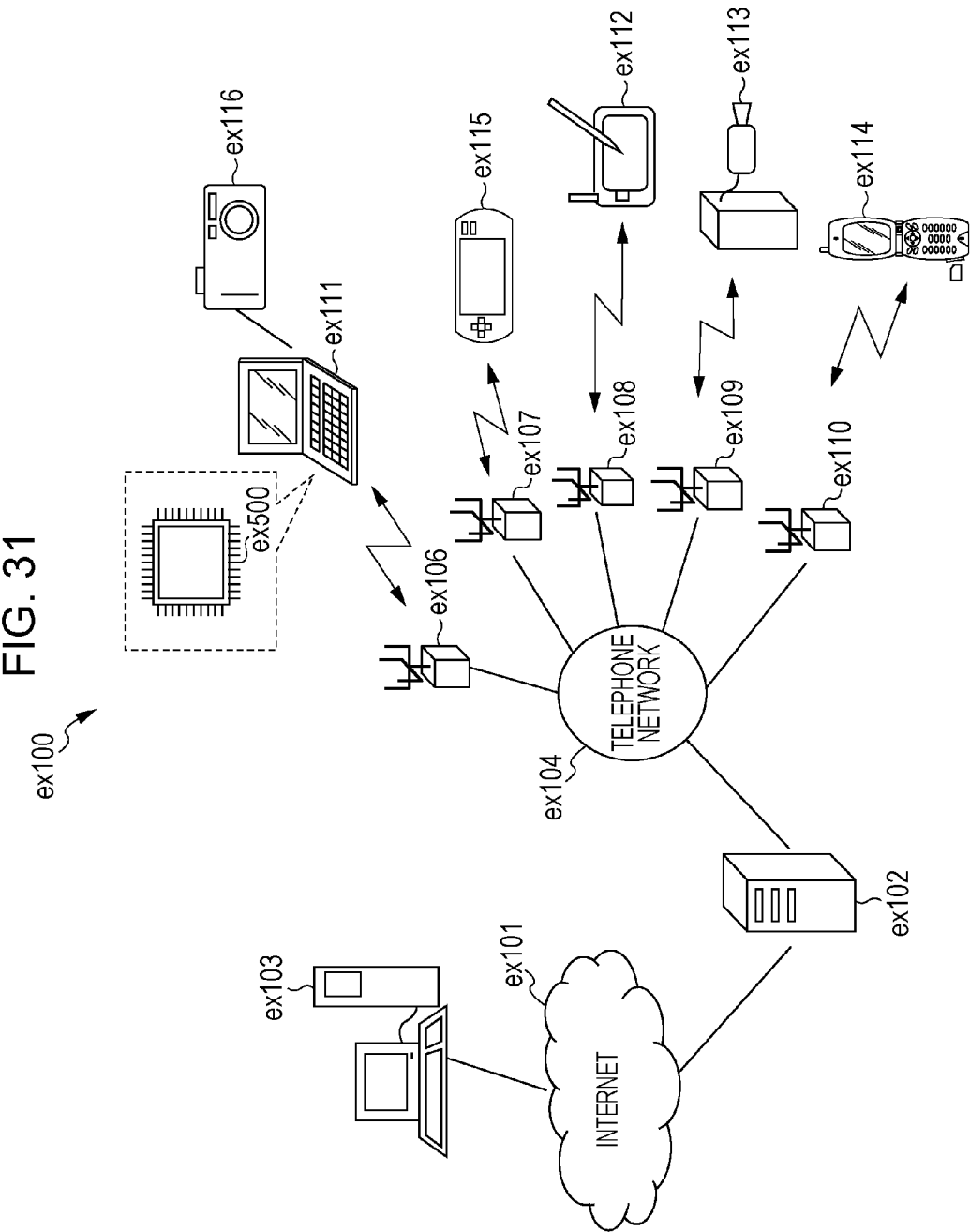
FIG. 31 is an overall configuration diagram of a content supply system that achieves the provision of a content distribution service.

FIG. 31 is a diagram illustrating the overall configuration of a content supply system ex100 that achieves the provision of a content distribution service. An area over which a communication service is to be provided is divided into cells each having the desired size, and each cell has a base station ex106, ex107, ex108, ex109, or ex110, which is a fixed radio station, located therein.

In the content supply system ex100, devices such as a computer ex111, a personal digital assistant (PDA) ex112, a camera ex113, a mobile phone ex114, and a game device ex115 are connected to the Internet ex101 via an Internet service provider ex102, a telephone network ex104, and the base stations ex106 to ex110.

However, the configuration of the content supply system ex100 is not limited to that illustrated in FIG. 31, and one of the elements described above may be combined with and connected to another element. In addition, the individual devices may be connected directly to the telephone network ex104 without the intervention of the base stations ex106 to ex110, each of which is a fixed radio station. Furthermore, the individual devices may be connected directly to one another via short-range radio or the like.

The camera ex113 is a device configured to capture a moving image, such as a digital video camera, and a camera ex116 is a device configured to capture a still image and a moving image, such as a digital camera. Examples of the mobile phone ex114 include a Global System for Mobile Communications (GSM (registered trademark)) mobile phone, a Code Division Multiple Access (CDMA) mobile phone, a Wideband-Code Division Multiple Access (W-CDMA) mobile phone, a Long Term Evolution (LTE) mobile phone, a High Speed packet Access (HSPA) mobile phone, and a Personal Handyphone System (PHS), any of which may be used.

In the content supply system ex100, for example, the camera ex113 is connected to a streaming server ex103 via the base station ex109 and the telephone network ex104, enabling live distribution and the like. In live distribution, a user captures an image using the camera ex113 to create content (such as video of live music), and the camera ex113 performs an encoding process on the created content in the way described in each of the above-described embodiments (that is, serving as an image encoding apparatus according to an aspect of the present disclosure), and transmits the resulting content to the streaming server ex103. The streaming server ex103 distributes, as a stream, the transmitted content data to a client that has made a request. Examples of the client include the computer ex111, the PDA ex112, the camera ex113, the mobile phone ex114, and the game device ex115, which are configured to decode data subjected to the encoding process described above. Upon receipt of the distributed data, each device performs a decoding process on the received data and reproduces the decoded data (that is, serving as an image decoding apparatus according to an aspect of the present disclosure).

The encoding process of the captured data may be performed by the camera ex113 or the streaming server ex103 that performs a data transmission process, or may be shared and performed by the camera ex113 and the streaming server ex103. Likewise, the decoding process of the distributed data may be performed by the client or the streaming server ex103, or may be shared and performed by the client and the streaming server ex103. In addition, still image data and/or moving image data obtained by capturing an image using the camera ex116 instead of the camera ex113 may be transmitted to the streaming server ex103 via the computer ex111. In this case, the encoding process of the still image data and/or the moving image data may be performed by any of the camera ex116, the computer ex111, and the streaming server ex103, or may be shared and performed by the camera ex116, the computer ex111, and the streaming server ex103.

The encoding/decoding process described above is generally performed in the computer ex111 or in an LSI ex500 included in each device. The LSI ex500 may be a single chip or may be formed of a plurality of chips. The encoding/decoding process may be performed by using software for encoding/decoding moving images that is incorporated into a recording medium (such as a CD-ROM, a flexible disk, or a hard disk) readable by the computer ex111 or the like. If the mobile phone ex114 is equipped with a camera, moving image data acquired by the camera may be transmitted. In this case, the moving image data is data encoded by the LSI ex500 included in the mobile phone ex114.

In addition, the streaming server ex103 may be implemented by a plurality of servers or a plurality of computers configured to process, record, and distribute data in a distributed manner.

In the manner described above, in the content supply system ex100, the encoded data can be received and reproduced by the client. In the content supply system ex100, accordingly, information transmitted by a user can be received, decoded, and reproduced by the client in real time. Even a user who has no special rights or facilities is able to achieve personal broadcasting.

Figure 32:
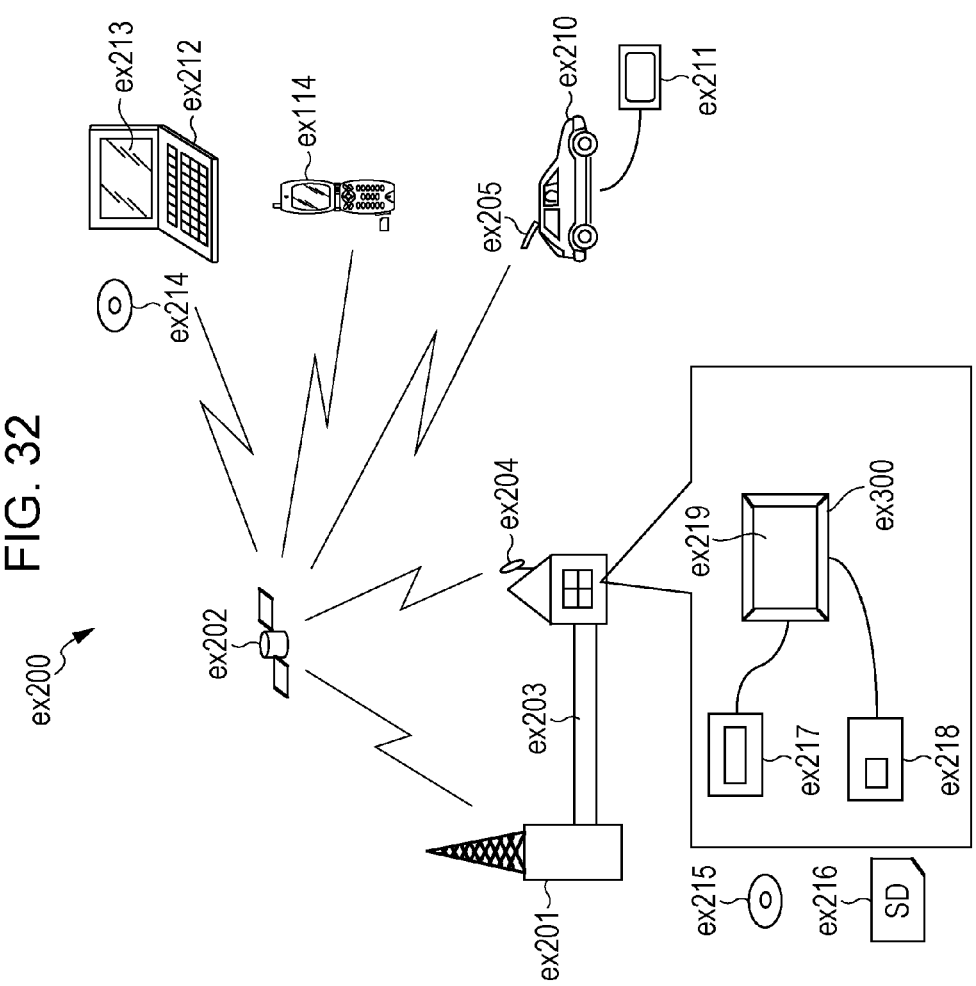
FIG. 32 is an overall configuration diagram of a digital broadcasting system.

The example of the content supply system ex100 is not intended to be limiting. As illustrated in FIG. 32, at least one of a moving image encoding apparatus (image encoding apparatus) or a moving image decoding apparatus (image decoding apparatus) in each of the above-described embodiments may be incorporated into a digital broadcasting system ex200. Specifically, in a broadcast station ex201, multiplexed data obtained by multiplexing music data or the like onto video data is transmitted to a communication or broadcast satellite ex202 via a radio wave. The video data is data encoded using the moving image encoding method described in each of the above-described embodiments (that is, data encoded by an image encoding apparatus according to an aspect of the present disclosure). Upon receipt of the multiplexed data, the broadcast satellite ex202 sends a broadcasting radio wave, and a home antenna ex204 capable of receiving satellite broadcasts receives the radio wave. The received multiplexed data is decoded and reproduced by an apparatus such as a TV (receiver) ex300 or a set-top box (STB) ex217 (that is, the apparatus serves as an image decoding apparatus according to an aspect of the present disclosure).

In addition, the moving image decoding apparatus or the moving image encoding apparatus illustrated in each of the above-described embodiments may also be mounted in a reader/recorder ex218. The reader/recorder ex218 reads multiplexed data recorded on a recording medium ex215 such as a DVD or a BD and decodes the read multiplexed data, or encodes a video signal and further, depending on the situation, multiplexes the video signal with a music signal, and writes the resulting signal to the recording medium ex215. In this case, the reproduced video signal is displayed on a monitor ex219, and another apparatus or system can reproduce the video signal from the recording medium ex215 having the multiplexed data recorded thereon. In addition, the moving image decoding apparatus may be mounted in a set-top box ex217 connected to a cable TV cable ex203 or the antenna ex204 for satellite/terrestrial broadcasting, and a decoded moving image may be displayed on the monitor ex219 of the TV ex300. The moving image decoding apparatus may be incorporated in the TV ex300 instead of the set-top box ex217.

Figure 33:
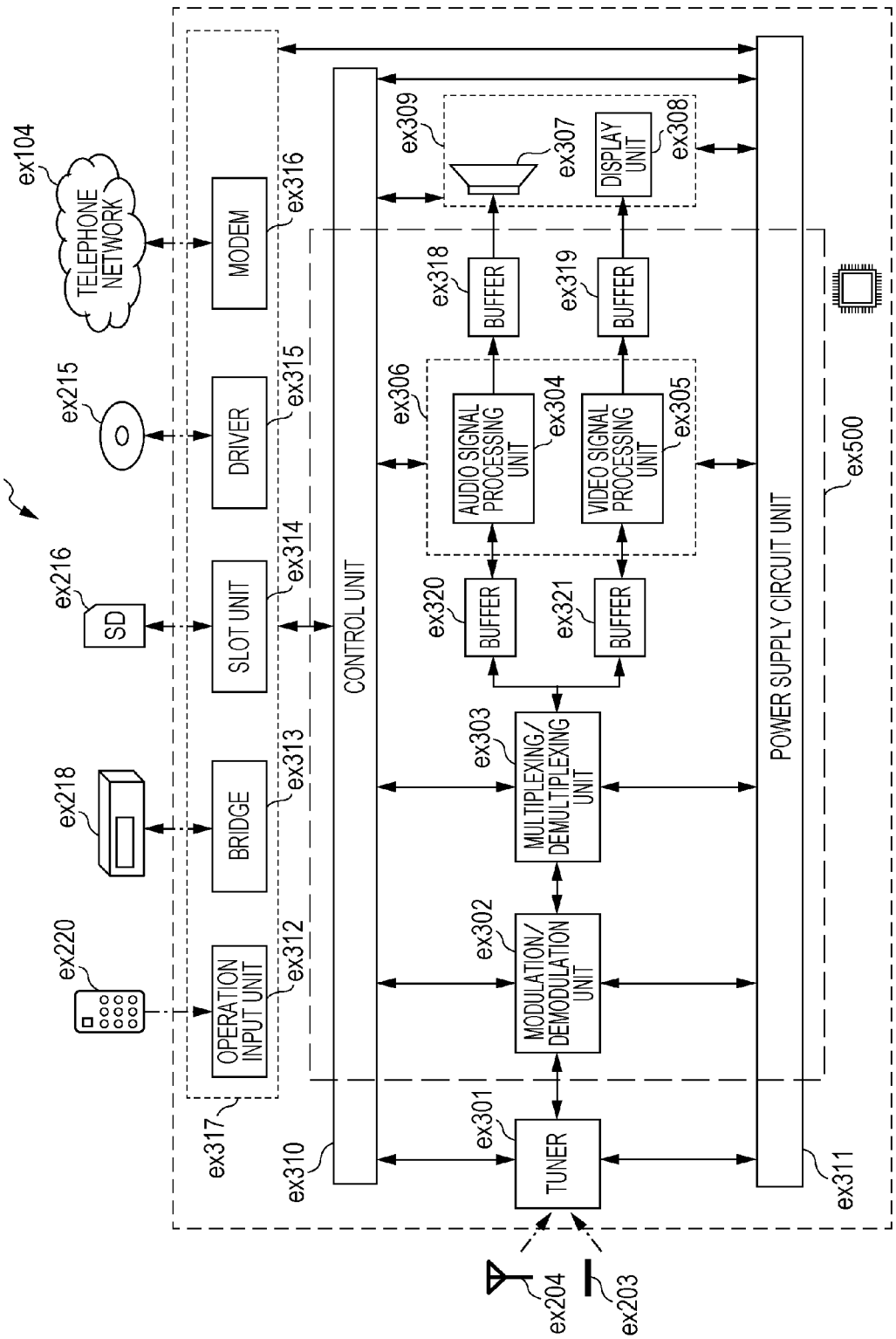
FIG. 33 is a block diagram illustrating an example configuration of a television.

FIG. 33 is a diagram illustrating a TV (receiver) ex300 that uses the moving image decoding method and the moving image encoding method described in each of the above-described embodiments. The TV ex300 includes a tuner ex301, a modulation/demodulation unit ex302, and a multiplexing/demultiplexing unit ex303. The tuner ex301 acquires or outputs multiplexed data obtained by multiplexing audio data onto video data via the antenna ex204 that receives the broadcast described above or via the cable ex203 or the like. The modulation/demodulation unit ex302 demodulates the received multiplexed data, or modulates multiplexed data to be transmitted to outside. The multiplexing/demultiplexing unit ex303 separates the demodulated multiplexed data into video data and audio data, or multiplexes video data and audio data that are encoded by a signal processing unit ex306.

The TV ex300 further includes the signal processing unit ex306 and an output unit ex309. The signal processing unit ex306 includes an audio signal processing unit ex304 and a video signal processing unit ex305 (serving as an image encoding apparatus or an image decoding apparatus according to an aspect of the present disclosure) that decodes audio data and video data, respectively, or encodes respective information. The output unit ex309 includes a speaker ex307 that outputs the decoded audio signal, and a display unit ex308, such as a display, that displays the decoded video signal. The TV ex300 further includes an interface unit ex317. The interface unit ex317 includes, for example, an operation input unit ex312 that accepts input of a user operation. The TV ex300 further includes a control unit ex310 for overall control of the individual units, and a power supply circuit unit ex311 for supplying power to each of the individual units. The interface unit ex317 may include components other than the operation input unit ex312, examples of which include a bridge ex313 to be connected to an external device such as the reader/recorder ex218, a slot unit ex314 into which a recording medium ex216 such as an SD card is removably placed, a driver ex315 to be connected to an external recording medium such as a hard disk, and a modem ex316 to be connected to the telephone network ex104. The recording medium ex216 has a non-volatile/volatile semiconductor memory element capable of electrically recording information. The individual units of the TV ex300 are connected to one another via a synchronization bus.

First, a description will be given of a configuration in which the TV ex300 decodes and reproduces multiplexed data acquired from outside via the antenna ex204 or the like. In the TV ex300, in response to a user operation from a remote controller ex220 or the like, the multiplexing/demultiplexing unit ex303 separates the multiplexed data demodulated by the modulation/demodulation unit ex302 under control of the control unit ex310, which has a CPU and the like. In the TV ex300, furthermore, the separated audio data and the separated video data are decoded by the audio signal processing unit ex304 and the video signal processing unit ex305, respectively, using the decoding method described in each of the above-described embodiments. The decoded audio signal and video signal are output to outside from the output unit ex309. When the audio signal and the video signal are to be output, the audio signal and the video signal may be temporarily accumulated in buffers ex318 and ex319 or the like so that the audio signal and the video signal are synchronously reproduced. In the TV ex300, furthermore, multiplexed data may be read from the recording medium ex215 or ex216, such as a magnetic/optical disk or an SD card, rather than from a broadcast or the like. A description will now be given of a configuration in which the TV ex300 encodes an audio signal and a video signal and transmits the encoded audio signal and video signal to outside or writes the encoded audio signal and video signal to a recording medium or the like. In the TV ex300, in response to a user operation from the remote controller ex220 or the like, the audio signal processing unit ex304 and the video signal processing unit ex305 encode an audio signal and a video signal, respectively, using the encoding method described in each of the above-described embodiments under control of the control unit ex310. The encoded audio signal and video signal are multiplexed by the multiplexing/demultiplexing unit ex303, and are output to the outside. When the audio signal and the video signal are to be multiplexed, the audio signal and the video signal may be temporarily accumulated in buffers ex320 and ex321 or the like so that the audio signal and the video signal are synchronized with each other. A plurality of buffers, such as the buffers ex318, ex319, ex320, and ex321, as illustrated in FIG. 33 may be used, or one or more buffers may be shared. In addition to those illustrated in FIG. 33, data may be accumulated in a buffer serving as a buffering mechanism to prevent system overflow and underflow between, for example, the modulation/demodulation unit ex302 and the multiplexing/demultiplexing unit ex303.

In addition, the TV ex300 may have a configuration to accept audio/video (AV) input of a microphone or a camera, in addition to acquiring audio data and video data from a broadcast, a recording medium, or the like, and may perform an encoding process on acquired data. While the TV ex300 has been described as having a configuration capable of the encoding process, multiplexing process, and external output process described above, the TV ex300 may be configured not to be capable of the above-described processes and may have a configuration capable of only the receiving process, decoding process, and external output process described above.

When the reader/recorder ex218 reads or writes multiplexed data from a recording medium, the decoding process or encoding process described above may be performed by either of the TV ex300 and the reader/recorder ex218, or may be shared and performed by the TV ex300 and the reader/recorder ex218.

Figure 34:
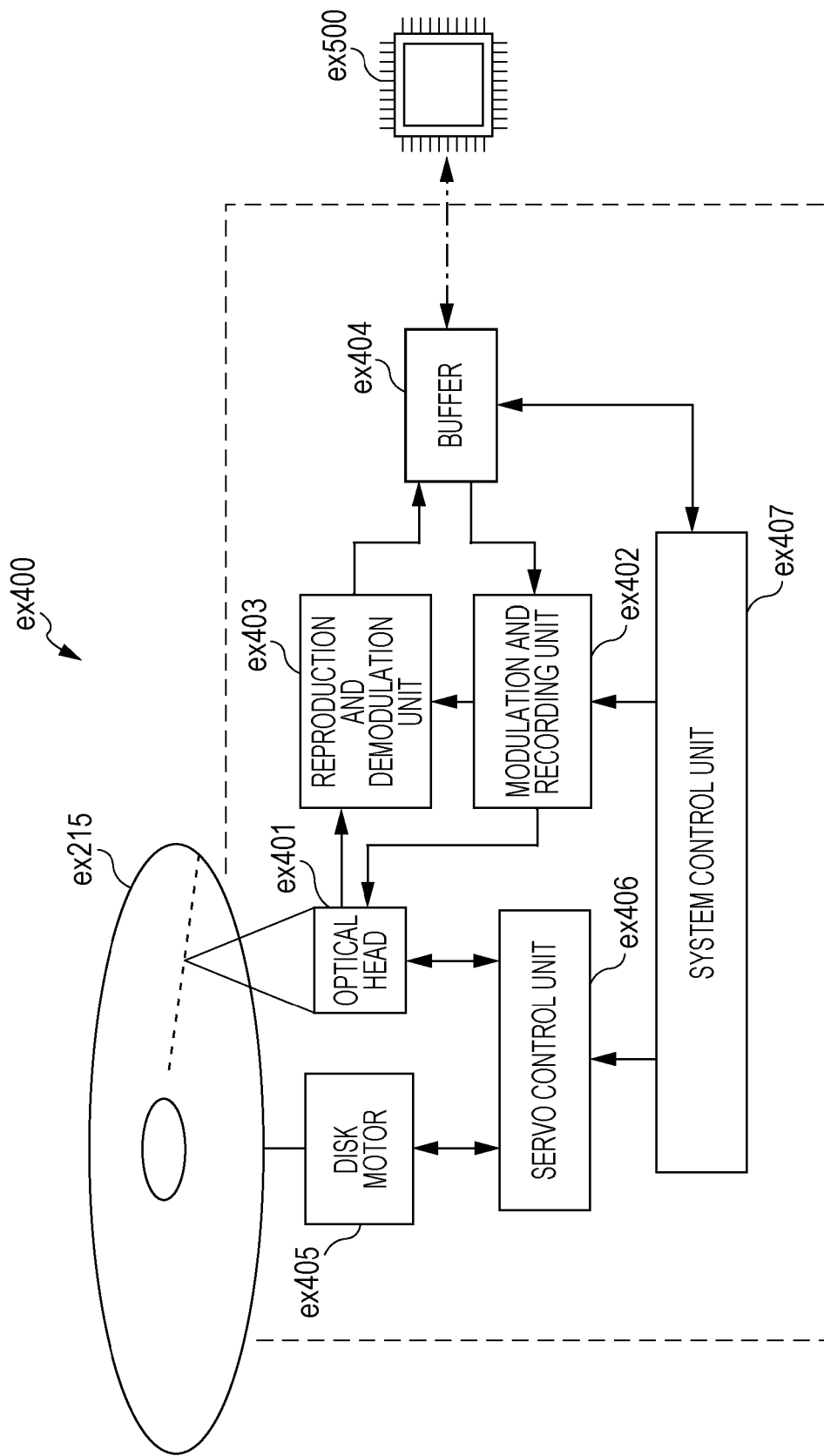
FIG. 34 is a block diagram illustrating an example configuration of an information reproducing/recording unit that reads and writes information from and to a recording medium serving as an optical disk.

FIG. 34 illustrates, by way of example, the configuration of an information reproducing/recording unit ex400 for reading or writing data from or to an optical disk. The information reproducing/recording unit ex400 includes an optical head ex401, a modulation and recording unit ex402, a reproduction and demodulation unit ex403, a buffer ex404, a disk motor ex405, a servo control unit ex406, and a system control unit ex407. The optical head ex401 applies a laser spot to a recording surface of the recording medium ex215, which is an optical disk, to write information, and detects light reflected from the recording surface of the recording medium ex215 to read the information. The modulation and recording unit ex402 electrically drives a semiconductor laser in the optical head ex401, and modulates a laser beam in accordance with the recording data. The reproduction and demodulation unit ex403 amplifies a reproduction signal produced by electrically detecting light reflected from the recording surface using a photodetector in the optical head ex401, and separates signal components recorded on the recording medium ex215 for demodulation to reproduce necessary information. The buffer ex404 temporarily holds information to be recorded on the recording medium ex215 and information reproduced from the recording medium ex215. The disk motor ex405 rotates the recording medium ex215. The servo control unit ex406 causes the optical head ex401 to move to a predetermined information track while controlling the driving of the disk motor ex405 to rotate, and tracks the laser spot. The system control unit ex407 provides overall control of the information reproducing/recording unit ex400. The reading and writing process described above is implemented by the system control unit ex407 by using various information held in the buffer ex404 and, if necessary, by generating and adding new information and by recording and reproducing information through the optical head ex401 while causing the modulation and recording unit ex402, the reproduction and demodulation unit ex403, and the servo control unit ex406 to operate in cooperation with one another. The system control unit ex407 is composed of, for example, a microprocessor, and executes a reading and writing program to execute the reading and writing process.

In the foregoing description, the optical head ex401 applies a laser spot. The optical head ex401 may be configured to perform higher density recording with near-field light.

Figure 35:
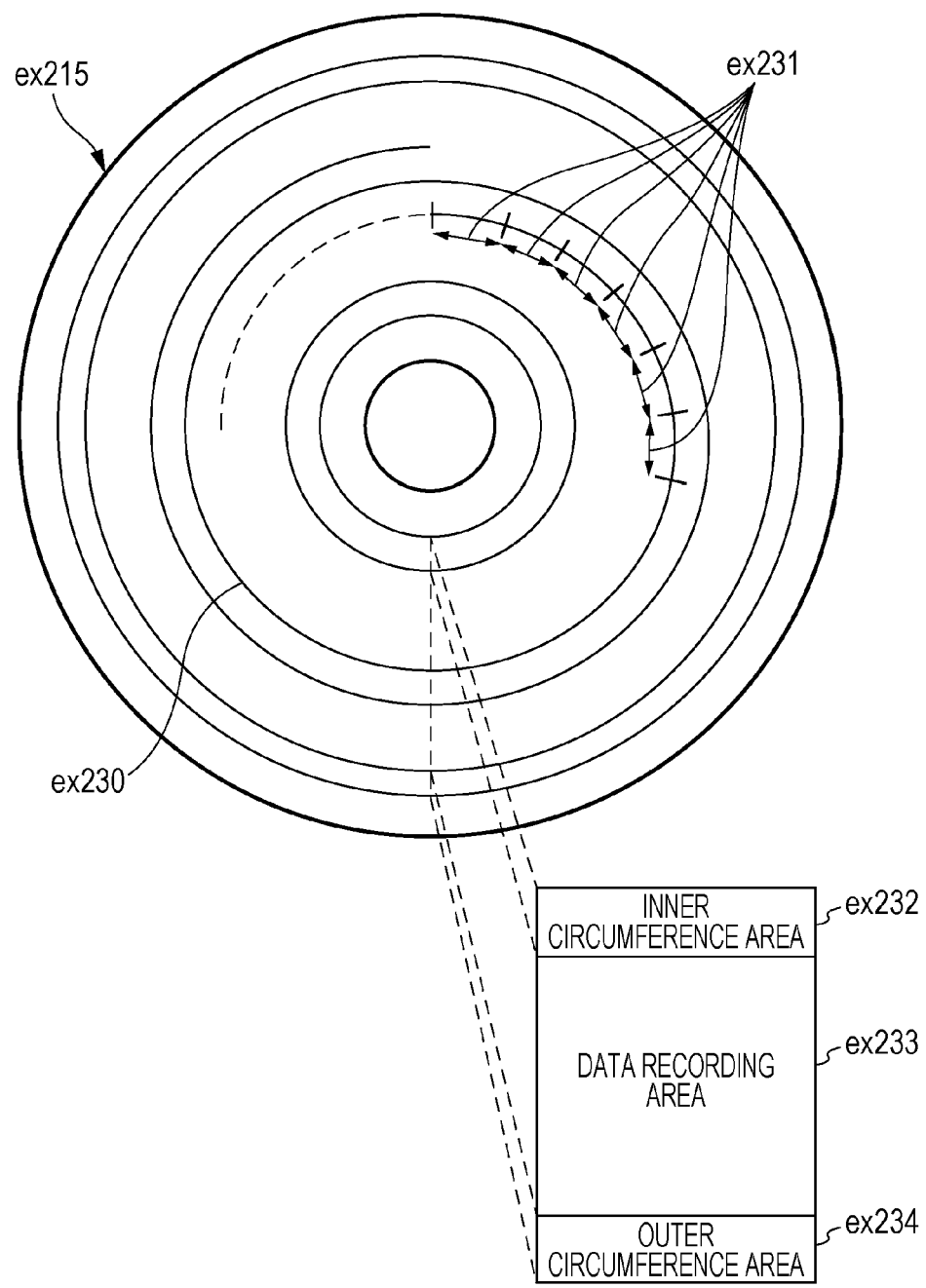
FIG. 35 is a diagram illustrating an example structure of the recording medium serving as an optical disk.

FIG. 35 is a schematic diagram of the recording medium ex215, which is an optical disk. The recording surface of the recording medium ex215 has a guide groove (or groove) formed in a spiral shape. An information track ex230 has recorded thereon in advance address information which indicates an absolute position on the disk using a change in the shape of the groove. The address information includes information for identifying the position of a recording block ex231 that is the unit for which data is recorded. An apparatus used for recording or reproduction reproduces the information track ex230 and reads the address information to identify a recording block. The recording medium ex215 also has a data recording area ex233, an inner circumference area ex232, and an outer circumference area ex234. The data recording area ex233 is an area used to record user data. The inner circumference area ex232 and the outer circumference area ex234 are located inside and outside the data recording area ex233, respectively, and are used for specific purposes other than recording of user data. The information reproducing/recording unit ex400 reads and writes encoded audio data and video data or multiplexed data obtained by multiplexing the audio data and video data from and to the data recording area ex233 of the recording medium ex215 having the configuration described above.

In the foregoing description, by way of example, an optical disk such as a single-layer DVD or BD is used. The optical disk is merely an example, and an optical disk having a multi-layer structure and capable of recording on multiple layers may be used. Alternatively, an optical disk having a structure for multidimensional recording/reproduction, such as recording information in the same location on the disk by using light of different colors having different wavelengths or recording different layers of information from different angles, may be used.

In the digital broadcasting system ex200, furthermore, a vehicle ex210 having an antenna ex205 may be able to receive data from the satellite ex202 or the like and to reproduce a moving image on a display device of a car navigation system ex211 or the like included in the vehicle ex210. The car navigation system ex211 may have a configuration in which, for example, a GPS receiving unit is added to the configuration illustrated in FIG. 33, and the computer ex111, the mobile phone ex114, and the like may also have a similar configuration.

Figure 36A:
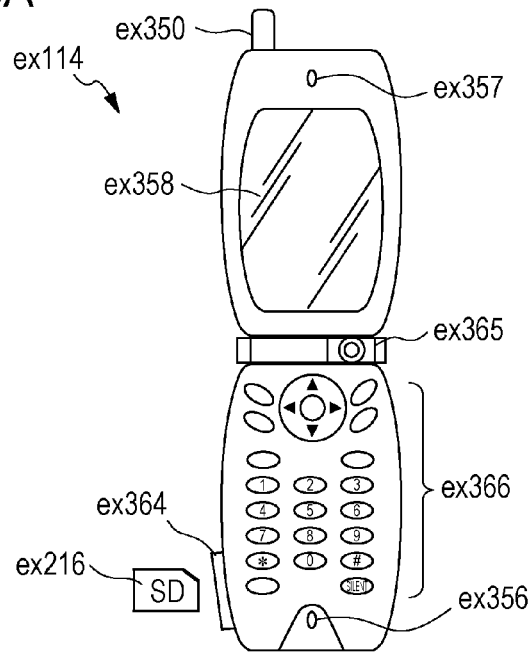
FIG. 36A is a diagram illustrating an example of a mobile phone.

FIG. 36A is a diagram illustrating the mobile phone ex114 that uses the moving image decoding method and the moving image encoding method described in the embodiments described above. The mobile phone ex114 includes an antenna ex350 for transmitting and receiving radio waves to and from the base station ex110, a camera unit ex365 configured to capture video and a still image, and a display unit ex358, such as a liquid crystal display (LCD), that displays data obtained by decoding the video captured by the camera unit ex365, video received by the antenna ex350, or the like. The mobile phone ex114 further includes a main body having an operation key unit ex366, an audio output unit ex357, such as a speaker, for outputting audio, an audio input unit ex356, such as a microphone, for inputting audio, and a memory unit ex367 that saves encoded data or decoded data for captured video or still images, recorded audio, received video, still images, or email, or the like, or a slot unit ex364 serving as an interface unit that interfaces with a recording medium that saves data in a similar way.

Figure 36B:
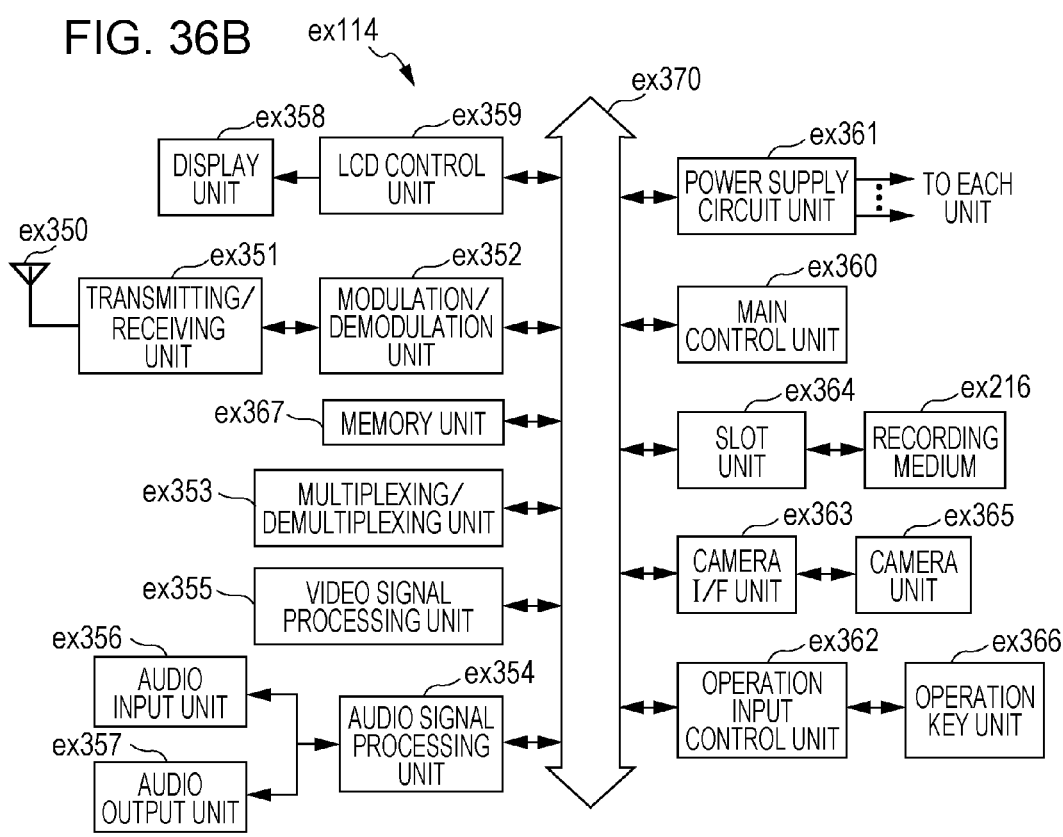
FIG. 36B is a block diagram illustrating an example configuration of the mobile phone.

An example configuration of the mobile phone ex114 will further be described with reference to FIG. 36B. In the mobile phone ex114, a power supply circuit unit ex361, an operation input control unit ex362, a video signal processing unit ex355, a camera interface unit ex363, an LCD control unit ex359, a modulation/demodulation unit ex352, a multiplexing/demultiplexing unit ex353, an audio signal processing unit ex354, the slot unit ex364, and the memory unit ex367 are connected to a main control unit ex360 via a bus ex370. The main control unit ex360 provides overall control of the display unit ex358 and the individual units of the main body including the operation key unit ex366.

When a call is terminated and a power key is turned on by a user operation, the power supply circuit unit ex361 supplies power from a battery pack to each unit to activate the mobile phone ex114 into operation.

In the mobile phone ex114, an audio signal obtained by collecting audio using the audio input unit ex356 in a voice communication mode is converted into a digital audio signal using the audio signal processing unit ex354, subjected to spread spectrum processing using the modulation/demodulation unit ex352, subjected to digital-to-analog conversion processing and frequency transform processing using a transmitting/receiving unit ex351, and then transmitted via the antenna ex350 under control of the main control unit ex360, which has a CPU, a ROM, a RAM, and so forth. In the mobile phone ex114, furthermore, received data received via the antenna ex350 in the voice communication mode is amplified, subjected to frequency transform processing and analog-to-digital conversion processing, subjected to inverse spread spectrum processing using the modulation/demodulation unit ex352, converted into an analog audio signal using the audio signal processing unit ex354, and then output from the audio output unit ex357.

Further, in a case where electronic mail is to be transmitted in a data communication mode, text data of electronic mail input by the operation of the operation key unit ex366 or the like of the main body is delivered to the main control unit ex360 via the operation input control unit ex362. Under control of the main control unit ex360, the text data is subjected to spread spectrum processing using the modulation/demodulation unit ex352, subjected to digital-to-analog conversion processing and frequency transform processing using the transmitting/receiving unit ex351, and then transmitted to the base station ex110 via the antenna ex350. In a case where electronic mail is received, the received data is subjected to processing substantially inverse to the processing described above, and the result is output to the display unit ex358.

In a case where video, a still image, or video and audio are to be transmitted in the data communication mode, the video signal processing unit ex355 compresses and encodes the video signal supplied from the camera unit ex365 using the moving image encoding method illustrated in each of the above-described embodiments (that is, serving as an image encoding apparatus according to an aspect of the present disclosure), and delivers the encoded video data to the multiplexing/demultiplexing unit ex353. Further, the audio signal processing unit ex354 encodes an audio signal obtained by collecting audio using the audio input unit ex356 for a period during which the camera unit ex365 captures video, a still image, or the like, and delivers the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354 using a predetermined scheme. The resulting multiplexed data is subjected to spread spectrum processing using the modulation/demodulation unit (or modulation/demodulation circuit unit) ex352, subjected to digital-to-analog conversion processing and frequency transform processing using the transmitting/receiving unit ex351, and then transmitted via the antenna ex350.

In a case where data of a moving image file linked to a homepage or the like is received in the data communication mode or in a case where electronic mail with video and/or audio attached thereto is received, in order to decode the multiplexed data received via the antenna ex350, the multiplexing/demultiplexing unit ex353 separates the multiplexed data into a bit stream of video data and a bit stream of audio data, and supplies the encoded video data to the video signal processing unit ex355 and the encoded audio data to the audio signal processing unit ex354 via a synchronization bus ex370. The video signal processing unit ex355 decodes the video signal using the moving image decoding method corresponding to the moving image encoding method illustrated in each of the above-described embodiments (that is, serving as an image decoding apparatus according to an aspect of the present disclosure), and video or a still image included in, for example, the moving image file linked to the homepage is displayed from the display unit ex358 via the LCD control unit ex359. The audio signal processing unit ex354 decodes the audio signal, and audio is output from the audio output unit ex357.

Furthermore, similarly to the TV ex300, terminals such as the mobile phone ex114 may have three implementation types: (1) a transmit- and receive-type terminal including an encoder and a decoder, (2) a transmit terminal including an encoder, and (3) a receive terminal including a decoder. In the foregoing description, multiplexed data obtained by multiplexing music data or the like onto video data is received and transmitted in the digital broadcasting system ex200. The multiplexed data may also be data in which data other than audio data, such as text data related to video, is multiplexed. Alternatively, video data instead of multiplexed data may be used.

In the manner described above, the moving image encoding method or the moving image decoding method illustrated in each of the above-described embodiments may be used in any of the devices and systems described above, in which case the advantages described in each of the above-described embodiments are achievable.

In addition, the present disclosure is not limited to the embodiments described above, and a variety of modifications or alterations can be made without departing from the scope of the present disclosure.

Seventh Embodiment

Video data may also be generated by appropriately switching between the moving image encoding method or apparatus illustrated in each of the above-described embodiments and a moving image encoding method or apparatus complying with different standards such as MPEG-2, MPEG4-AVC, and VC-1, if necessary.

If a plurality of pieces of video data each complying with a different standard are generated, decoding of the pieces of video data involves selecting decoding methods corresponding to the respective standards. However, since it is difficult to identify which standard the video data to be decoded complies with, it is difficult to select an appropriate decoding method.

To address this problem, multiplexed data obtained by multiplexing audio data or the like onto video data includes identification information indicating which standard the video data complies with. A specific configuration of multiplexed data including video data generated by the moving image encoding method or apparatus illustrated in each of the above-described embodiments will be described hereinafter. The multiplexed data is a digital stream having an MPEG-2 transport stream format.

FIG. 37 is a diagram illustrating the configuration of the multiplexed data. As illustrated in FIG. 37, the multiplexed data is obtained by multiplexing one or more of a video stream, an audio stream, a presentation graphics (PG) stream, and an interactive graphics (IG) stream. The video stream indicates main video and sub-video in a movie. The audio stream indicates main audio in the movie and sub-audio to be mixed with the main audio. The presentation graphics stream includes subtitles in the movie. The main video indicates normal video displayed on a screen, and the sub-video is video displayed on a small screen within the main video. The interactive graphics stream indicates an interactive screen created by placing a graphical user interface (GUI) component on the screen. The video stream is encoded by the moving image encoding method or apparatus illustrated in each of the above-described embodiments, or by a moving image encoding method or apparatus complying with an existing standard such as MPEG-2, MPEG4-AVC, or VC-1. The audio stream is encoded with a scheme such as Dolby AC-3, Dolby Digital Plus, Meridian Lossless Packing (MLP), Digital Theatre Systems (DTS), Digital Theatre Sound High Definition (DTS-HD), or linear Pulse Code Modulation (PCM).

Each stream included in the multiplexed data is identified using a packet identifier (PID). For example, a video stream used for video of a movie is assigned 0x1011, audio streams are assigned 0x1100 to 0x111F, presentation graphics streams are assigned 0x1200 to 0x121F, interactive graphics streams are assigned 0x1400 to 0x141F, video streams used for sub-video of the movie are assigned 0x1B00 to 0x1B1F, and audio streams used for sub-audio to be mixed with the main audio are assigned 0x1A00 to 0x1A1F.

Figure 38:
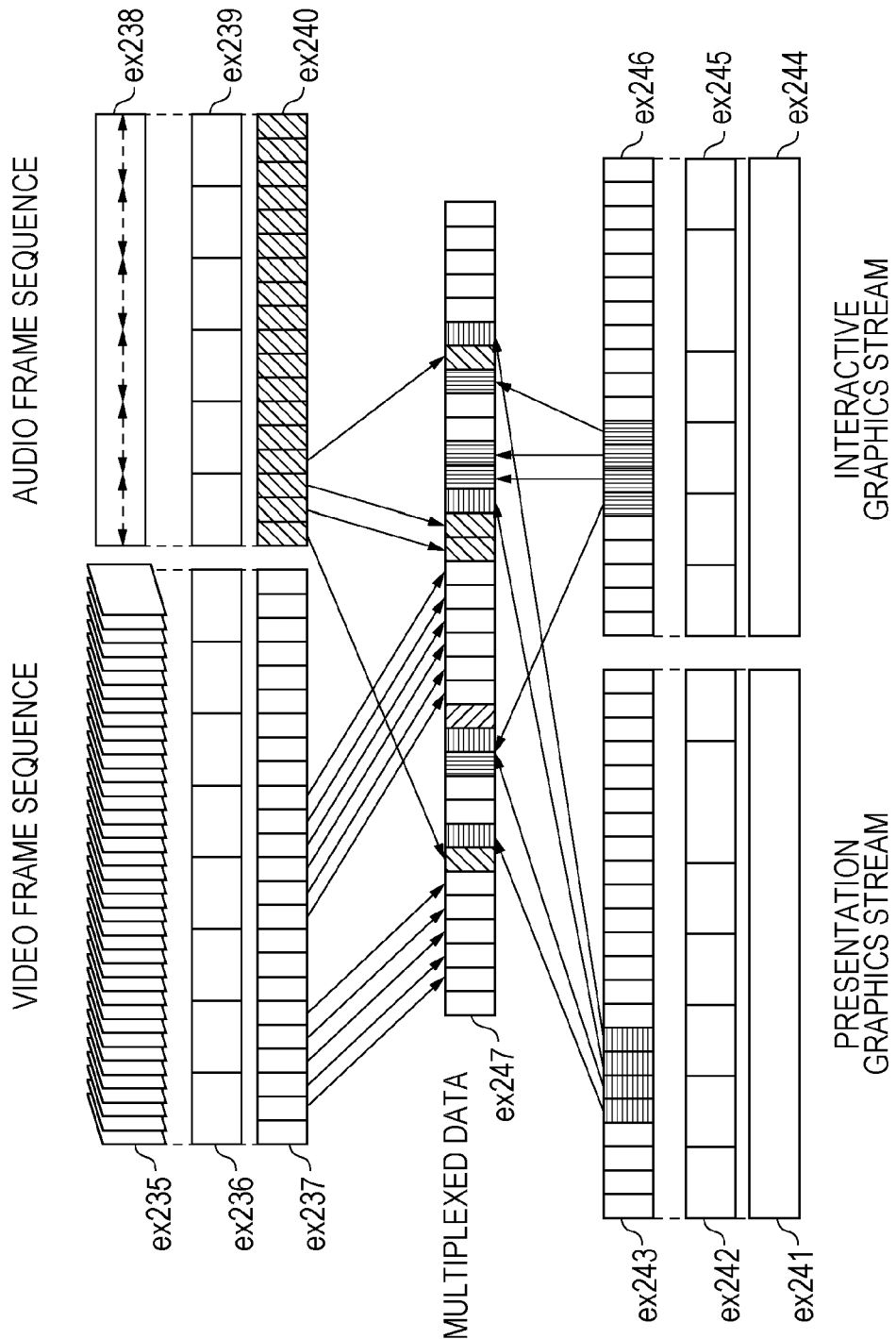
FIG. 38 is a diagram schematically illustrating how each stream is multiplexed in multiplexed data.

FIG. 38 is a diagram schematically illustrating how multiplexed data is multiplexed. First, a video stream ex235 including a plurality of video frames and an audio stream ex238 including a plurality of audio frames are converted into packetized elementary stream (PES) packet sequences ex236 and ex239, respectively, and are further converted into transport stream (TS) packets ex237 and ex240, respectively. Likewise, data of a presentation graphics stream ex241 and data of an interactive graphics stream ex244 are converted into PES packet sequences ex242 and ex245, respectively, and are further converted into TS packets ex243 and ex246, respectively. The TS packets ex237, ex240, ex243, and ex246 are multiplexed into a single stream to produce multiplexed data ex247.

Figure 39:
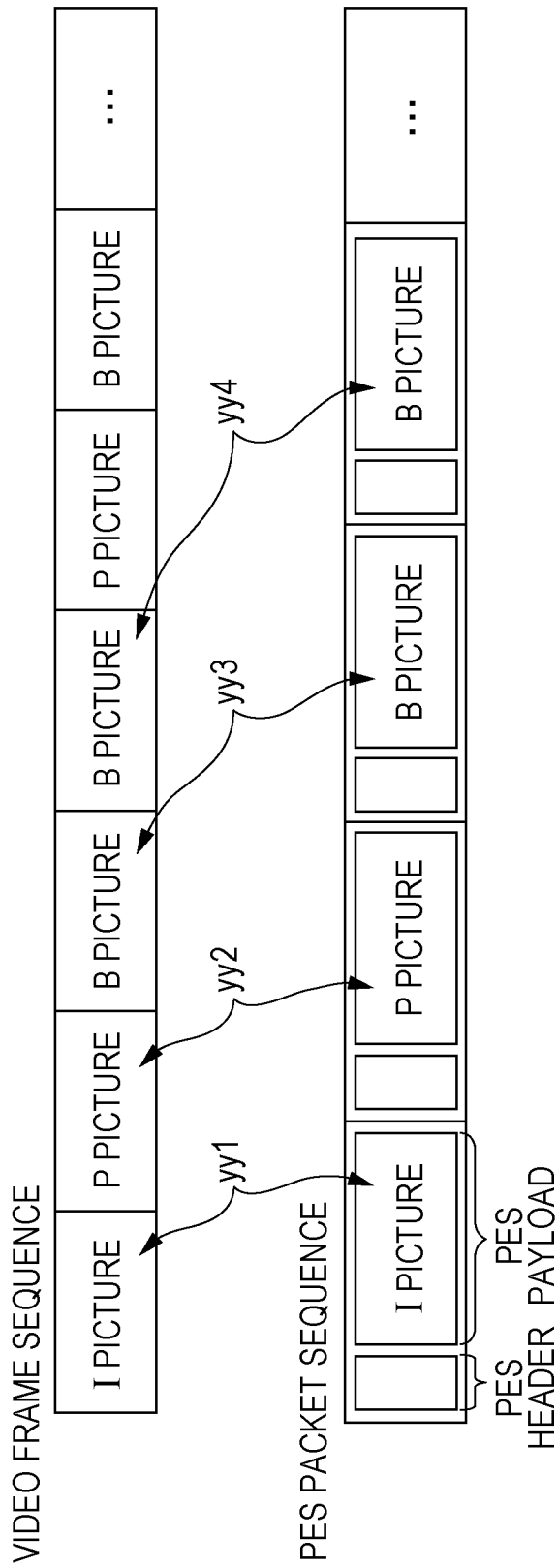
FIG. 39 is a diagram illustrating in more detail how a video stream is stored in a PES packet sequence.

FIG. 39 illustrates in more detail how a video stream is stored in a PES packet sequence. The first row of FIG. 39 illustrates a video frame sequence of a video stream. The second row illustrates a PES packet sequence. As indicated by arrows yy1, yy2, yy3, and yy4 in FIG. 39, an I picture, B pictures, and a P picture, which are a plurality of Video Presentation Units in the video stream, are separated on a picture-by-picture basis, and are stored in the payloads of PES packets. Each PES packet has a PES header, and the PES header contains a presentation time stamp (PTS) indicating the time when the picture is displayed and a decoding time stamp (DTS) indicating the time when the picture is decoded.

FIG. 40 illustrates the format of TS packets finally written in multiplexed data. Each TS packet is a 188-byte fixed-length packet having a 4-byte TS header containing information for identifying the stream, such as a PID, and a 184-byte TS payload containing data. The PES packet described above is divided and is stored in a TS payload. In the case of a BD-ROM, a TS packet is assigned 4-byte TP_Extra_Header, thereby forming a 192-byte source packet, which is written in multiplexed data. TP_Extra_Header contains information such as an ATS (Arrival_Time_Stamp). The ATS indicates the time when the TS packet is started to be transferred to a PID filter of a decoder. As illustrated in the bottom row of FIG. 40, the multiplexed data has a sequence of source packets whose numbers with increments starting from the beginning of the multiplexed data are referred to as source packet numbers (SPNs).

Further, the TS packets included in the multiplexed data include, in addition to the streams of video, audio, subtitles, and so forth, a program association table (PAT), a program map table (PMT), a program clock reference (PCR), and so forth. The PAT indicates what the PID of the PMT used in the multiplexed data is, and the PAT's own PID is registered as 0. The PMT has PIDs of streams of video, audio, subtitles, and so forth included in the multiplexed data, and attribute information on the streams corresponding to the respective PIDs. The PMT also includes various descriptors concerning the multiplexed data. The descriptors include copy control information indicating whether copying of the multiplexed data is permitted or not. The PCR has information on the system time clock (STC) time corresponding to the ATS at which the PCR packet is transferred to the decoder to achieve synchronization between an arrival time clock (ATC), which is the ATS time axis, and an STC, which is the PTS/DTS time axis.

Figure 41:
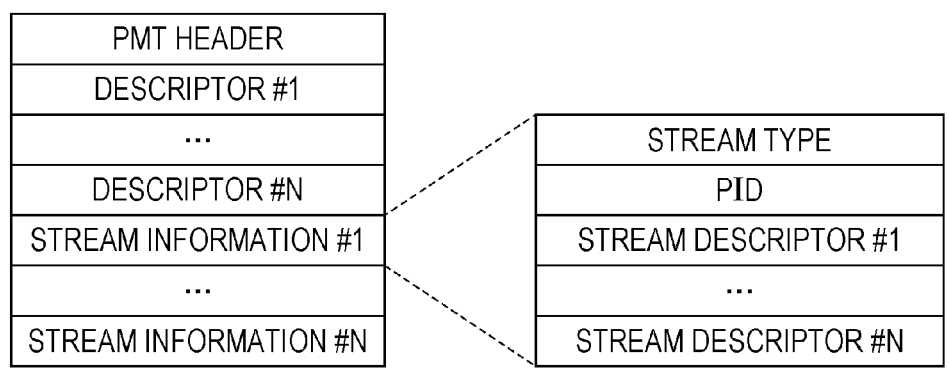
FIG. 41 is a diagram illustrating the data configuration of a program map table (PMT)

FIG. 41 is a diagram explaining the data structure of the PMT in detail. The PMT has a PMT header placed at the top thereof. The PMT header contains the length of the data included in the PMT, and so forth. The PMT header is followed by a plurality of descriptors concerning the multiplexed data. The copy control information described above and the like are written as descriptors. The descriptors are followed by a plurality of pieces of stream information concerning the individual streams included in the multiplexed data. Each piece of stream information is composed of a stream type for identifying the compression codec and the like of the stream, the PID of the stream, and stream descriptors containing attribute information on the stream (such as the frame rate and the aspect ratio). The number of stream descriptors is equal to the number of streams present in the multiplexed data.

When recorded on a recording medium or the like, the multiplexed data is recorded together with a multiplexed data information file.

Figure 42:
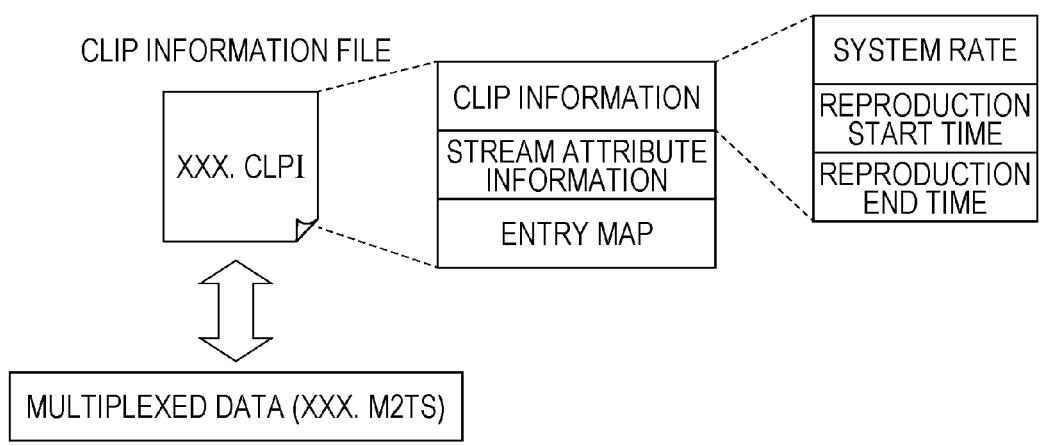
FIG. 42 is a diagram illustrating the internal configuration of multiplexed data information.

As illustrated in FIG. 42, the multiplexed data information file includes management information on the multiplexed data. Multiplexed data information files and pieces of multiplexed data are in one-to-one correspondence with each other. Each multiplexed data information file is composed of multiplexed data information, stream attribute information, and entry map.

As illustrated in FIG. 42, the multiplexed data information is composed of a system rate, a reproduction start time, and a reproduction end time. The system rate indicates the maximum rate at which the multiplexed data is transferred to a PID filter of a system target decoder described below. The interval between ATSs included in the multiplexed data is set to be less than or equal to the system rate. The reproduction start time is the PTS of the first video frame of the multiplexed data, and the reproduction end time is set by adding the reproduction interval corresponding to one frame to the PTS of the last video frame of the multiplexed data.

Figure 43:
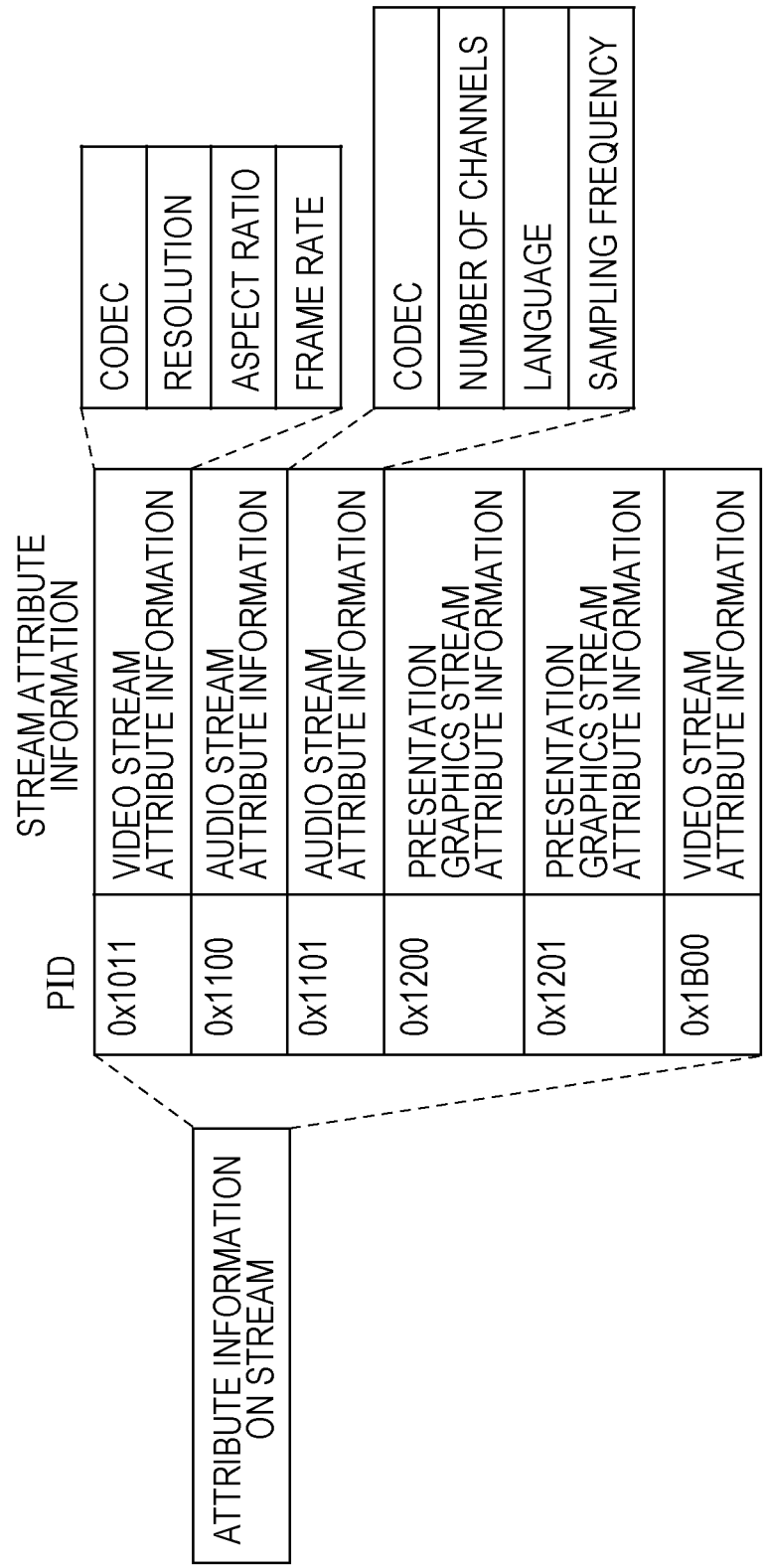
FIG. 43 is a diagram illustrating the internal configuration of stream attribute information.

In the stream attribute information, as illustrated in FIG. 43, attribute information regarding each stream included in the multiplexed data is registered for each PID. The attribute information has different information for each of the video stream, the audio stream, the presentation graphics stream, and the interactive graphics stream. The video stream attribute information has information such as the compression codec with which the video stream has been compressed, and the resolution, aspect ratio, and frame rate of each piece of picture data included in the video stream. The audio stream attribute information has information such as the compression codec with which the audio stream has been compressed, the number of channels included in the audio stream, the language of the audio stream, and the sampling frequency. The above-described pieces of information are used for, for example, the initialization of the decoder before a player reproduces the multiplexed data.

In this embodiment, the stream type included in the PMT within the multiplexed data is used. If the multiplexed data is recorded on a recording medium, the video stream attribute information included in the multiplexed data information is used. Specifically, the moving image encoding method or apparatus illustrated in each of the above-described embodiments includes a step or unit for setting unique information, which indicates video data generated by the moving image encoding method or apparatus illustrated in each of the above-described embodiments, in the video stream attribute information or in the stream type included in the PMT. The configuration described above allows video data generated by the moving image encoding method or apparatus illustrated in each of the above-described embodiments and video data complying with other standards to be distinguished from each other.

Figure 44:
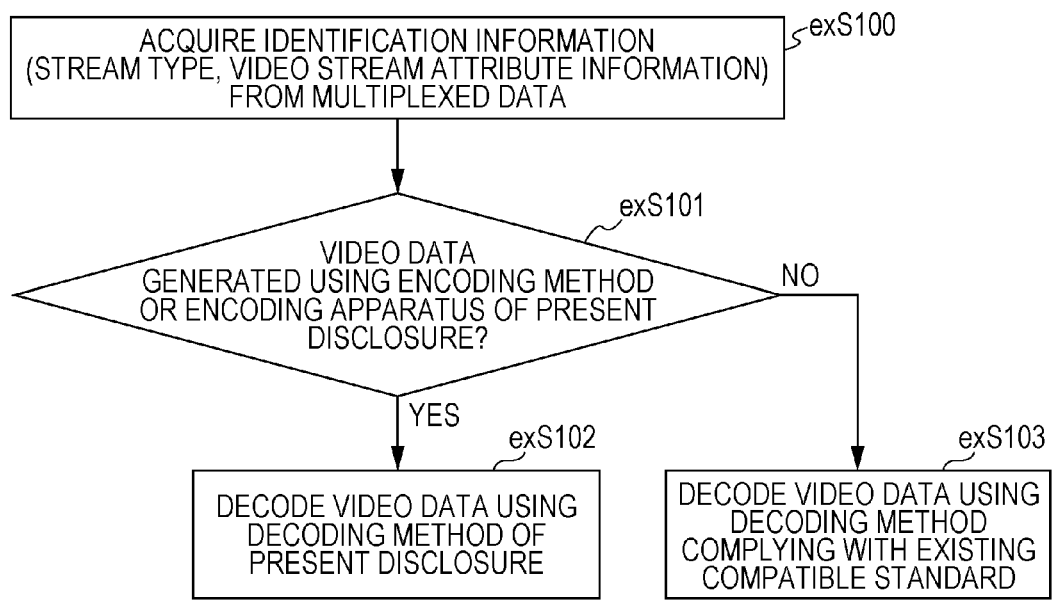
FIG. 44 is a diagram illustrating steps for identifying video data.

FIG. 44 illustrates the steps of a moving image decoding method according to this embodiment. In step exS100, the stream type included in the PMT or the video stream attribute information included in the multiplexed data information is acquired from the multiplexed data. Then, in step exS101, it is determined whether or not the stream type or the video stream attribute information indicates that the multiplexed data is multiplexed data generated by the moving image encoding method or apparatus illustrated in each of the above-described embodiments. If it is determined that the stream type or the video stream attribute information indicates that the multiplexed data is multiplexed data generated by the moving image encoding method or apparatus illustrated in each of the above-described embodiments, then in step exS102, the multiplexed data is decoded using the moving image decoding method illustrated in each of the above-described embodiments. If the stream type or the video stream attribute information indicates that the multiplexed data complies with an existing standard such as MPEG-2, MPEG4-AVC, or VC-1, then in step exS103, the multiplexed data is decoded using a moving image decoding method complying with the existing standard.

In the manner described above, setting a new unique value in the stream type or the video stream attribute information allows determination as to whether or not data is decodable by the moving image decoding method or apparatus illustrated in each of the above-described embodiments when the data is decoded. Accordingly, even if multiplexed data complying with a different standard is input, an appropriate decoding method or apparatus can be selected, and thus the multiplexed data can be decoded without any error. In addition, the moving image encoding method or apparatus or the moving image decoding method or apparatus illustrated in this embodiment can also be used for any of the apparatuses and systems described above.

Eighth Embodiment

Figure 45:
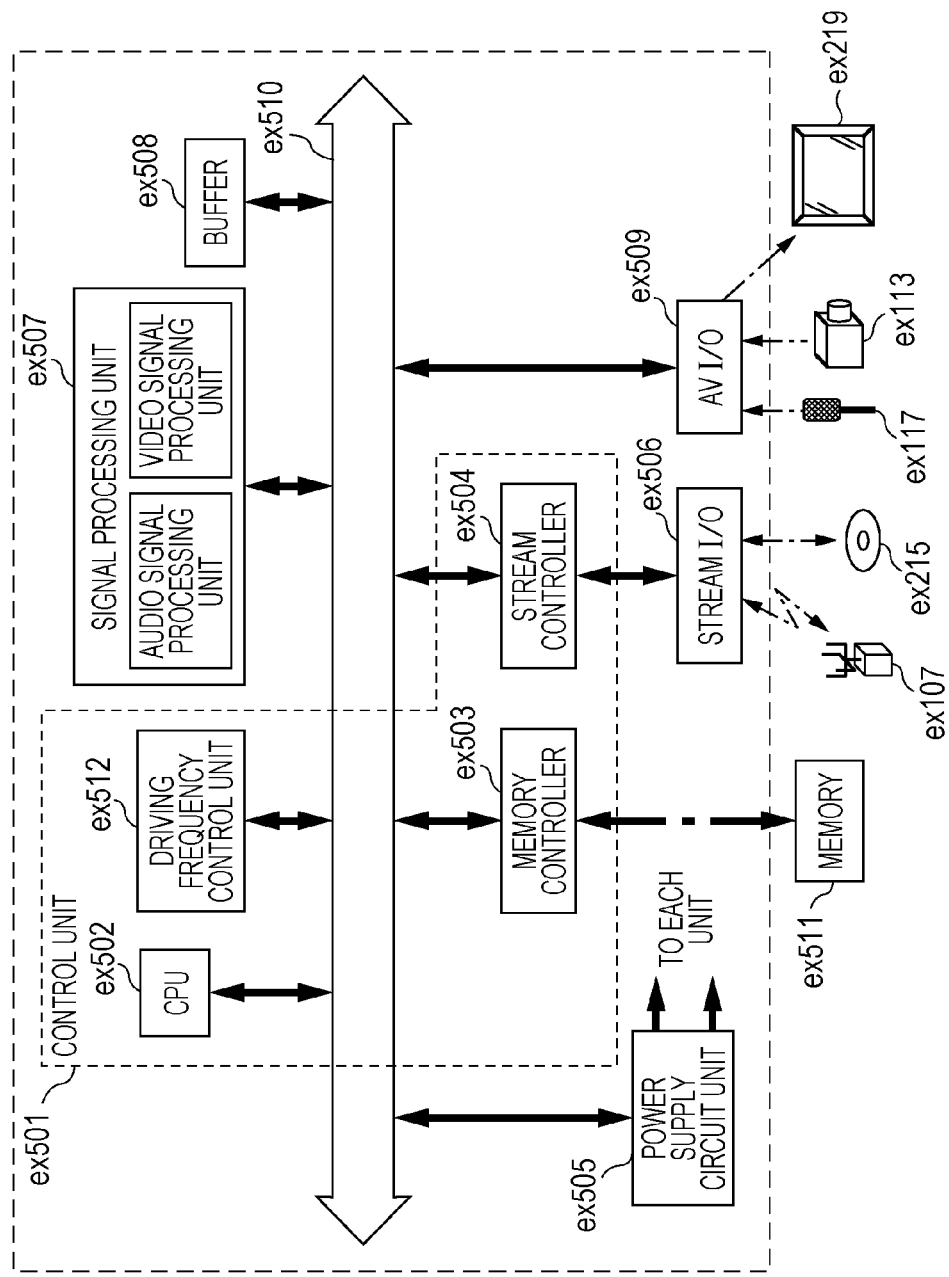
FIG. 45 is a block diagram illustrating an example configuration of an integrated circuit that implements a moving image encoding method and a moving image decoding method in each embodiment.

The moving image encoding method and apparatus and the moving image decoding method and apparatus illustrated in each of the above-described embodiments are implemented by an LSI, which is typically an integrated circuit. FIG. 45 illustrates, by way of example, the configuration of an LSI ex500 fabricated into a single chip. The LSI ex500 includes a control unit ex501, a CPU ex502, a memory controller ex503, a stream controller ex504, a power supply circuit unit ex505, a stream input/output unit (I/O) ex506, a signal processing unit ex507, a buffer ex508, an AV I/O ex509, and driving frequency control unit ex512, which are connected to one another via a bus ex510. The power supply circuit unit ex505 supplies power to each unit when power is turned on to activate the LSI ex500 into operation.

For example, when an encoding process is to be performed, the LSI ex500 receives, as input, an AV signal from the microphone ex117, the camera ex113, or the like via the AV I/O ex509 under control of the control unit ex501, which includes the CPU ex502, the memory controller ex503, the stream controller ex504, the driving frequency control unit ex512, and so forth. The input AV signal is temporarily accumulated in an external memory ex511, such as a synchronous dynamic RAM (SDRAM). The accumulated data is delivered to the signal processing unit ex507, for example, a plurality of times, if necessary, in accordance with the amount of processing or the processing speed under control of the control unit ex501, and an audio signal is encoded and/or a video signal is encoded in the signal processing unit ex507. The encoding process of the video signal is the encoding process described in each of the above-described embodiments. The signal processing unit ex507 further performs processing, depending on the situation, such as multiplexing the encoded audio data and the encoded video data, and outputs the multiplexed data to outside from the stream I/O ex506. The output multiplexed data is transmitted to the base station ex107, or is written in the recording medium ex215. When data is to be multiplexed, it is desirable that the data be temporarily accumulated in the buffer ex508 for synchronization.

In the foregoing description, the memory ex511 is configured to be located outside the LSI ex500. The memory ex511 may be contained in the LSI ex500. The number of buffers ex508 is not limited to one, and a plurality of buffers may be used. Furthermore, the LSI ex500 may be fabricated into a single chip, or may be separated into a plurality of chips.

In the foregoing, furthermore, the control unit ex501 includes the CPU ex502, the memory controller ex503, the stream controller ex504, the driving frequency control unit ex512, and so forth. The control unit ex501 may not necessarily have the configuration described above. For example, the signal processing unit ex507 may further include a CPU. An additional CPU included in the signal processing unit ex507 can further increase the processing speed. In another example, the CPU ex502 may include the signal processing unit ex507, or may include part of the signal processing unit ex507, for example, an audio signal processing unit. In this case, the control unit ex501 has a configuration including the CPU ex502 having the signal processing unit ex507 or having part of the signal processing unit ex507.

While an LSI is termed here, any other term such as an IC, a system LSI, a super LSI, or an ultra LSI may be applicable in accordance with the difference in the degree of integration.

The approach of fabricating an integrated circuit is not limited to LSI, and may be implemented by a dedicated circuit or a general-purpose processor. A field programmable gate array (FPGA) that is programmable after an LSI is fabricated or a reconfigurable processor capable of reconfiguring the connection or setting of circuit cells in the LSI may be used. Such a programmable logic device is capable of executing the moving image encoding method or the moving image decoding method illustrated in each of the above-described embodiments by typically loading a program constituting software or firmware or reading the program from a memory or the like.

Furthermore, in the case of the advent of integrated circuit technology replacing LSI due to the advancement of semiconductor technology or derivative other technology, it is to be understood that functional blocks may be integrated by using this technology. Applications of biotechnology may be possible.

Ninth Embodiment

In a case where video data generated by the moving image encoding method or apparatus illustrated in each of the above-described embodiments is decoded, the amount of processing may be larger than that of video data complying with an existing standard such as Moving Picture Experts Group-2 (MPEG-2), MPEG4-AVC, or VC-1. Thus, it is desirable that the LSI ex500 set the driving frequency to a higher frequency than the driving frequency of the CPU ex502 when video data complying with an existing standard is decoded. However, if the driving frequency is increased, power consumption will increase.

Figure 46:
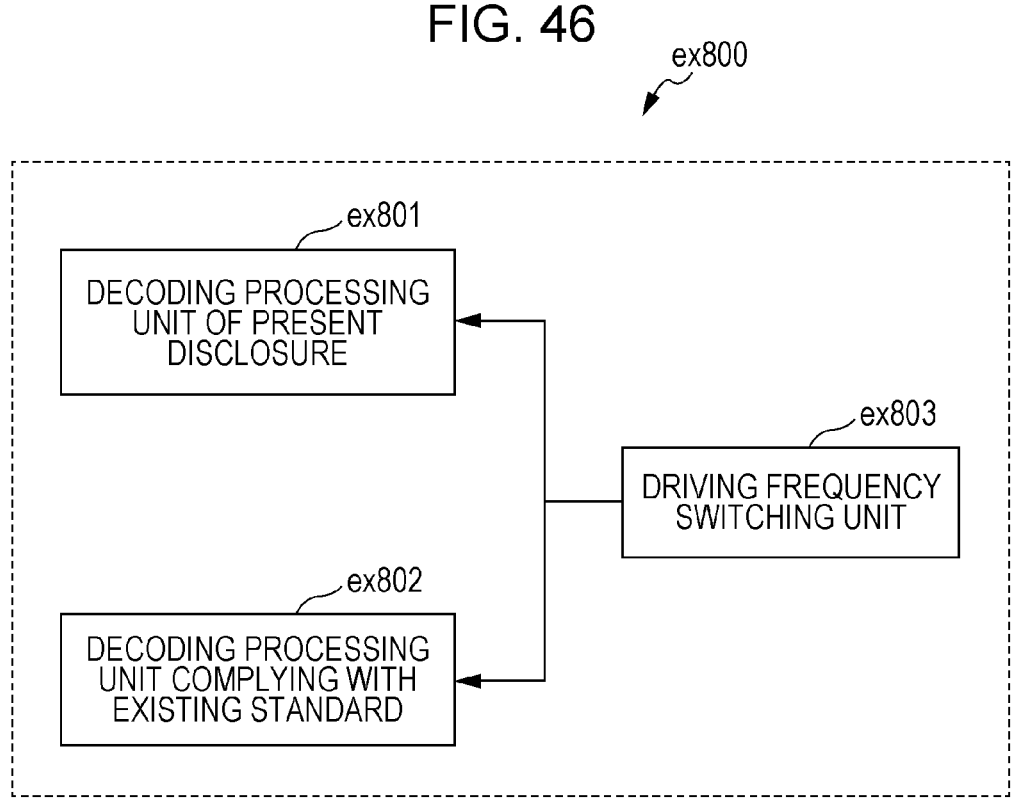
FIG. 46 is a diagram illustrating a configuration for switching a driving frequency.

To address this problem, a moving image decoding apparatus such as the TV ex300 or the LSI ex500 is configured to identify which standard the video data complies with and to switch the driving frequency in accordance with the standard. FIG. 46 illustrates a configuration ex800 in this embodiment. If the video data is generated by the moving image encoding method or apparatus illustrated in each of the above-described embodiments, a driving frequency switching unit ex803 sets the driving frequency to a high frequency. Then, the driving frequency switching unit ex803 instructs a decoding processing unit ex801 that executes the moving image decoding method illustrated in each of the above-described embodiments to decode the video data. On the other hand, if the video data is video data complying with an existing standard, the driving frequency switching unit ex803 sets the driving frequency to a lower frequency than that when the video data is video data generated by the moving image encoding method or apparatus illustrated in each of the above-described embodiments. Then, the driving frequency switching unit ex803 instructs a decoding processing unit ex802 compatible with the existing standard to decode the video data.

More specifically, the driving frequency switching unit ex803 includes the CPU ex502 and the driving frequency control unit ex512 illustrated in FIG. 45. In addition, the decoding processing unit ex801 that executes the moving image decoding method illustrated in each of the above-described embodiments and the decoding processing unit ex802 compatible with an existing standard correspond to the signal processing unit ex507 illustrated in FIG. 45. The CPU ex502 identifies which standard the video data complies with. In accordance with a signal from the CPU ex502, the driving frequency control unit ex512 sets the driving frequency. In addition, in accordance with a signal from the CPU ex502, the signal processing unit ex507 decodes the video data. The video data may be identified by using, for example, the identification information described in the seventh embodiment. The identification information is not limited to that described in the seventh embodiment, and any information capable of identifying which standard the video data complies with may be used. For example, in a case where it is possible to identify which standard the video data complies with in accordance with an external signal for identifying whether the video data is available for a TV or is available for a disk or the like, the video data may be identified in accordance with the external signal. In addition, the CPU ex502 may select a driving frequency in accordance with, for example, a look-up table illustrated in FIG. 48 in which video data standards and driving frequencies are associated with each other. The look-up table may be stored in the buffer ex508 or in an internal memory of an LSI, so that the CPU ex502 can refer to the look-up table to select a driving frequency.

Figures 47, 48:
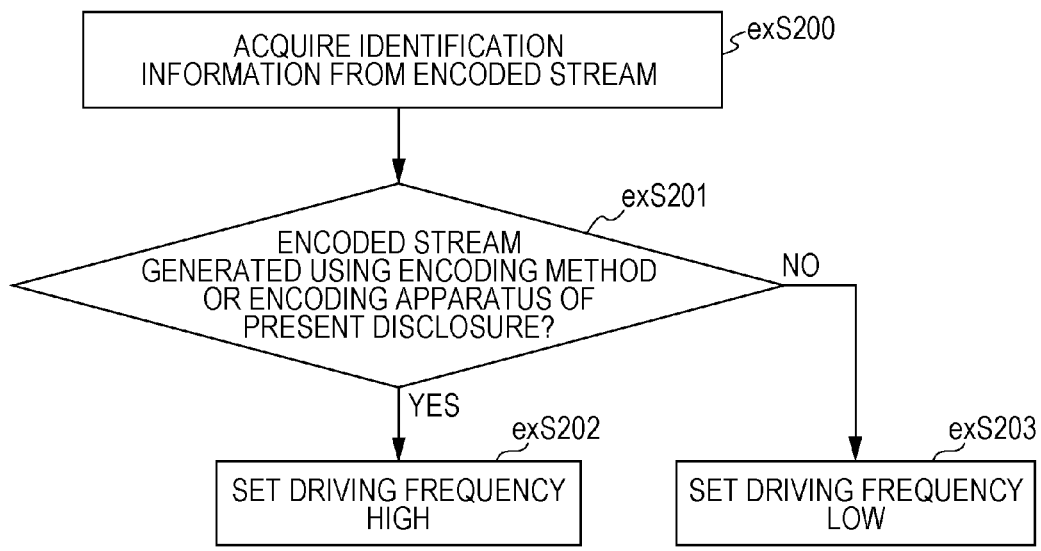
FIG. 47 is a diagram illustrating steps for identifying video data and switching a driving frequency.
FIG. 48 is a diagram illustrating an example of a look-up table in which video data standards and driving frequencies are associated with each other.

FIG. 47 illustrates steps for implementing a method according to this embodiment. First, in step exS200, the signal processing unit ex507 acquires identification information from multiplexed data. Then, in step exS201, the CPU ex502 identifies, in accordance with the identification information, whether or not the video data is data generated by the encoding method or apparatus illustrated in each of the above-described embodiments. If the video data is data generated by the encoding method or apparatus illustrated in each of the above-described embodiments, then in step exS202, the CPU ex502 delivers a signal for setting the driving frequency to a high frequency to the driving frequency control unit ex512. Then, the driving frequency control unit ex512 sets a high driving frequency. On the other hand, if it is indicated that the video data is video data complying with an existing standard such as MPEG-2, MPEG4-AVC, or VC-1, in step exS203, the CPU ex502 delivers a signal for setting the driving frequency to a low frequency to the driving frequency control unit ex512. Then, the driving frequency control unit ex512 sets a lower driving frequency than that when the video data is data generated by the encoding method or apparatus illustrated in each of the above-described embodiments.

Furthermore, varying a voltage to be applied to the LSI ex500 or an apparatus including the LSI ex500 in association with the switching of the driving frequency can further increase the power saving effect. For example, when the driving frequency is set low, a voltage to be applied to the LSI ex500 or an apparatus including the LSI ex500 may also be set lower than that when the driving frequency is set high.

In the method for setting a driving frequency, it may be sufficient to set the driving frequency to a high frequency when the amount of processing for decoding is large, and to set the driving frequency to a low frequency when the amount of processing for decoding is small. The setting method described above is not intended to be limiting. For example, if the amount of processing for decoding video data complying with the MPEG4-AVC standard is larger than the amount of processing for decoding video data generated by the moving image encoding method or apparatus illustrated in each of the above-described embodiments, the driving frequency may be set in a manner opposite to that described above.

Furthermore, the method for setting a driving frequency is not limited to a configuration in which the driving frequency is set low. For example, when the identification information indicates that the video data is data generated by the moving image encoding method or apparatus illustrated in each of the above-described embodiments, a voltage to be applied to the LSI ex500 or an apparatus including the LSI ex500 may be set high, whereas, when the identification information indicates that the video data is video data complying with an existing standard such as MPEG-2, MPEG4-AVC, or VC-1, a voltage to be applied to the LSI ex500 or an apparatus including the LSI ex500 may be set low. In another example, when the identification information indicates that the video data is data generated by the moving image encoding method or apparatus illustrated in each of the above-described embodiments, the driving of the CPU ex502 may not be stopped, whereas, when the identification information indicates that the video data is video data complying with an existing standard such as MPEG-2, MPEG4-AVC, or VC-1, the driving of the CPU ex502 may be temporarily stopped because there is processing to spare. Even when the identification information indicates that the video data is data generated by the moving image encoding method or apparatus illustrated in each of the above-described embodiments, the driving of the CPU ex502 may be temporarily stopped if there is processing to spare. In this case, the period of time during which the driving of the CPU ex502 is stopped may be set shorter than that when the identification information indicates that the video data is video data complying with an existing standard such as MPEG-2, MPEG4-AVC, or VC-1.

In the manner described above, switching the driving frequency in accordance with the standard with which the video data complies can achieve power saving. Furthermore, if the LSI ex500 or an apparatus including the LSI ex500 is driven by using a battery, power saving can result in an increase in the life of the battery.

Tenth Embodiment

In some cases, a plurality of pieces of video data complying with different standards may be input to the devices and systems described above, such as a TV and a mobile phone. In order to decode such a plurality of pieces of video data complying with different standards which have been input, it is desirable that the signal processing unit ex507 of the LSI ex500 support a plurality of standards. However, if the signal processing unit ex507 that supports each standard is individually used, the circuit scale of the LSI ex500 may increase, resulting in an increase in cost.

Figure 49A:
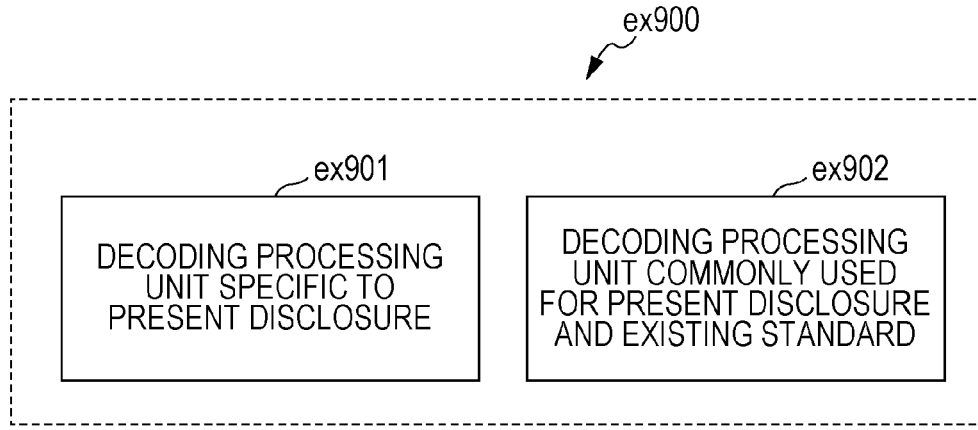
FIG. 49A is a diagram illustrating an example of the configuration of a signal processing unit in which a module is shared.

To address this problem, a decoding processing unit for executing the moving image decoding method illustrated in each of the above-described embodiments and a decoding processing unit compatible with an existing standard such as MPEG-2, MPEG4-AVC, or VC-1 are configured to be shared in part. FIG. 49A illustrates an example configuration ex900. For example, some processes are partially common to the moving image decoding method illustrated in each of the above-described embodiments and a moving image decoding method complying with the MPEG4-AVC standard. Examples of such partially common processes include entropy encoding, inverse quantization, deblocking filter, and motion compensation. The common processes may be performed by commonly using a decoding processing unit ex902 that supports the MPEG4-AVC standard, and other processes that do not compatible with the MPEG4-AVC standard and that are specific to an aspect of the present disclosure may be performed using a dedicated decoding processing unit ex901. In particular, an aspect of the present disclosure focuses on motion compensation. Thus, for example, the dedicated decoding processing unit ex901 may be used for motion compensation, and a decoding processing unit may be commonly used for some or all of the other processes of entropy decoding, deblocking filter, and inverse quantization. Another configuration may be used for sharing a decoding processing unit such that common processes are performed by commonly using a decoding processing unit for executing the moving image decoding method illustrated in each of the above-described embodiments, and processes specific to the MPEG4-AVC standard are performed using a dedicated decoding processing unit.

Figure 49B:
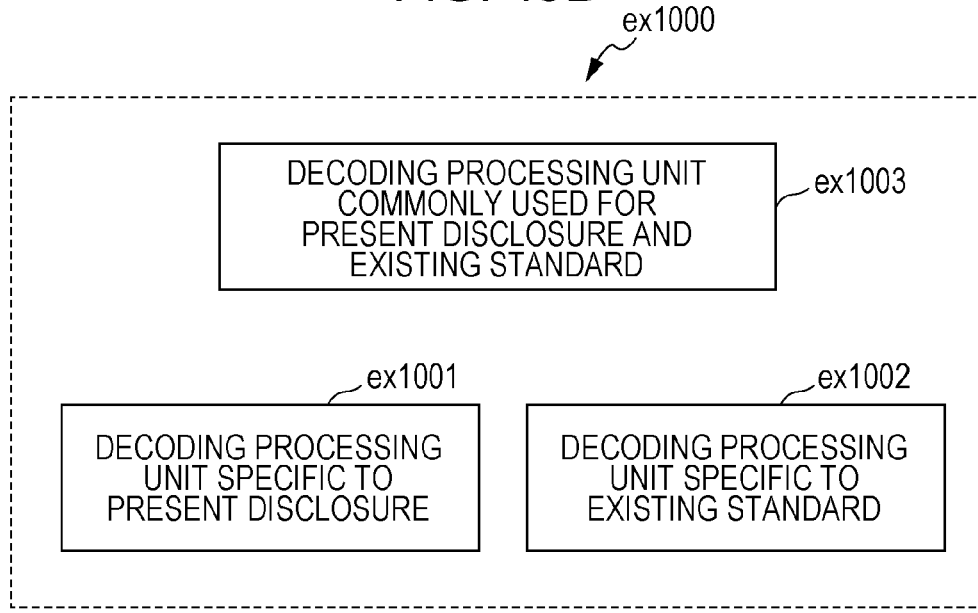
FIG. 49B is a diagram illustrating another example of the configuration of a signal processing unit in which a module is shared.

FIG. 49B illustrates still another example ex1000 of sharing some processes. In the illustrated example, a dedicated decoding processing unit ex1001 that supports processes specific to an aspect of the present disclosure, a dedicated decoding processing unit ex1002 that supports processes specific to other existing standards, and a shared decoding processing unit ex1003 that supports processes common to a moving image decoding method according to an aspect of the present disclosure and another moving image decoding method conforming to an existing standard are used. The dedicated decoding processing units ex1001 and ex1002 may not necessarily be dedicated to processes specific to an aspect of the present disclosure or processes specific to other existing standards, and may be configured to execute other general-purpose processing operations. In addition, the configuration according to this embodiment may also be implemented by the LSI ex500.

In the manner described above, sharing a decoding processing unit for processes common to a moving image decoding method according to an aspect of the present disclosure and a moving image decoding method conforming to an existing standard can reduce the circuit scale of the LSI and also reduce cost.

The present disclosure is applicable to, for example, a TV receiver, a digital video recorder, a car navigation system, a mobile phone, a digital camera, a digital video camera, a content distribution server, a content distribution system, and so forth.

What is claimed is:

1. An image decoding apparatus comprising:
a processor; and
a non-transitory computer-readable recording medium storing thereon a computer program, which when executed by the processor, causes the processor to perform operations including:
requesting an image transmission apparatus to transmit an image;
transmitting range information to the image transmission apparatus, the range information indicating a range which is a partial range of the image within an entire range of the image and which is selected in accordance with a user operation;
receiving a flag indicating whether the image belongs to a first type which is an advertisement or a second type which is not an advertisement;
in a case that the partial range of the image is selected, (i) receiving the entirety of the image from the image transmission apparatus when the flag indicates that the image belongs to the first type, and (ii) receiving one or more tiles corresponding to the partial range of the image among a plurality of tiles included in the image from the image transmission apparatus when the flag indicates that the image belongs to the second type, each of the one or more tiles being prohibited to refer to tiles outside of a corresponding tile of each of the one or more tiles in inter-picture prediction; and
decoding the entirety or the partial range of the image.

2. The image decoding apparatus according to claim 1, the operations further including:
displaying the entirety or the decoded partial range of the image on a first display device.

3. The image decoding apparatus according to claim 2, wherein
the range information is stored in a memory of the image decoding apparatus,
the receiving receives the partial range of the image in accordance with the stored range information,
the decoding decodes the partial range of the image in accordance with the stored range information, and
the displaying displays the partial range of the image in accordance with the stored range information.

4. The image decoding apparatus according to claim 3, wherein
in a case where the displaying displays the partial range of the image after displaying the entirety of another image, the displaying displays the partial range of the image in accordance with the stored range information.

5. The image decoding apparatus according to claim 4, wherein
in a case where the displaying further stops displaying of the partial range of the image and then resumes to display the partial range of the image, the displaying displays the partial range of the image in accordance with the stored range information.

6. The image decoding apparatus according to claim 5, wherein
the displaying displays the partial range of the image in accordance with the stored range information on a second display device different from the first display device.

7. The image decoding apparatus according to claim 6, wherein
in a case where the range information is not stored, the transmitting transmits the range information to the image transmission apparatus, and
in a case where the range information is stored and the receiving receives the partial range of the image, the receiving receives the partial range of the image in accordance with the stored range information without the range information being transmitted to the image transmission apparatus.

8. The image decoding apparatus according to claim 7, the operations further including:
selecting the partial range of the image in accordance with the user operation, wherein
the transmitting transmits the range information indicating the selected partial range of the image to the image transmission apparatus.

9. An image transmission apparatus comprising:
a processor;
a non-transitory computer-readable medium storing thereon a computer program, which when executed by the processor, causes the processor to perform operations including:
accepting a request from an image decoding apparatus to transmit an image;
receiving range information from the image decoding apparatus, the range information indicating a range which is a partial range of the image within an entire range of the image and which is selected in accordance with a user operation; and
in a case that the partial range of the image is selected, (i) transmitting the entirety of the image and a flag indicating the image belonging to a first type which is an advertisement to the image decoding apparatus when the image belongs to the first type, and (ii) transmitting one or more tiles corresponding to the partial range of the image among a plurality of tiles included in the image and the flag indicating the image belonging to a second type which is not an advertisement to the image decoding apparatus when the image belongs to the second type, each of the one or more tiles being prohibited to refer to tiles outside of a corresponding tile of each of the one or more tiles in inter-picture prediction.

10. An image processing system, comprising:
an image transmission apparatus; and
an image decoding apparatus,
the image transmission apparatus including:
a first processor; and
a first non-transitory computer-readable recording medium storing thereon a first computer program, which when executed by the first processor, cause the first processor to perform first operations including:

transmitting an image to the image decoding apparatus, the image decoding apparatus including:

a second processor; and a second non-transitory computer-readable recording medium storing thereon a second computer program, which when executed by the second processor, cause the second processor to perform second operations including:

receiving the image from the image transmission apparatus and decoding the image received from the image transmission apparatus;

requesting the image transmission apparatus to transmit the image, transmitting range information to the image transmission apparatus, the range information indicating a range which is a partial range of the image within an entire range of the image and which is selected in accordance with a user operation;

receiving a flag indicating whether the image belongs to a first type which is an advertisement or a second type which is not an advertisement;

in a case that the partial range of the image is selected, (i) receiving the entirety of the image from the image transmission apparatus when the flag indicates that the image belongs to the first type, and (ii) receiving one or more tiles corresponding to the partial range of the image among a plurality of tiles included in the image from the image transmission apparatus when the flag indicates that the image belongs to the second type, each of the one or more tiles being prohibited to refer to tiles outside of a corresponding tile of each of the one or more tiles in inter-picture prediction; and decoding the entirety or the partial range of the image, the first operations of the image transmission apparatus further including:

accepting a request from the image decoding apparatus to transmit the image;

receiving the range information from the image decoding apparatus; and in a case that the partial range of the image is selected, (i) transmitting the entirety of the image and the flag indicating the image belonging to the first type to the image decoding apparatus when the image belongs to the first type, and (ii) transmitting the one or more tiles corresponding to the partial range of the image among the plurality of tiles included in the image and the flag indicating the image belonging to the second type to the image decoding apparatus when the image belongs to the second type.

11. An image decoding method, comprising:

requesting an image transmission apparatus to transmit an image;

transmitting range information to the image transmission apparatus, the range information indicating a range which is a partial range of the image within an entire range of the image and which is selected in accordance with a user operation;

receiving a flag indicating whether the image belongs to a first type which is an advertisement or a second type which is not an advertisement;

in a case that the partial range of the image is selected, (i) receiving the entirety of the image from the image transmission apparatus when the flag indicates that the image belongs to the first type, and (ii) receiving one or more tiles corresponding to the partial range of the image among a plurality of tiles included in the image from the image transmission apparatus when the flag indicates that the image belongs to the second type, each of the one or more tiles being prohibited to refer to tiles outside of a corresponding tile of each of the one or more tiles in inter-picture prediction; and decoding the entirety or the partial range of the image.

12. An image transmission method, comprising:

accepting a request from an image decoding apparatus to transmit an image;

receiving range information from the image decoding apparatus, the range information indicating a range which is a partial range of the image within an entire range of the image and which is selected in accordance with a user operation; and in a case that the partial range of the image is selected, (i) transmitting the entirety of the image and a flag indicating the image belonging to a first type which is an advertisement to the image decoding apparatus when the image belongs to the first type, and (ii) transmitting one or more tiles corresponding to the partial range of the image among a plurality of tiles included in the image and the flag indicating the image belonging to a second type which is not an advertisement to the image decoding apparatus when the image belongs to the second type, each of the one or more tiles being prohibited to refer to tiles outside of a corresponding tile of each of the one or more tiles in inter-picture prediction.

\* \* \* \* \*